US 8,982,485 B2

(12) United States Patent
Arakawa et al.

(10) Patent No.: US 8,982,485 B2
(45) Date of Patent: Mar. 17, 2015

(54) LENS BARREL

(71) Applicant: Olympus Imaging Corp., Shibuya-ku, Tokyo (JP)

(72) Inventors: Yutaka Arakawa, Tokyo (JP); Kyoji Murayama, Tokyo (JP)

(73) Assignee: Olympus Imaging Corp., Tokyo (JP)

( * ) Notice: Subject to any disclaimer, the term of this patent is extended or adjusted under 35 U.S.C. 154(b) by 96 days.

(21) Appl. No.: 13/645,084

(22) Filed: Oct. 4, 2012

(65) Prior Publication Data

US 2013/0271860 A1    Oct. 17, 2013

(30) Foreign Application Priority Data

Oct. 7, 2011   (JP) ................................ 2011-223241
Aug. 3, 2012   (JP) ................................ 2012-173032

(51) Int. Cl.
| | |
|---|---|
| G02B 7/02 | (2006.01) |
| G02B 7/04 | (2006.01) |
| G02B 7/09 | (2006.01) |
| G02B 7/10 | (2006.01) |

(52) U.S. Cl.
CPC .. *G02B 7/04* (2013.01); *G02B 7/09* (2013.01); *G02B 7/10* (2013.01); *G02B 7/102* (2013.01)
USPC ............................ 359/819; 359/823; 359/825

(58) Field of Classification Search
CPC ............ G02B 7/00; G02B 7/02; G02B 7/021; G02B 7/022; G02B 7/023; G02B 7/04; G02B 7/09; G02B 7/10; G02B 7/102
USPC ......... 359/821–826, 676, 683, 694, 696–704, 359/819
See application file for complete search history.

(56) References Cited

U.S. PATENT DOCUMENTS

| | | | |
|---|---|---|---|
| 4,456,356 A | | 6/1984 | Okabe |
| 5,239,417 A | * | 8/1993 | Eguchi et al. ................. 359/823 |
| 5,648,836 A | | 7/1997 | Sato |

FOREIGN PATENT DOCUMENTS

| | | |
|---|---|---|
| CN | 2339998 | 9/1999 |
| CN | 1550813 | 12/2004 |
| JP | 2005-208633 | 8/2005 |

OTHER PUBLICATIONS

Notice of Rejection from corresponding Chinese Patent Application Serial No. 201210375304.7, mailed Sep. 2, 2014 (12 pgs.).

* cited by examiner

*Primary Examiner* — Thomas K Pham
*Assistant Examiner* — Cara Rakowski
(74) *Attorney, Agent, or Firm* — John C. Pokotylo; Straub & Pokotylo

(57) ABSTRACT

A lens barrel includes a moving frame, a stepper motor that drives the moving frame, a screw member that rotates in accordance with rotation of the stepper motor, a screw gear that rotates in accordance with rotation of the screw member, a nut member that screws with the screw member, moves, by pressing, the moving frame, an external rotation operation ring, including a drive gear that rotates in response to external operation, that switches between a first state where the drive gear meshes with the screw gear, rotates the screw member, and drives the moving frame and a second state where the drive gear and the screw gear are not meshed, and control means that drive-controls the stepper motor in conjunction with rotation of the external rotation operation ring when the external rotation operation ring is in the second state.

18 Claims, 39 Drawing Sheets

LENS BARREL

CROSS REFERENCE TO RELATED APPLICATIONS

This application claims the benefit of Japanese Applications No. 2011-223241 filed in Japan on Oct. 7, 2011, and No. 2012-173032 filed in Japan on Aug. 3, 2012, the contents of which are incorporated herein by this reference.

BACKGROUND OF THE INVENTION

1. Field of the Invention

The invention relates to a lens barrel, and more particularly, to a lens barrel including a drive mechanism capable of switching between manual driving and electric driving.

2. Description of the Related Art

Conventionally, as a lens barrel that is applied to a camera or the like for acquiring images, various types of lens barrels that include a focus adjustment mechanism configured to be able to switch between a manual focus action based on manual operation and an autofocus action that is performed using electric driving are disclosed by, for example, Japanese Patent Application Laid-Open Publication No. 2005-208633, and are put to practical use.

On the other hand, regarding cameras and the like in recent years, those which are configured to be able to record sound together with shot images and those which are capable of shooting/recording a video entailing sound recording, in addition to performing a shooting/recording action of a still image, are widespread.

In the case of performing, for example, video shooting using a conventional camera or the like that is configured as above, or more specifically, a camera that is capable of shooting a still image and a video, for example, the shooting action is constantly taking place when the video shooting is being performed, but also during such a shooting action, there are cases where various operations, such as zooming, focusing, and the like, are desired to be performed.

For example, during video shooting, there is a demand that zooming is changed quietly at a constant speed, and electric zooming is most convenient.

On the other hand, at the time of still image shooting, there is a demand that desired setting is freely and swiftly performed by manual operation with respect to various operations such as zooming, focusing, and the like.

Furthermore, in a lens drive mechanism applied to a conventional lens barrel, for example, a stepper motor or the like is used as a drive motor for separately moving a plurality of lenses in an optical direction, and, in many cases, a close-coupled type lens moving mechanism that is favorable for silencing and where the mechanism can be simply configured is adopted.

SUMMARY OF THE INVENTION

A lens barrel of an aspect of the present invention includes a first frame that moves in an optical axis direction, a first rotary drive source that drives the first frame in the optical axis direction, a screw member that rotates in accordance with rotation of the first rotary drive source, a pressure member that is maintained in a non-rotational state, and that screws with the screw member, moves in the optical axis direction in accordance with rotation of the screw member, and moves, by pressing, the first frame in the optical axis direction, an external rotation operation ring that is movable, by moving in the optical axis direction, to a first position and a second position on the optical axis, clutch means that includes a plurality of gears forming a gear train, and that transmits rotation of the external rotation operation ring to the screw member by the gear train when the external rotation operation ring is at the second position, and does not transmit rotation of the external rotation operation ring to the screw member by the gear train when the external rotation operation ring is at the first position, and control means that drive-controls the first rotary drive source in conjunction with the rotation of the external rotation operation ring when the external rotation operation is at the first position.

A lens barrel of another aspect of the present invention includes a first frame, a second frame, a first drive mechanism that drives the first frame in an optical axis direction, a second drive mechanism that drives the second frame in the optical axis direction, a first rotary drive source that renders the first drive mechanism drivable, a second rotary drive source that renders the second drive mechanism drivable, an external rotation operation ring that rotates around an optical axis, and that is movable to a first position and a second position in the optical axis direction, and clutch means that does not transmit rotation of the external rotation operation ring to the first drive mechanism when the external rotation operation ring is at the first position, and transmits rotation of the external rotation operation ring to the first drive mechanism when the external rotation operation ring is at the second position.

The advantages of the invention will be made clear by the following detailed described.

DETAILED DESCRIPTION OF THE PREFERRED EMBODIMENTS

Figure 1:
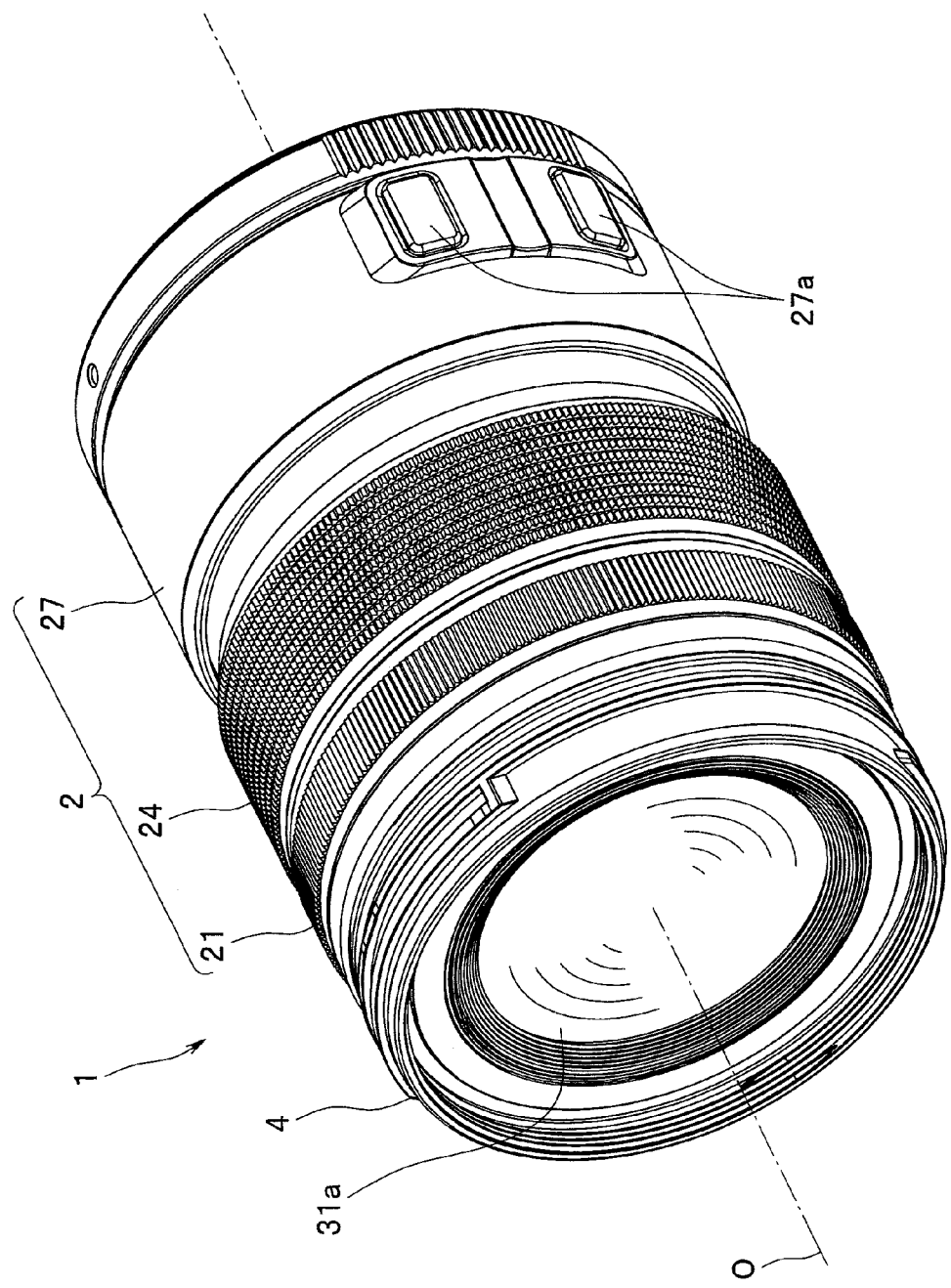
FIG. 1 is an external perspective view illustrating a lens barrel of an embodiment of the present invention.

An embodiment of the present invention takes as an example, and illustrates, a replacement zoom lens barrel (hereinafter, referred to simply as a "lens barrel") that is applied to a digital camera (hereinafter, referred to simply as a "camera") that is configured to be able to photoelectrically convert an optical image formed, for example, by an optical lens using a solid-state image pickup device, to convert an image signal obtained in this manner into digital image data representing a still image or a video, to record the digital data generated in this manner in a recording medium, and to reproduce and display the still image or the video at a display device based on the digital image data recorded in the recording medium.

Note that, in the present embodiment, an optical axis of a shooting optical system of the lens barrel is represented by a sign O. Also, of the direction along the optical axis O, the side of an object at a position facing the front surface of the lens barrel will be referred to as the front, and the mount side which is the surface of attachment to the camera of the lens barrel will be referred to as the back.

Furthermore, in each drawing used in the following explanation, the size of each structural element is made to be a size that allows recognition in the drawing, and thus, in some cases, each structural element is illustrated at a different scale. Therefore, the present invention is not limited to the modes illustrated, with respect to the number of structural elements, the shapes of the structural elements, the proportion between sizes of the structural elements, and the relative positional relationship between each of the structural elements shown in these drawings.

Figure 2:
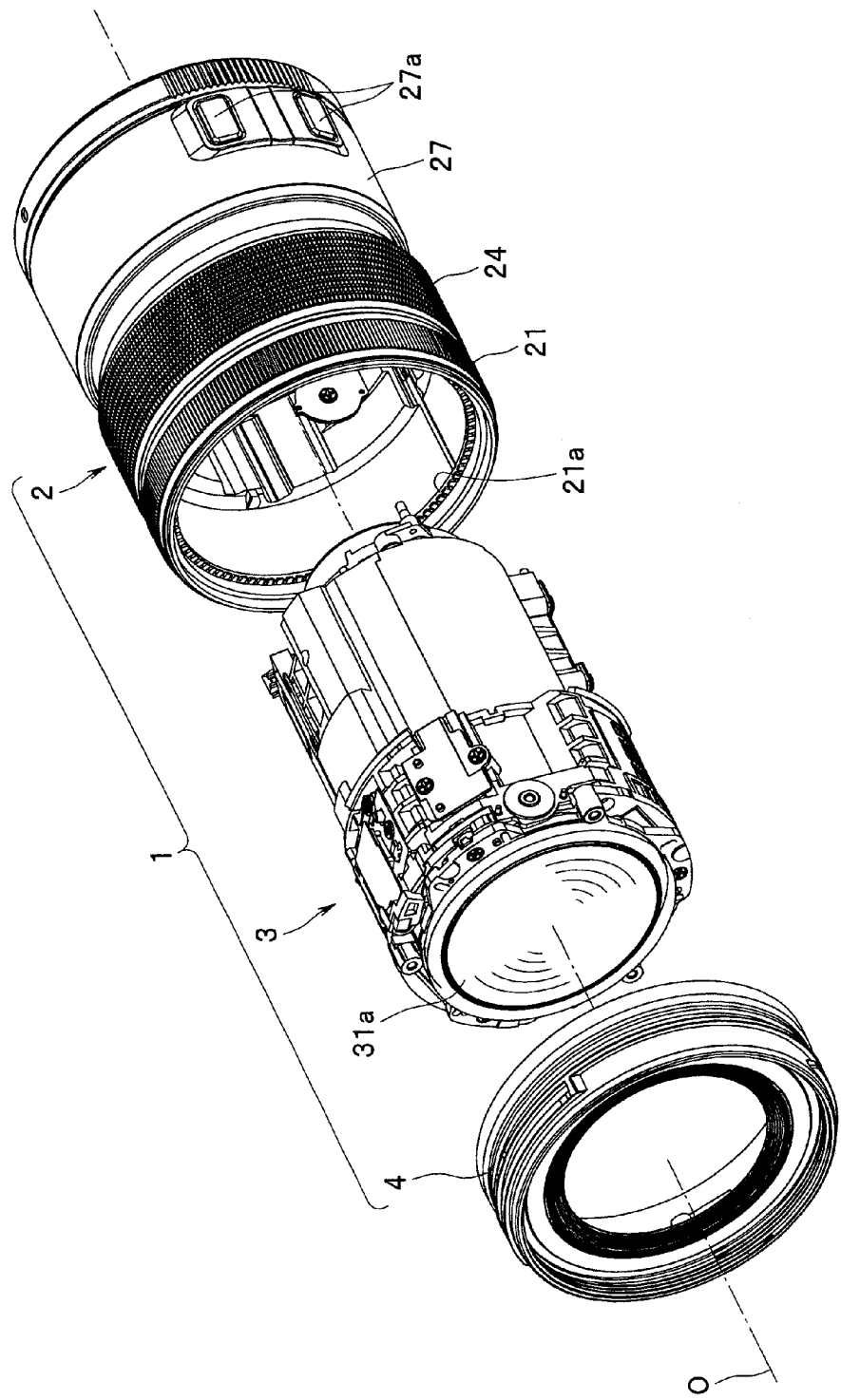
FIG. 2 is an exploded perspective view illustrating a configuration of the lens barrel of FIG. 1.
Figure 3:
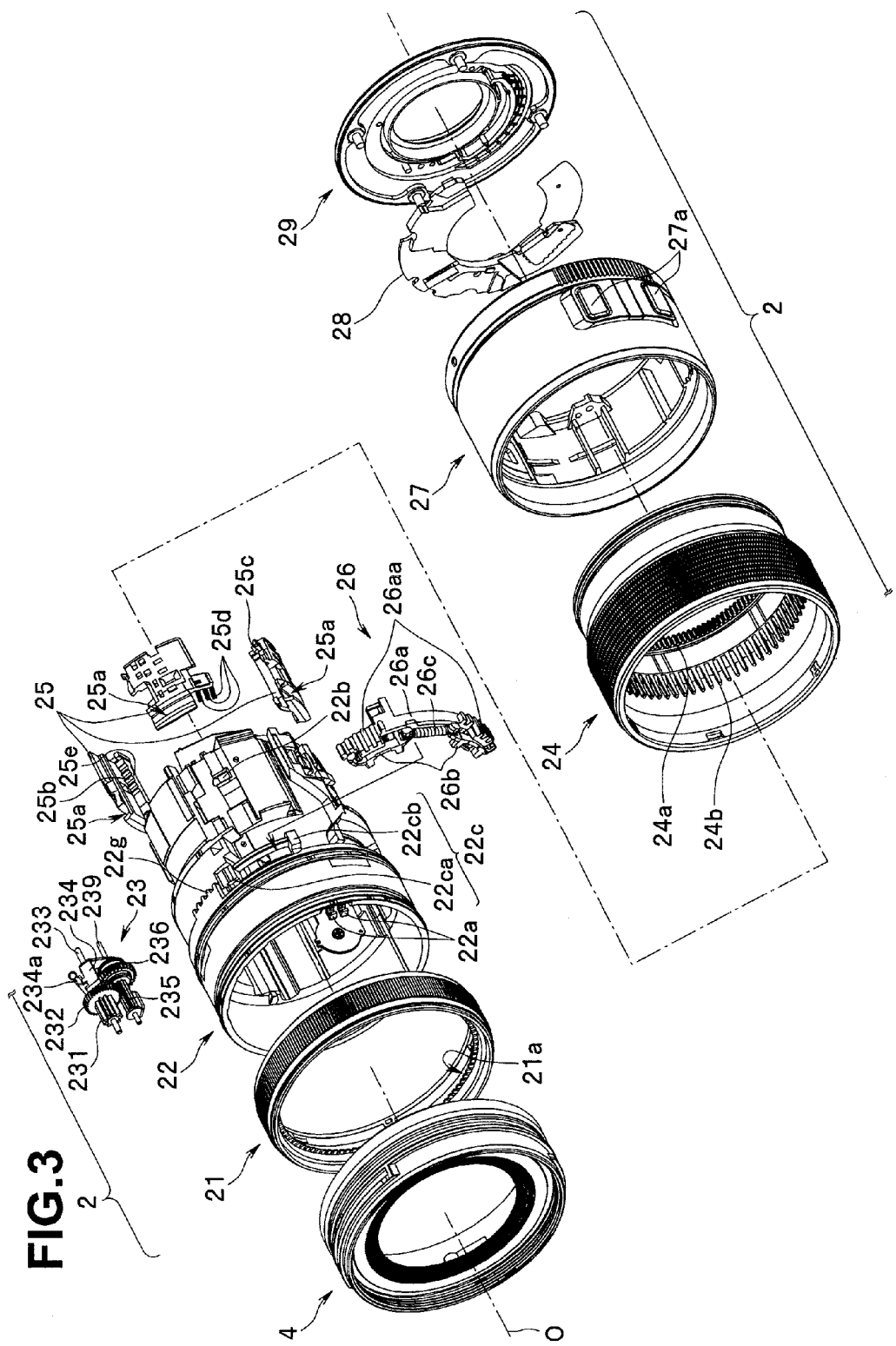
FIG. 3 is an exploded perspective view taking out, and illustrating, an exterior unit among component parts of the lens barrel of FIG. 1.
Figure 4:
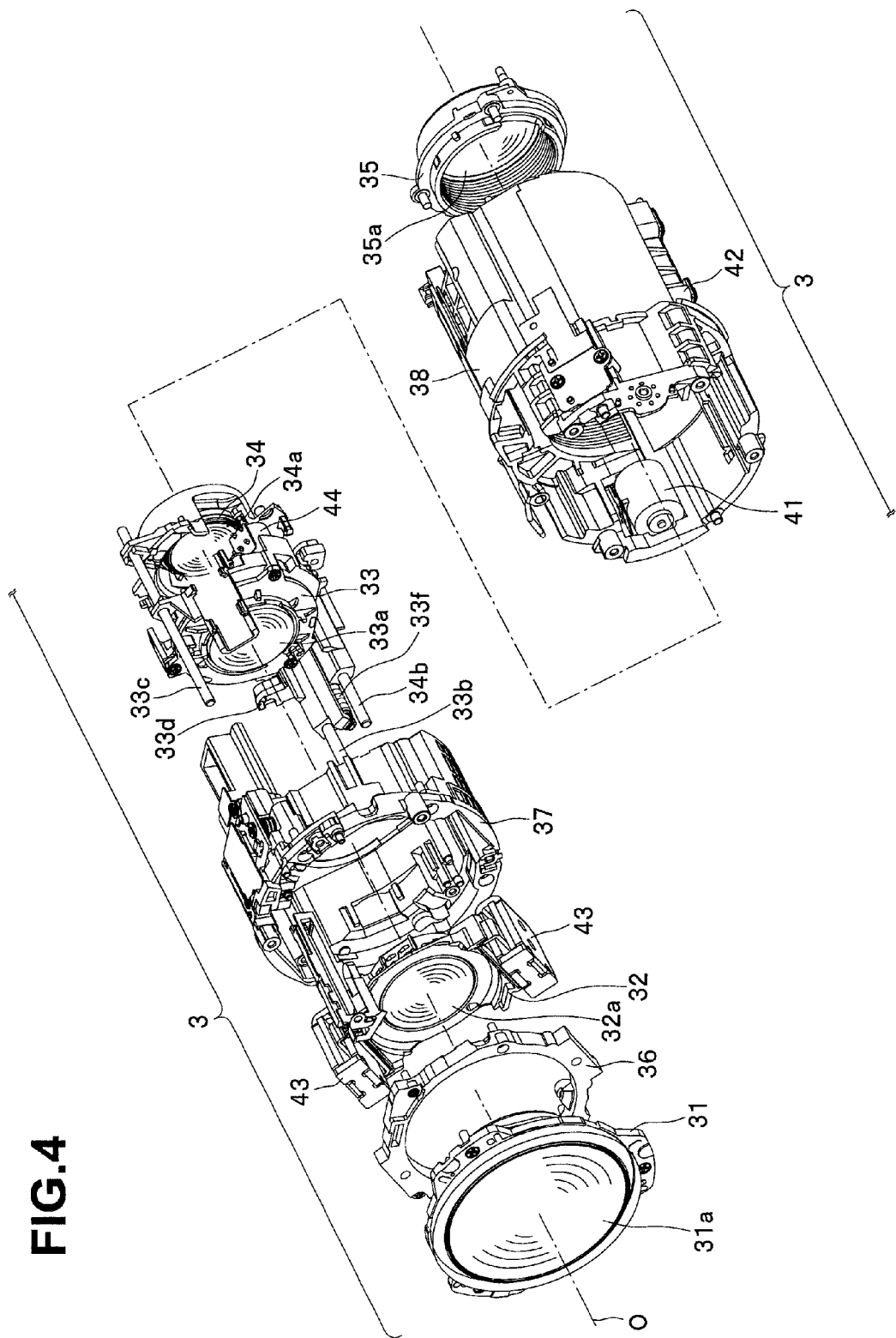
FIG. 4 is an exploded perspective view taking out, and illustrating, a lens barrel unit among component parts of the lens barrel of FIG. 1.

First, an outline configuration of the lens barrel of the present embodiment will be described below using FIGS. 1 to 4. FIG. 1 is an external perspective view of the lens barrel of an embodiment of the present invention. FIG. 2 is an exploded perspective view of the lens barrel of FIG. 1. FIG. 3 is an exploded perspective view of an exterior unit of the lens barrel of FIG. 1. FIG. 4 is an exploded perspective view of a lens barrel unit of the lens barrel of FIG. 1.

As shown mainly in FIG. 2, a lens barrel 1 of the present embodiment is configured mainly from structural units such as an exterior unit 2, a lens barrel unit 3, a front decorative barrel 4, and so on. FIG. 1 illustrates a state where each of these structural units is assembled.

As shown mainly in FIG. 3, the exterior unit 2 is configured mainly from a focus ring 21, a main barrel 22, a gear box 23, a zoom ring 24, a slide member 25, an electric zoom conjunction member 26, an exterior ring 27, a lens barrel motherboard 28, a lens mount sub-assembly 29, and so on.

Among these, the focus ring 21, the zoom ring 24, and the exterior ring 27 are, in a state where the lens barrel 1 is assembled (the state in FIG. 1), exterior component members that are disposed mainly at the outermost part and that configure the operation portion.

The focus ring 21 is formed into a substantially circular form, and is a component member that functions as an operation input member at the time of a user manually performing a focus adjustment operation by freely turning it around the optical axis O in a normal/reverse direction by manual operation. The focus ring 21 is disposed at a part near the distal end on the outer circumference side of the main barrel 22 to be turnable in normal/reverse direction with the optical axis O as the center of turning.

On the inner circumference of the focus ring 21, a comb-like portion 21a is formed around the circumference with the optical axis at the center. Correspondingly, on the side of the main barrel 22, a position detection sensor 22a formed of a photo interrupter (PI) or the like is disposed at a part opposite the comb-like portion 21a. Two position detection sensors 22a are disposed on the inner circumference of the main barrel 22, for example. Detection means that detects the turning direction or the amount of turning of the focus ring 21 is configured by the comb-like portion 21a and the position detection sensor 22a.

The zoom ring 24 is likewise formed into a substantially circular form, and is an external rotation operation ring that is configured to function as an operation input member at the time of a user manually performing a zoom operation by turning it around the optical axis O by manual operation (manual zoom mode), and also, to function, when in an electric zoom mode, as an operation input member for instructing zooming by a turning operation within a predetermined range. Furthermore, the zoom ring 24 also functions as a mode switching member at the time of the user performing an operation of switching between each mode including the electric zoom mode, the manual zoom mode, and a macro mode by slidingly moving the zoom ring 24 in the direction along the optical axis O by manual operation.

The exterior ring 27 is likewise formed into a substantially circular form, and is fixedly arranged on the lens mount sub-assembly 29 described later. A plurality of operation members 27a (two in the present embodiment) that a user operates at the time of, for example, switching between action modes related to focusing, switching between the zoom mode and the macro mode, and so on by manually performing a pressing operation from outside are disposed on the exterior ring 27.

Furthermore, the main barrel 22 has its fundamental shape formed into a substantially tubular form, and is a fundamental component member of the exterior unit 2 for holding components such as external component members (21, 24, 27) described above or each of mechanical members (23, 25, 26, and so on) described later fixedly or while allowing predetermined movement as appropriate, and also, for fixedly holding other component members (22a, and so on) and the like.

The focus ring 21, the zoom ring 24, and the exterior ring 27 are disposed on the outer circumference side of the main barrel 22 in this order from the front side. Furthermore, as illustrated in FIGS. 1, 2, 3, and so on, the front decorative barrel 4 is disposed at the foremost end portion of the main barrel 22. The front decorative barrel 4 is a front cover member that is provided to cover, in a state where the lens barrel 1 is assembled (the state in FIG. 1), the internal component members of the lens barrel 1 such that they are not exposed at the front, while allowing entering of a light flux into a shooting optical system (described later) of the lens barrel 1. The front decorative barrel 4 is therefore formed into a substantially circular form. A first lens group 31a configuring a part of the shooting optical system of the lens barrel 1 is disposed at a substantially center portion of the front decorative barrel 4 in such a way as to allow transmission of a light flux. Furthermore, the front decorative barrel 4 is disposed in such a way as to cover the front of the outer circumferential edge portion of the first lens group 31a mentioned above (see FIGS. 1 and 2).

Also, component members such as the gear box 23, the slide member 25, the electric zoom conjunction member 26, and the like, are held in the main barrel 22.

Among these, the gear box 23 and the slide member 25 are component members that are interposed between the zoom ring 24 and a third group frame moving mechanism (to be described later in detail. See signs 41, 41a to 41d, 45, and so on in FIG. 5), and that are in conjunction with an operation input (a sliding operation in the optical axis direction) of the zoom ring 24. The gear box 23 and the slide member 25 move, in the same direction, in conjunction with a sliding movement operation of the zoom ring 24 in the direction of the optical axis O. Furthermore, when in the manual zoom mode, the gear box 23 and the slide member 25 become a part of a mechanical portion for driving force transmission switching that is for transmitting a turning driving force based on a turning operation input for the zoom ring 24 around the optical axis O to the third group frame moving mechanism via the gear box 23. On the other hand, when in the electric zoom mode, the gear box 23 and the slide member 25 are component parts having a function of interrupting a driving force transmission path between the zoom ring 24 and the third group frame moving mechanism (to be described later in detail).

Note that the gear box 23 and the slide member 25 are configured to be able to move in conjunction with the zoom ring 24. Also, the gear box 23 is configured to have a plurality of gears (a drive gear, an intermediate gear, and so on) that form a gear train that is rotated by receiving an operation input from outside through the zoom ring 24.

Furthermore, the zoom ring 24 has a function of an external rotation operation ring for switching between a first state (the manual zoom mode) where one of a plurality of drive gears configuring the gear box 23 meshes with a motor gear (a screw gear) 41d described later and rotates a screw (a screw member) 41b described later, and drives a third lens frame 33, which is a moving frame described later and a first frame, in the direction of the optical axis O, and a second state (the electric zoom mode) where the one of a plurality of gears configuring the gear box 23 does not mesh with the motor gear (the screw gear) 41d.

Furthermore, the electric zoom conjunction member 26 is a component part configuring a part of detection means that detects the turning direction and the amount of turning of the zoom ring 24 by working in conjunction with turning operation input for the zoom ring 24 around the optical axis O when in the electric zoom mode. Note that the electric zoom conjunction member 26 is configured to be released from being in conjunction with the zoom ring 24 and to not work when in the manual zoom mode (to be described later in detail).

Note that a further detailed configuration of each of the component members (23, 25, 26) held in the main barrel 22 will be described later.

The lens barrel motherboard 28 is a component part formed of a flexible printed board or the like on which a control circuit 28x (see FIG. 34 described later) formed of a plurality of electrical parts or the like, such as a CPU for performing electrical control of the lens barrel 1, a motor driver circuit 28y (see FIG. 34 described later), and the like are mounted. When the lens barrel 1 is in the state of being attached to a corresponding camera (not illustrated), the control circuit 28x of the lens barrel motherboard 28 performs various types of control by performing communication with a control circuit on the camera side (not illustrated).

The lens mount sub-assembly 29 is a connecting member on the lens barrel 1 side that is configured to secure mechanical and electrical connection to a camera (not illustrated) to which the lens barrel 1 is to be applied. The lens mount sub-assembly 29 has an electrical contact portion for communication (not illustrated) for the communication to be performed with the control circuit or the like on the camera side.

As shown in FIG. 4, the lens barrel unit 3 is configured mainly from a first lens frame 31 for fixedly holding a first lens group 31a, a second lens frame 32 for fixedly holding a second lens group 32a, a third lens frame 33 for fixedly holding a third lens group 33a, a fourth lens frame 34 for fixedly holding a fourth lens group 34a, a fifth lens frame 35 for fixedly holding a fifth lens group 35a, a front cover ring 36, a front fixing barrel 37, a fixing barrel 38, and so on.

The first lens group 31a is a fixed lens group fixed at the most distal end portion of the lens barrel 1. The first lens group 31a is fixedly held by the first lens frame 31 which is formed into a circular form. The first lens frame 31 is fixed at a front end portion of the front fixing barrel 37 with the front cover ring 36 in-between.

The second lens group 32a is a lens group contributing mainly to a focus adjustment action (focusing). The second lens group 32a is fixedly held by the second lens frame 32. The second lens frame 32 is configured to be freely movable in the direction along the optical axis O by a hanger shaft 32b disposed in parallel with the optical axis with both ends supported by inner fixing portions of the front fixing barrel 37 (see FIG. 6).

A plurality of focusing motors 43 are disposed at predetermined portions on the outer circumference side of the second lens frame 32. As the focusing motors 43, linear actuators such as voice coil motors or the like are adopted, for example. The second lens frame 32 moves in the direction along the optical axis O by the focusing motors 43 being drive-controlled at a predetermined timing, and focusing is thereby performed.

The third lens group 33a and the fourth lens group 34a are lens groups contributing mainly to zooming (magnification change action). The third lens group 33a is fixedly held by the third lens frame 33 (a first lens holding frame). The fourth lens group 34a is fixedly held by the fourth lens frame 34 (a second lens holding frame). These third lens frame 33, which is a first frame, and the fourth lens frame 34, which is a second frame, are moving frames disposed inside the front fixing barrel 37 and the fixing barrel 38 in such a way that each can move separately and individually in the direction along the optical axis O, that is, in an optical axis direction.

The third lens frame 33 is a first moving frame that is disposed to be freely movable in the direction along the optical axis O by a third group main shaft 33b. Furthermore, rotation of the third lens frame 33 around third group main shaft 33b is restricted by a rotation stopper shaft 33c. Likewise, the fourth lens frame 34 is a second frame that is disposed to be freely movable in the direction along the optical axis O by a fourth group main shaft 34b, and is a second moving frame. Furthermore, rotation of the fourth lens frame 34 around the optical axis O is restricted by the rotation stopper shaft 33c.

Note that the distal end sides and the rear end sides of the third group main shaft 33b, the fourth group main shaft 34b, and the rotation stopper shaft 33c are fixedly supported, in parallel with the optical axis, at the inner fixing portions of the front fixing barrel 37 and the inner fixing portions of the fixing barrel 38, respectively. Also, the third lens frame 33 holds a diaphragm blade 44a, a diaphragm driving motor 44, and the like configuring a diaphragm mechanism.

The front fixing barrel 37 and the fixing barrel 38 are connected in the direction along the optical axis O, and the fundamental form is thereby shaped into a substantially tubular form, and a component obtained by a state where the two fixing barrels 37 and 38 are connected is the fundamental component member of the lens barrel unit 3. The linked component of the two fixing barrels 37 and 38 supports, within itself, the second, the third, and the fourth lens frames 32, 33, and 34 to be freely movable in the direction along the optical axis O, and fixedly holds the third group frame moving mechanism for moving the third lens frame 33 in the direction of the optical axis O (to be described later in detail; a third group motor 41 and its drive mechanism: see FIG. 5), a fourth group frame moving mechanism for moving the fourth lens frame 34 in the direction of the optical axis O (to be described later in detail; a fourth group motor 42 and its drive mechanism: see FIG. 6), and the like.

Note that the detailed configurations of the third group frame moving mechanism and the fourth group frame moving mechanism for moving the third lens frame 33 and the fourth lens frame 34 respectively in the direction along the optical axis O will be given later.

The fifth lens group 35a is a fixed lens group that is fixed at the rearmost end portion of the lens barrel 1. The fifth lens group 35a is fixedly held by the fifth lens frame 35 which has a circular form. The fifth lens frame 35 is fixed at a rear end portion of the fixing barrel 38.

Note that, when in a state where the lens barrel 1 is assembled, each of the lens groups is arranged in such a way that the first lens group 31a, the second lens group 32a, the third lens group 33a, the fourth lens group 34a, and the fifth lens group 35a are arranged in this order from the front with coinciding optical axes. Also, in the lens barrel 1 of the present embodiment, a shooting optical system is configured from the five lens groups: the first lens group 31a, the second lens group 32a, the third lens group 33a, the fourth lens group 34a, and the fifth lens group 35a.

Figure 5:
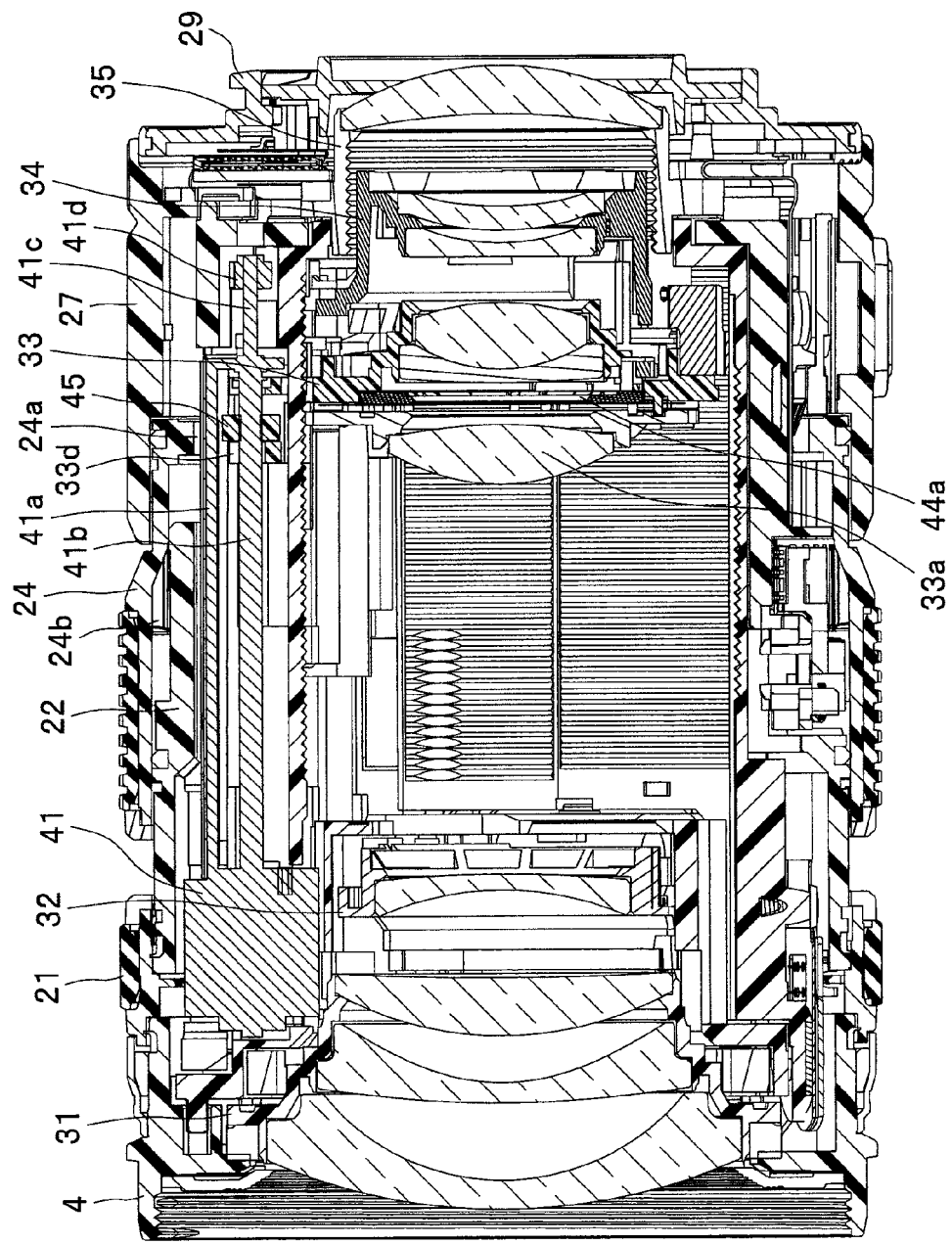
FIG. 5 is a cross-sectional view mainly illustrating a third group frame moving mechanism of an internal structure of the lens barrel of FIG. 1.
Figure 6:
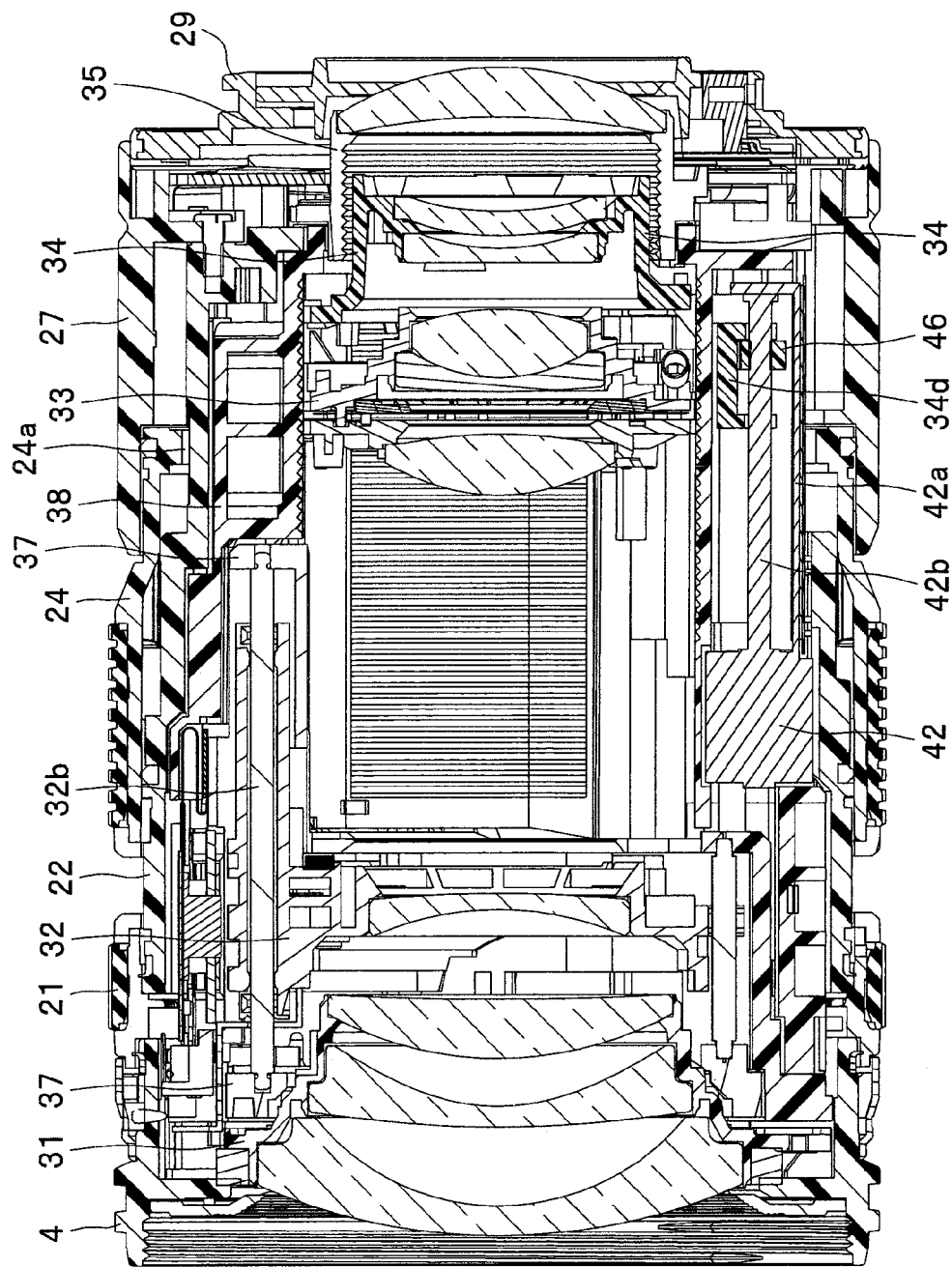
FIG. 6 is a cross-sectional view mainly illustrating a fourth group frame moving mechanism of the internal structure of the lens barrel of FIG. 1.

Next, the third group frame moving mechanism and the fourth group frame moving mechanism for moving the third lens frame 33 and the fourth lens frame 34 respectively in the direction along the optical axis O will be described in detail below using mainly FIGS. 4, 5, and 6.

First, the configuration of the third group frame moving mechanism will be described in detail. As shown in FIG. 5, the third group frame moving mechanism is a mechanism unit that is configured, including a third group motor 41, which is a drive source for driving the third lens frame 33 (the first moving frame) in the direction along the optical axis O and which is a first motor configured from a stepper motor.

The third group motor 41 is fixedly installed at a portion near the inner distal end of the front fixing barrel 37. A turning shaft of the third group motor 41 extends along the optical axis O toward the back. A bracket 41a is provided, to the third group motor 41, that is fixed around the turning shaft. The bracket 41a has an arm portion extending toward the back from a surface which is one surface of the third group motor 41 and from which the turning shaft extends (a motor end portion) along the optical axis O, and, as illustrated in FIG. 5, is a sheet metal processed member whose cross-sectional surface is formed into a channel shape.

A predetermined portion of the third group motor 41 near the distal end of the turning shaft is pivotally supported to be freely turnable by a support portion provided at a distal end of the arm portion of the bracket 41a. At the turning shaft of the third group motor 41, a screw 41b is formed in parallel with the optical axis O in a region from the motor end portion (proximal end portion) to the support portion of the bracket 41a. The screw 41b is a screw member that rotates in accordance with the rotation of the third group motor 41 (the stepper motor). The screw member has a spiral groove on the outer circumference surface.

Furthermore, at the distal end portion of the turning shaft of the third group motor 41, which is a first rotary drive source, a shaft portion 41c is provided which is formed by elongating the screw 41b. The shaft portion 41c is formed so as to protrude toward the back from the shaft support portion at the bracket 41a. Also, at a portion near the distal end, which is an end portion, of the shaft portion 41c, a motor gear 41d, which is a pinion gear, is fixedly installed. That is, the motor gear 41d is a gear (a screw gear) that is provided at an end portion of the screw 41b (the screw member) and that rotates in accordance with the rotation of the screw 41b (the screw member).

On the other hand, a third group nut 45 (a first screw member) having a female screw is screwed with the screw 41b. The third group nut 45 is restricted in terms of turning by a fixing portion (not illustrated) of the fixing barrel 38, that is, the third group nut 45 is maintained in a non-turnable state, while being freely movable in the direction along the optical axis O in accordance with the turning of the screw 41b. By the third group nut 45 pressing a part of the third lens frame 33 at the time of moving in the direction along the optical axis O, rotation of the screw 41b serves to cause the third lens frame 33 to move in the optical axis direction. That is, the third group nut 45 can be said to be a pressure member.

In other words, the third group nut 45 is a nut member that is maintained in a non-turnable state, and that screws with the screw 41b (the screw member), moves in the direction along the optical axis O in accordance with the rotation of the screw 41b (the screw member), and presses and moves the third lens frame 33 (the first moving frame) in the direction along the optical axis O.

Note that a component part configured from the screw 41b provided to an output shaft of the third group motor 41 (a first motor), the third group nut 45, which is screwed with the screw 41b and whose rotation is restricted, and the motor gear 41d, which is a pinion gear provided to the screw 41b, is referred to as first drive means.

The first drive means is for driving the third lens frame 33 (the first moving frame) by being mechanically connected to the third group motor 41 (the first motor) and by being driven by the rotation of the third group motor 41 (the first motor) or the zoom ring 24 (the external rotation operation ring).

Also, a component part configured from an inner gear 24a (an internal gear) of the zoom ring 24 (the external rotation operation ring), the motor gear 41d, and a gear (a spur gear portion 23b) that meshes with the motor gear 41d and that is capable of rotationally driving the motor gear 41d is referred to as second drive means.

With the second drive means, when the zoom ring 24 is at a position corresponding to the manual zoom mode (the second position), the inner gear 24a of the zoom ring 24 that is rotationally driven by a manual driving force meshes with the spur gear portion 23b, and the motor gear 41d is driven by the spur gear portion 23b.

The second drive means is configured to be able to be mechanically connected or non-connected to the first drive means, and when in a state of mechanical connection with the first drive means (that is, when in a state where the spur gear portion 23b of the gear box 23 and the motor gear 41d are meshed with each other), drives the third lens frame 33 (the first moving frame) via the first drive means by the turning of the zoom ring 24 (the external rotation operation ring).

For its part, the third lens frame 33 is spring-biased toward the fourth lens frame 34 by a coil spring 33f (see FIG. 4) that expands/contracts in the direction along the optical axis O and that is suspended between the third lens frame 33 and the fourth lens frame 34 described later.

With this configuration, the third group nut 45 is in a state of being constantly abutted against a nut contact portion 33d (see FIGS. 4 and 5) of the third lens frame 33. The nut contact portion 33d is formed into a hook form, and the screw 41b is inserted through a substantially center portion of the hook form.

With the configuration as above, when the turning shaft of the third group motor 41 is turned in a normal/reverse direction, the third group nut 45 screwed with the screw 41b moves forward or backward on the screw 41b in the direction along the optical axis O. Also, the third lens frame 33 is configured to be able to move independently of other lens frames in the direction along the optical axis O toward the same direction as the third group nut 45, by the third group nut 45 moving forward or backward. The work at this time is the work at the time of the electric zoom mode (to be described later in detail).

Furthermore, in a state where the third group motor 41 is not energized, if the motor gear 41d is turned by rotational torque that is greater than detent torque (holding torque where a motor coil is not excited) of the third group motor 41, the screw 41b can be turned in the same direction. The third group nut 45 that is screwed with the screw 41b is configured to be thereby able to move forward or backward on the screw 41b in the direction along the optical axis O, and to cause the third lens frame 33 to move independently of other lens frames in the direction along the optical axis O toward the same direction as the third group nut 45. The work at this time is the work at the time of the manual zoom mode (to be described later in detail).

Next, a configuration of the fourth group frame moving mechanism will be described in detail. As shown in FIG. 6, the fourth group frame moving mechanism is a mechanism unit that is configured, including a fourth group motor 42, which is a drive source for moving the fourth lens frame 34

(the second moving frame) in the direction along the optical axis O and which is a second motor configured from a stepper motor.

The fourth group motor 42, which is a second rotary drive source, is fixedly installed at a portion near the inner front end of the fixing barrel 38. A turning shaft of the fourth group motor 42 extends along the optical axis O toward the back (in parallel with the optical axis O). Similar to the structure around the third group motor 41 described above, a bracket 42a is provided in a linked manner, to the fourth group motor 42, that turnably supports the periphery of the distal end portion of the turning shaft to be freely turnable. The bracket 42a has an arm portion extending toward the back from a surface which is one surface of the fourth group motor 42 and from which the turning shaft extends, and, as illustrated in FIG. 6, is a sheet metal processed member whose cross-sectional surface is formed into a channel shape.

The distal end portion of the turning shaft of the fourth group motor 42 is turnably supported to be freely turnable at a support portion on the distal end side of the bracket 42a. At the turning shaft of the fourth group motor 42, a screw 42b, which is a second screw member, is formed in a region from a proximal end portion to a shaft support portion of the bracket 42a (that is, substantially all region from a proximal end portion to a distal end of the turning shaft). Therefore, the screw 42b rotates in accordance with the rotation of the fourth group motor 42.

A fourth group nut 46 having a female screw is screwed with the screw 42b. The fourth group nut 46 is restricted in terms of turning by a fixing portion (not illustrated) of the fixing barrel 38, while being freely movable in the direction along the optical axis O in accordance with the turning of the screw 42b.

For its part, the fourth lens frame 34 is spring-biased toward the third lens frame 33 by the coil spring 33f that expands/contracts in the direction along the optical axis O and that is suspended between the fourth lens frame 34 and the third lens frame 33.

With this configuration, the fourth group nut 46, which is a second pressure member, is in a state of being constantly abutted against a nut contact portion 34d (see FIG. 6) of the fourth lens frame 34. The nut contact portion 34d is formed into a hook form, as with the nut contact portion 33d described above, and the screw 42b is inserted through a substantially center portion of the hook form.

With the configuration as described above, when the turning shaft of the fourth group motor 42 is turned in a normal/reverse direction, the fourth group nut 46 screwed with the screw 42b moves forward or backward on the screw 42b in the direction along the optical axis O. Also, the fourth lens frame 34 is configured to be able to move independently of other lens frames in the direction along the optical axis O toward the same direction as the fourth group nut 46, by the forward/backward movement of the fourth group nut 46. That is, the second frame is driven in the optical axis direction under the driving force of the fourth group motor 42, which is a second rotary drive source, via drive means configured from the screw 42b and the fourth group nut 46.

Note that the fourth lens frame 34 is controlled to be driven, in conjunction with the movement of the third lens frame 33, in a predetermined movement direction with a predetermined amount of movement. That is, the movement direction and the amount of movement of the fourth lens frame 34 are set by the fourth group motor 42 being drive-controlled according to the movement direction and the amount of movement of the third lens frame 33. Accordingly, the fourth lens frame 34 is always moved by the driving force of the fourth group motor 42 in both cases of the electric zoom mode and the manual zoom mode.

Next, of each of the component members held in the main barrel 22, the structures of the gear box 23, the slide member 25, and the electric zoom conjunction member 26 will be particularly described in detail below using FIGS. 7 to 14.

First, the slide member 25 is, as described above, one of the component members that work in conjunction with the operation input (a slide operation in the optical axis direction and a turning operation around the optical axis) of the zoom ring 24. When working in conjunction with the zoom ring 24, the slide member 25 functions in the following manner. That is, the slide member 25
(1) configures, when the zoom ring 24 is slidingly moved in the direction along the optical axis O, a part of a click mechanism (to be described later in detail; see FIGS. 11 to 14, and so on) that functions as positioning means that performs positioning of the zoom ring 24 in the direction of the optical axis O.

Also, the slide member 25
(2) functions, when slidingly moving in the same direction in response to the sliding movement of the zoom ring 24 in the direction along the optical axis O, as a part of zoom mode switch means that performs switching between the electric zoom mode and the manual zoom mode by performing coordination or interruption of a driving force transmission path between the zoom ring 24 and the third group frame moving mechanism in coordination with the gear box 23 (to be described later in detail; see FIGS. 7, 8, 12, 14, and so on).

Furthermore, the slide member 25
(3) functions as a part of zoom mode position detection means (to be described later in detail; see FIGS. 3, 15, and so on) that detects the position of the zoom ring 24 in the direction along the optical axis O.

The slide member 25 is configured to be able to move in the same direction as the zoom ring 24 by following the sliding movement of the zoom ring 24 in the direction of the optical axis O without restricting the turning of the zoom ring 24 around the optical axis O. The slide member 25 is, as a whole, a thin plate and is formed into a curved form along the outer circumference surface of the main barrel 22, and is formed of a mold member or the like, for example. A plurality of the slide members 25 are disposed at predetermined intervals (in the present embodiment, three around the optical axis O at intervals of an angle of 120 degrees) with respect to the outer circumference surface of the main barrel 22.

Figure 11:
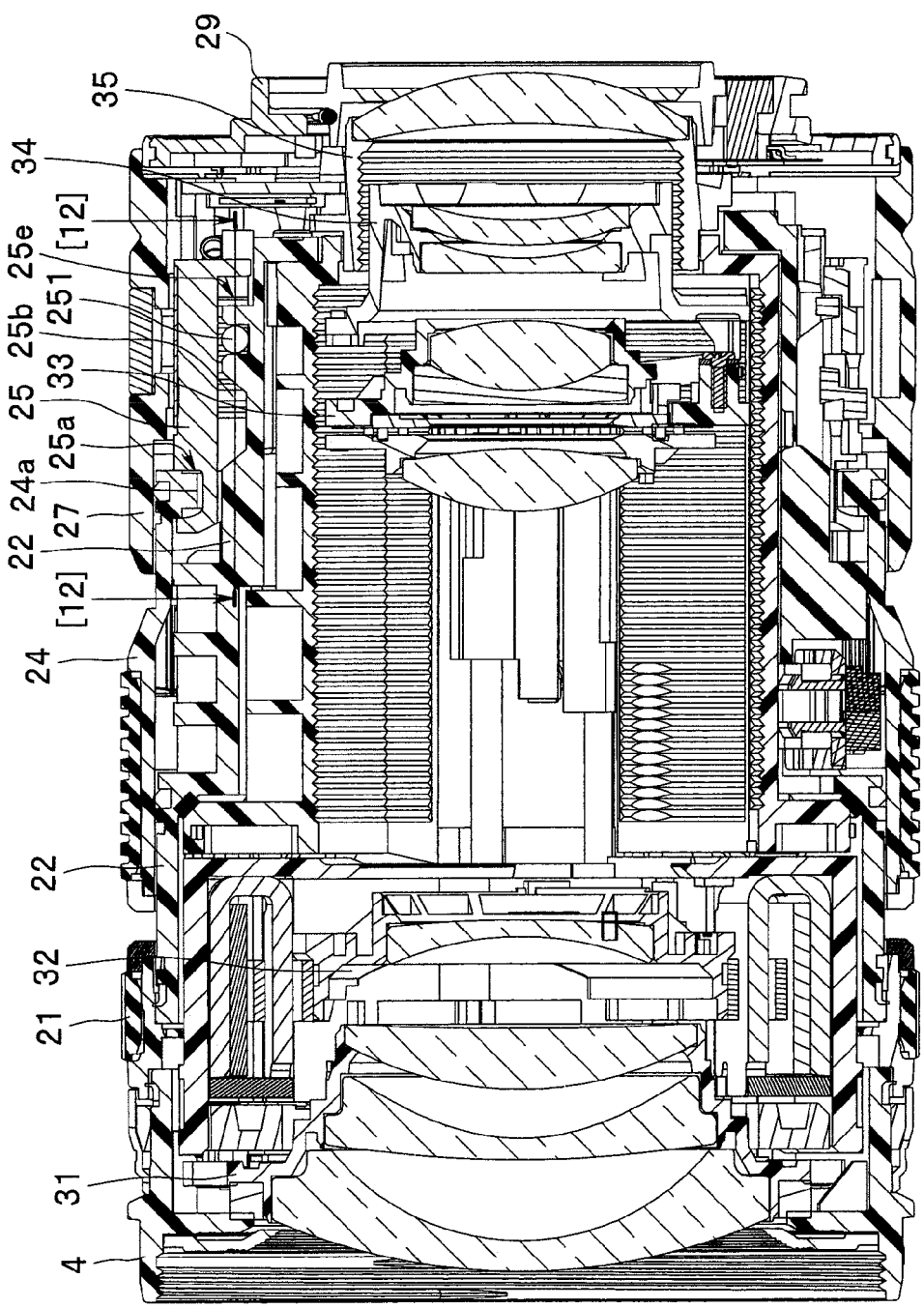
FIG. 11 is a cross-sectional view mainly illustrating a configuration of a link portion of a zoom ring and the slide member of the internal structure of the lens barrel of FIG. 1, and illustrating arrangement of each component member at the time of the electric zoom mode.
Figure 13:
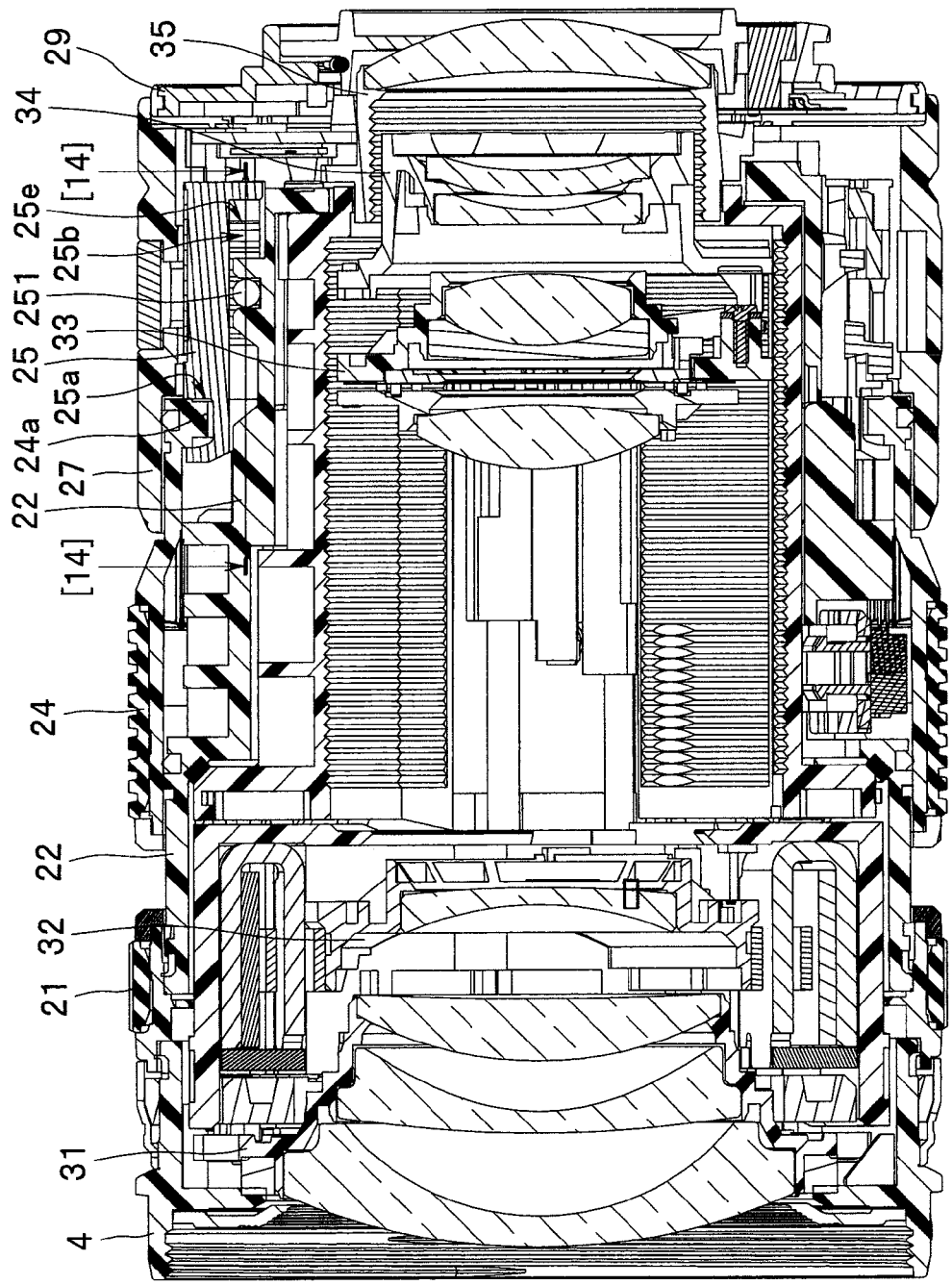
FIG. 13 is a cross-sectional view mainly illustrating a configuration of the link portion of the zoom ring and the slide member of the internal structure of the lens barrel of FIG. 1, and illustrating arrangement of each component member at the time of the manual zoom mode.

As shown in FIGS. 3, 11, 13, and so on, at a portion near the distal end on the outer circumference surface of the slide member 25, a concave circumferential groove 25a along the circumferential direction is formed. The inner gear 24a, which is an internal gear that is provided on the inner circumference surface near the rear end of the zoom ring 24 and that is jutting out toward the inside, is fitted with the circumferential groove 25a. Accordingly, even when the zoom ring 24 turns, the inner gear 24a turns along the circumferential groove 25a, and thus, the turning of the zoom ring 24 around the optical axis O is not restricted.

The slide member 25 further has a rectangular convex portion 25e along the direction of the optical axis O, on the surface on the main barrel 22 side, and the rectangular convex portion 25e is slidably fitted in a groove portion, of the main barrel 22, along the direction of the optical axis O. The slide member 25 thereby moves in the direction of the optical axis O when the zoom ring 24 moves in the direction of the optical axis O.

On the other hand, when the zoom ring 24 slidingly moves in the direction along the optical axis O, the slide member 25 also slidingly moves in the same direction due to the inner gear 24a and the circumferential groove 25a being fitted together. In other words, the slide member 25 is configured to follow the sliding movement of the zoom ring 24 without restricting the turning of the zoom ring 24.

The slide member 25 formed in this manner configures a part of a click mechanism that performs positioning so that the zoom ring 24 is constantly positioned at a predetermined position when slidingly moving in the direction along the optical axis O. The click mechanism is a component for realizing function (1) of the functions of the slide member 25 mentioned above.

Figure 12:
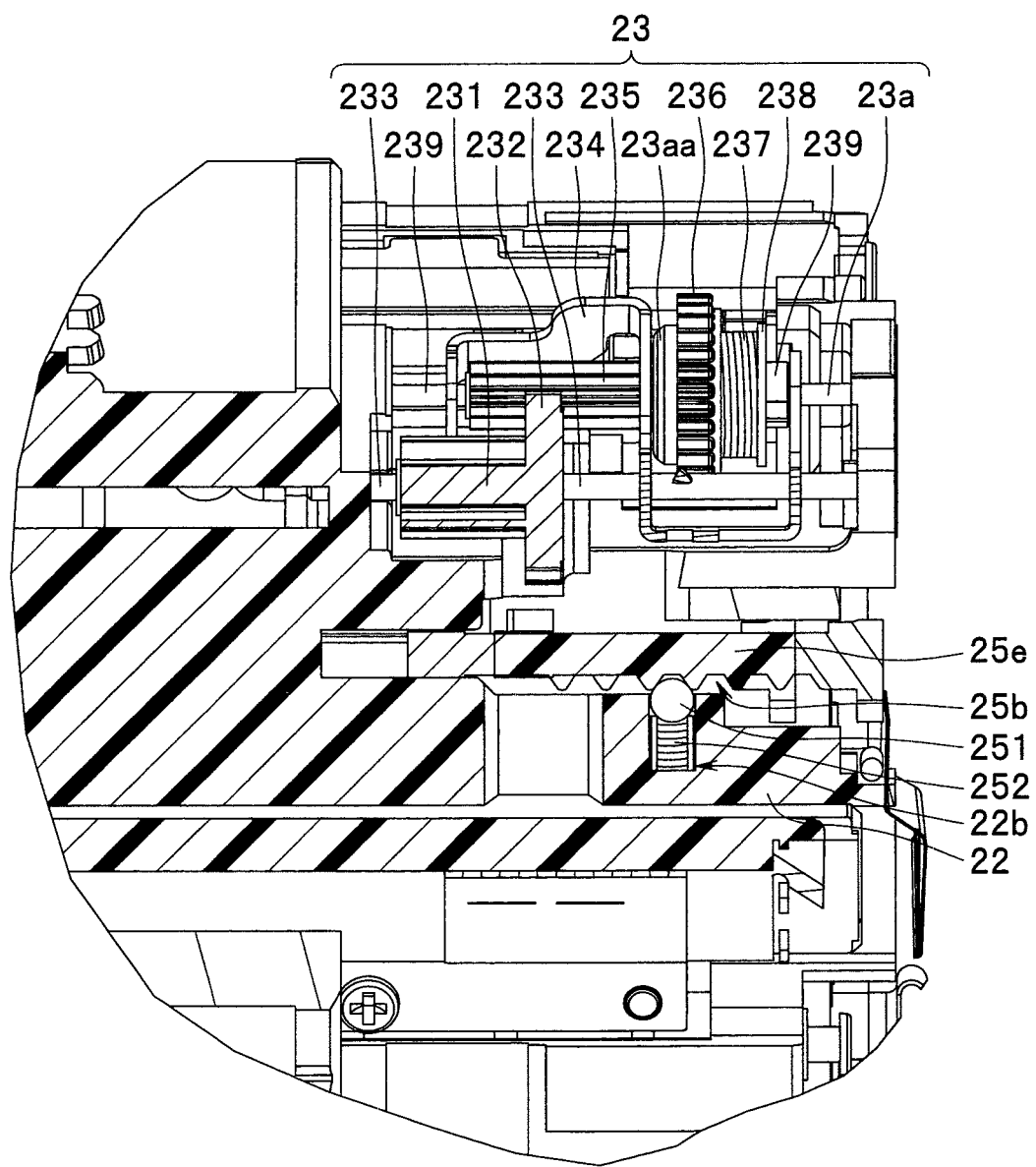
FIG. 12 is an enlarged cross-sectional view of major portions along [12]-[12] in FIG. 11.
Figure 14:
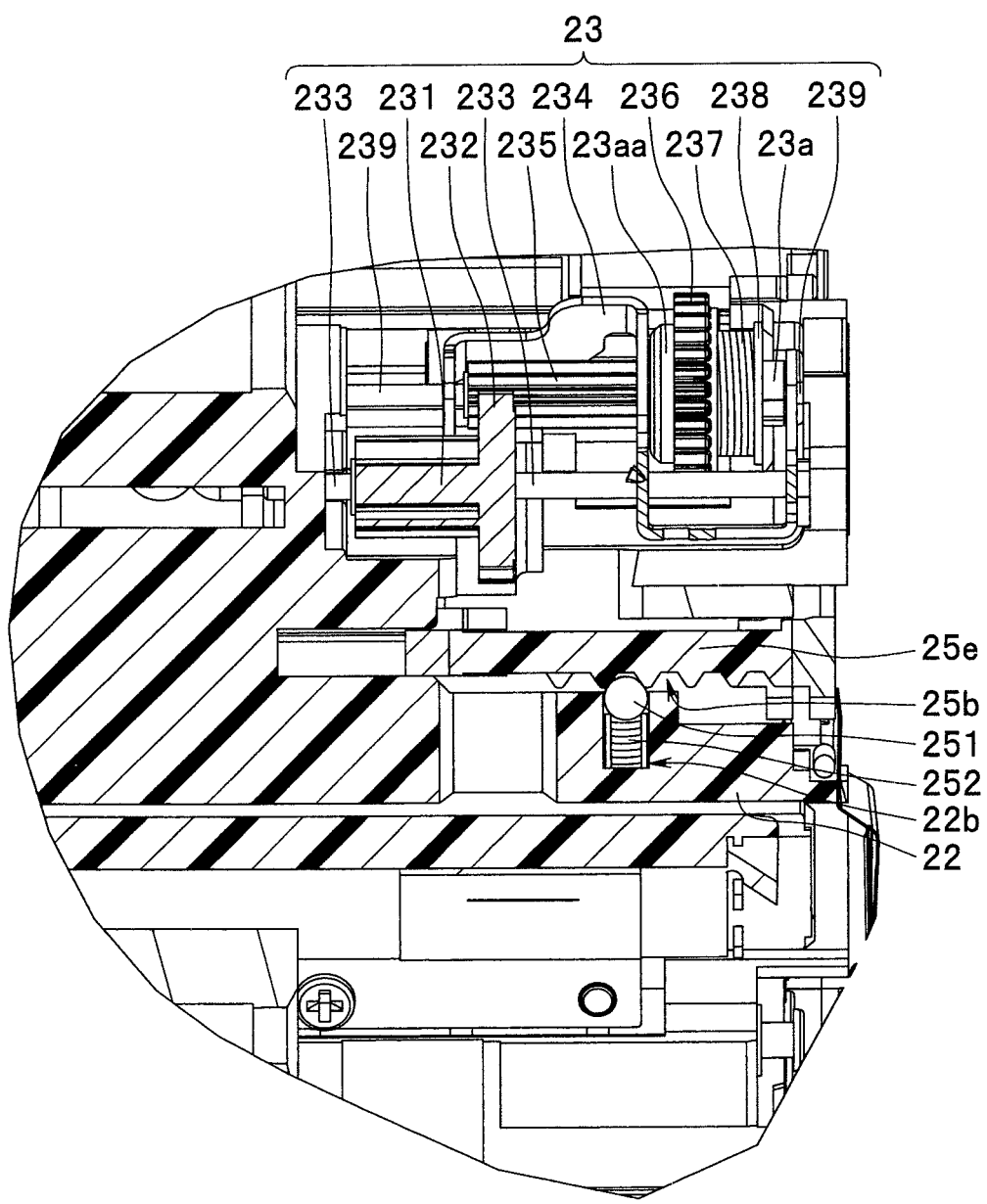
FIG. 14 is an enlarged cross-sectional view of major portions along a line [14]-[14] in FIG. 13.

As shown in FIGS. 3, 12, 14, and so on, the rectangular convex portion 25e, which extends in the direction along the optical axis O and protrudes toward the inner circumference surface side, is formed on the slide member 25. A plurality of click grooves 25b (at least three in the present embodiment) that are concave-convex with respect to the circumferential direction of the lens barrel 1 and that are arranged next to each other in the direction along the optical axis O are formed on the side surface of the rectangular convex portion 25e.

On the other hand, a concave cut-out portion 22b (see FIGS. 12 and 14) is formed on the outer circumference surface of the main barrel 22 at a fixing portion facing the click groove 25b. An extensible click spring 252 is stored in a compressed manner within the concave cut-out portion 22b, and also, a click ball 251 is stored and arranged near an opening part of the concave cut-out portion 22b so that the click spring 252 will not jump toward the outside by its elastic force. A part of the click ball 251 is arranged at a position protruding outward from the opening part of the concave cut-out portion 22b. In this case, the opening of the concave cut-out portion 22b is formed to have a smaller diameter than the diameter of the click ball 251 so that the click ball 251 will not jump outside by the elastic force of the click spring 252. The click ball 251 is thereby constantly in a state where it is pressed toward the opening of the concave cut-out portion 22b by the elastic force of the click spring 252, and also, a head part of the click ball 251 is constantly in a state of being abutted against one of the plurality of click grooves 25b.

With this configuration, when the zoom ring 24 slidingly moves in the direction along the optical axis O, the slide member 25 moves in conjunction in the same direction, and the click ball 251 protrudes/retracts through the concave cut-out portion 22b while being abutted against the groove inner surface of the click groove 25b. When the click ball 251 falls into a state of being impacted into the click groove 25b, the click ball 251 will be in a state of being pressed against the click groove 25b with a predetermined amount of force of the elastic force of the click spring 252. The sliding movement of the slide member 25 and the zoom ring 24 in the direction along the optical axis O is thereby restricted by a predetermined amount of force by the click spring 252. Accordingly, the slide member 25 and the zoom ring 24 are constantly positioned at predetermined arbitrary positions.

Normally, the click ball 251 is in a state of being impacted into any one of the plurality of click grooves 25b. When a user slidingly moves the zoom ring 24 in this state in the direction along the optical axis O, the slide member 25 follows the movement of the zoom ring 24 in the direction along the optical axis O and slidingly moves in the same direction. Then, the parts of the slide member 25 where the plurality of click grooves 25b are formed also move in the same direction. At this time, the click ball 251 has the click spring 252 compressed by pushing of a slope portion of the click groove 25b. The click ball 251 is thereby pushed inside the concave cut-out portion 22b. When the click ball 251 moves over a top part of a click groove 25b and starts impacting into the adjacent click groove 25b, the click spring 252 expands by its elastic force and works to press the click ball 251 and cause the click ball 251 to impact into the adjacent click groove 25b. The click ball 251 is maintained in this manner in a state of being impacted into one of the plurality of click grooves 25b by the elastic force of the click spring 252. With the click mechanism, the slide member 25 and the zoom ring 24 are thereby positioned in the direction along the optical axis O.

In the lens barrel 1 of the present embodiment, the position of the zoom ring 24 which has been slidingly moved to the foremost part in the optical axis direction is the predetermined position in the macro mode (provisionally referred to as an Mc position. Referred to also as a third position). Also, the position of the zoom ring 24 slidingly moved toward the back in the optical axis direction by one click from the predetermined position in the macro mode (the Mc position) is the predetermined position in the electric zoom mode (provisionally referred to as an EZ position. Also, this position is referred to as a zoom middle position or a first position). The position of the zoom ring 24 slidingly moved toward the back in the optical axis direction by further one click from the predetermined position in the electric zoom mode (the EZ position) is the predetermined position in the manual zoom mode (provisionally referred to as an MZ position. Also, this position is referred to as a second position). That is, the zoom ring 24, which is the external rotation operation ring, can be moved in the optical axis direction, and to the first position, the second position, or the third position on the optical axis.

Next, a configuration for realizing function (2) of the functions of the slide member 25 mentioned above will be described in detail.

As described above, when the zoom ring 24 slidingly moves in the direction along the optical axis O, the slide member 25 moves in the same direction. The slide member 25 is configured so as to be followed by the gear box 23.

That is, the gear box 23 has a plurality of intermediate gears that are interposed between the zoom ring 24 and the motor gear 41d, and that transmit the driving force of rotational operation input from the zoom ring 24 to the motor gear 41d.

Note that the gear box 23 has clutch means that, when in the manual zoom mode (the first state), that is, when the external rotation operation member is at the second position, meshes with the internal gear portion (the inner gear 24a) of the zoom ring 24 and the drive gear (the spur gear portion 236, which is one of the gears of the gear box 23 and which is an output gear), and when in the electric zoom mode (the second state), that is, when the external rotation operation member is at the first position, releases the meshing with the two mentioned above (24a, 236).

Figure 7:
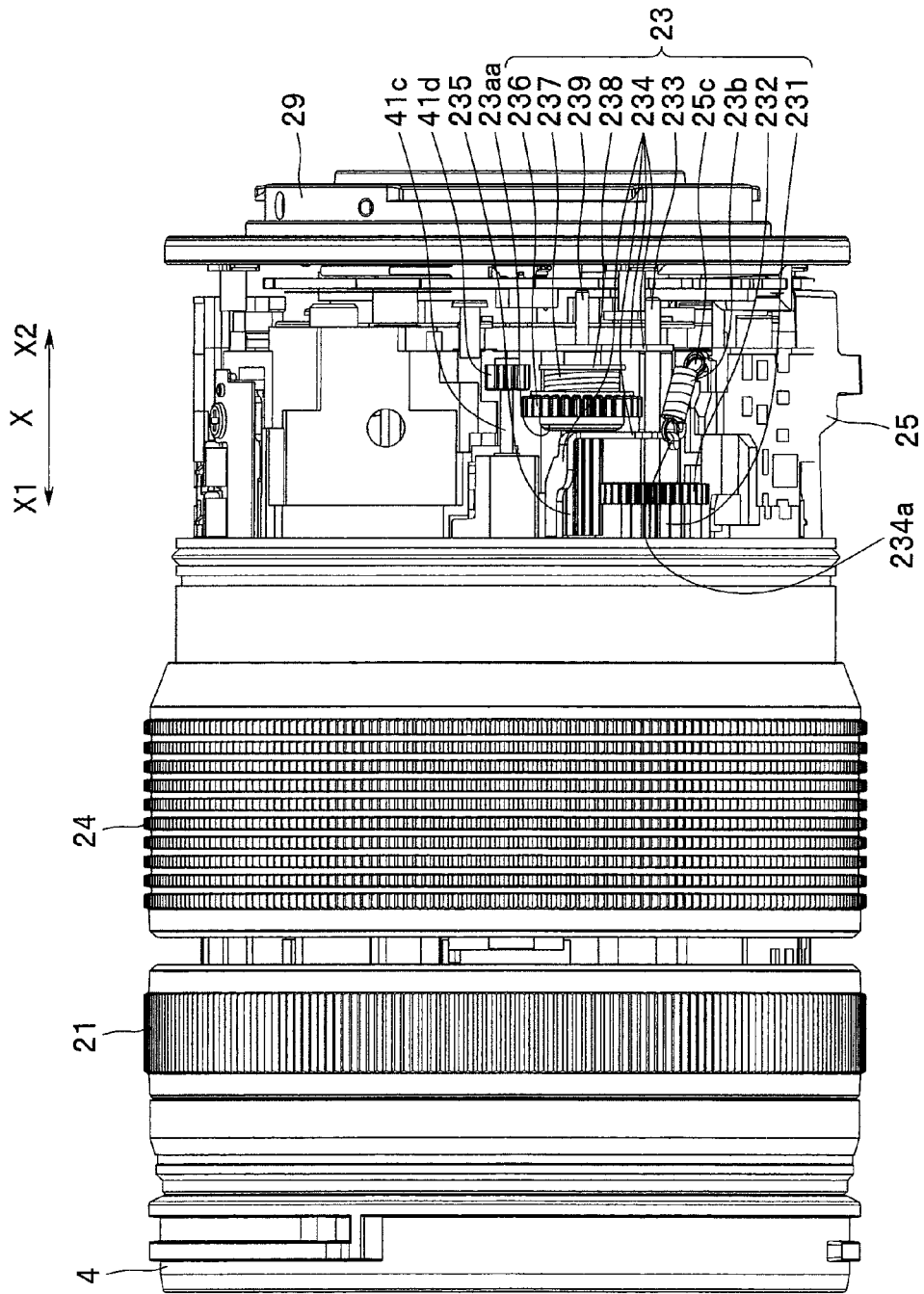
FIG. 7 is a plan view mainly illustrating structures of a slide member and a gear box of the internal structure of the lens barrel of FIG. 1, and illustrating arrangement of each component member at the time of an electric zoom mode.
Figure 8:
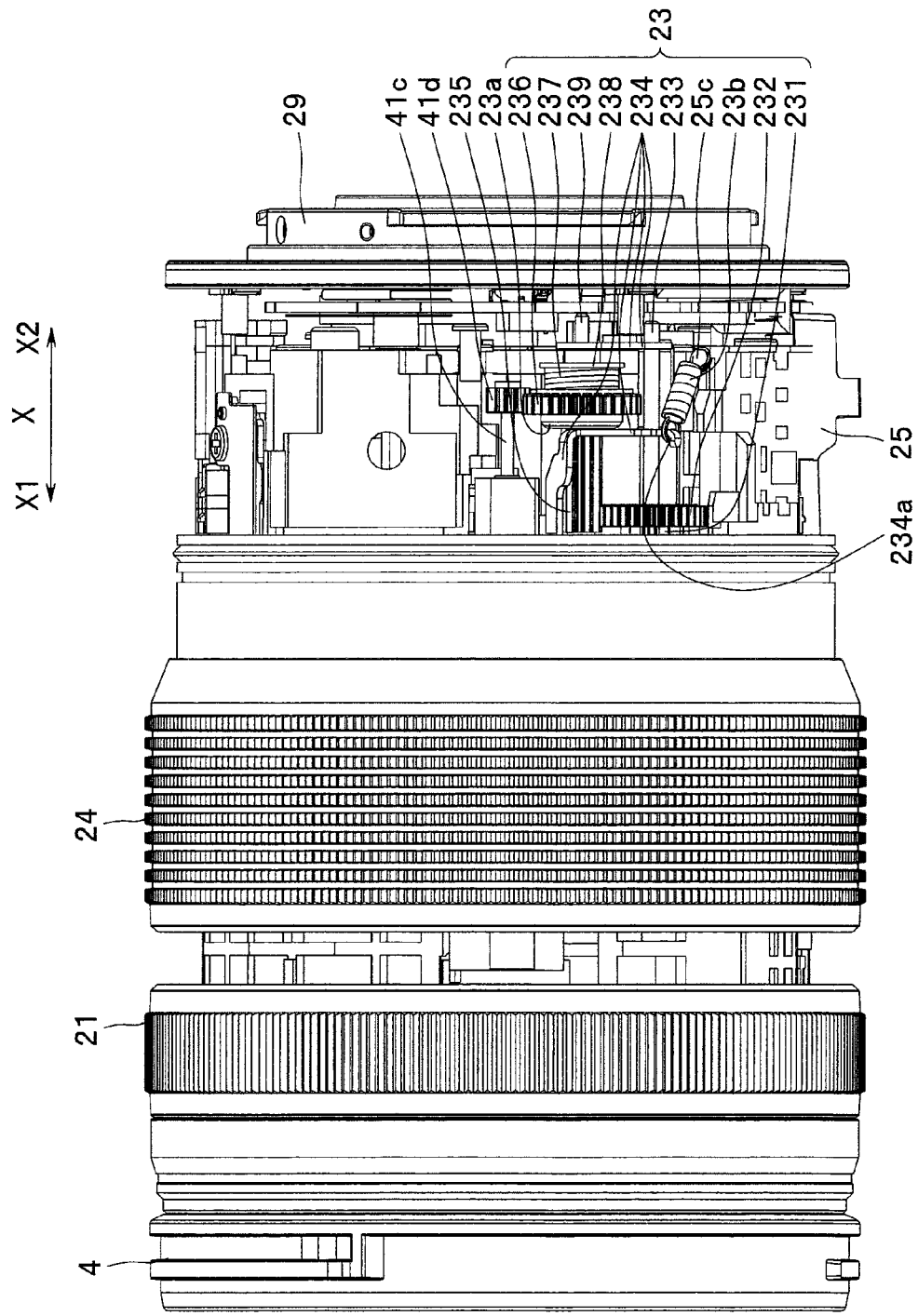
FIG. 8 is a plan view mainly illustrating structures of the slide member and the gear box of the internal structure of the lens barrel of FIG. 1, and illustrating arrangement of each component member at the time of a manual zoom mode.

That is, as shown in FIGS. 7, 8, and so on, a contractable coil spring 23b is suspended between the slide member 25 and the gear box 23. That is, one end of the coil spring 23b is hung on a spring hanger portion 25c of the slide member 25, and the other end is hung on a spring hanger portion 234a of the gear box 23. The slide member 25 and the gear box 23 are thereby constantly abutted against each other by being pulled toward each other by the elastic force of the coil spring 23b, and are normally integrated into one.

For its part, as described above, the slide member 25 is positioned at one of the plurality of predetermined positions in the optical axis direction by a predetermined amount of force of the elastic force of the click spring 252 by the click mechanism. The clicking force of the click spring 252 of the click mechanism is set to be greater than the elastic force of the coil spring 23b. Accordingly, the slide member 25 resists the amount of force of the coil spring 23b and its positioning by the click mechanism is maintained, and also, both of the slide member 25 and the gear box 23 are set such that the relative arrangement interval is constant at all times.

With this configuration, when the slide member 25 moves in the same direction in accordance with the sliding movement of the zoom ring 24 in the direction along the optical axis O, the gear box 23 also moves, in conjunction, in the same direction by the elastic force of the coil spring 23b. Also, a configuration is achieved where the disengagement of gears within the gear box 23 is performed in conjunction with the sliding movement of the gear box 23 in the same direction. As such, the gear box 23 functions as clutch means that disengages the driving force transmission path between the zoom ring 24 and the motor gear 41d.

That is, a configuration is achieved where coordination or interruption of the driving force transmission path between the zoom ring 24 and the third group frame moving mechanism (to be described later) is performed by the zoom ring 24 taking a forward/backward action by the sliding movement in the direction along the optical axis O, and switching between zoom modes can be performed.

Now, the details of the internal structure of the gear box 23 will be given below using FIGS. 7 to 10, 12, 14, and so on.

The gear box 23 is configured from a first gear sub-assembly including a shaft-type gear portion 231 as an input gear, a spur gear portion 232, and a first gear shaft 233, a second gear sub-assembly including a shaft-type gear portion 235, a spur gear portion 236, a pressure spring 237, a spring bracket washer 238, a second gear shaft 239, and a shaft main body 23a having a friction transmission portion 23aa, a support member 234, and so on. The second gear sub-assembly can be said to have friction means that transmits the rotation of the shaft-type gear portion 235 to the spur gear portion 236 by friction.

The support member 234 is formed into a predetermined shape by a sheet-metal bending member or the like, and is a component part to be the main body of the gear box 23. The support member 234 pivotally supports the first gear sub-assembly and the second gear sub-assembly to be freely turnable.

In the first gear sub-assembly, the shaft-type gear portion 231 and the spur gear portion 232 are integrally, fixedly installed on the same axis by the first gear shaft 233. The first gear shaft 233 is turnably supported to be freely turnable with respect to the fixing part of the support member 234. At the same time, both ends of the first gear shaft 233 are turnably supported to be freely turnable with respect to the fixing portion of the main barrel 22. Therefore, the first gear sub-assembly itself is at a fixed position with respect to the main barrel 22. At the same time, the support member 234 of the gear box 23 is disposed to be freely movable in the direction of sliding of the zoom ring 24 (direction along the optical axis O) with the first gear shaft 233 of the first gear sub-assembly as a spindle.

The shaft main body 23a is a component part forming the main body of the second gear sub-assembly. The shaft main body 23a is formed by integral linking of a long shaft portion 23ab formed from a comparatively long hollow tubular member that is in parallel with the optical axis direction, a friction transmission portion 23aa with a disc form, and a short shaft portion 23ac formed from a hollow tubular member that is relatively short compared to the long shaft portion 23ab.

Figure 9:
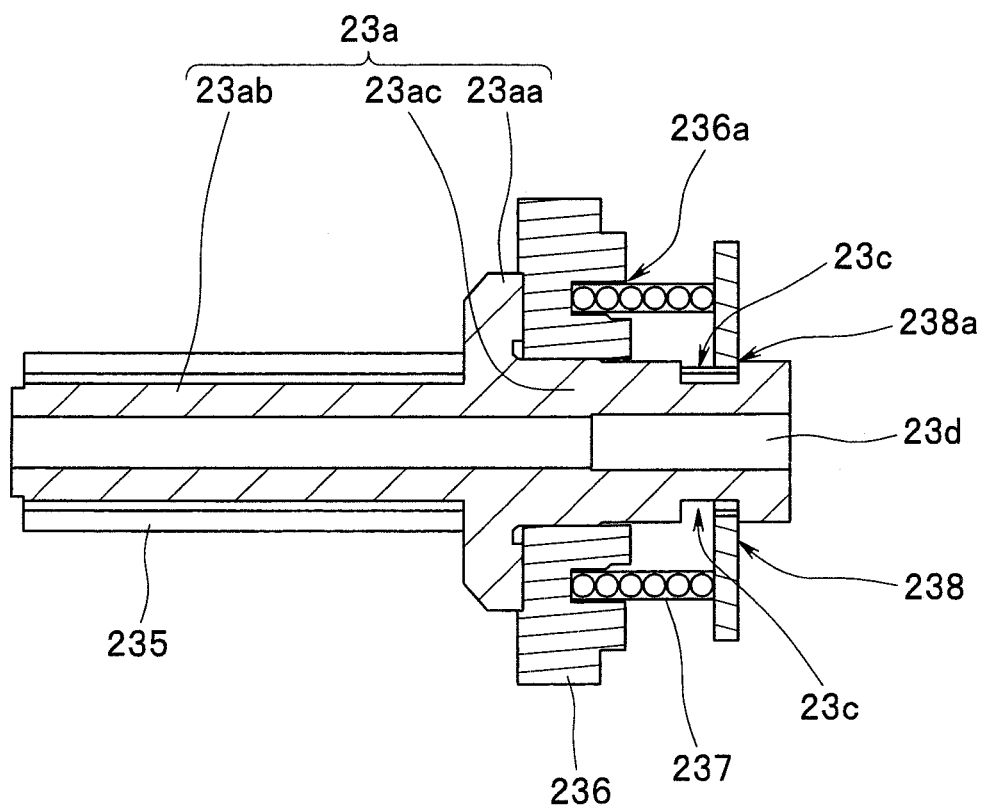
FIG. 9 is a cross-sectional view taking out, and illustrating, only a part of components (a friction structure part) of the gear box among internal structural members of the lens barrel of FIG. 1.

As shown in FIG. 9, the shaft-type gear portion 235 is fixedly installed on the outer circumference of the long shaft portion 23ab. The spur gear portion 236 is fitted/disposed on the short shaft portion 23ac in the longitudinal direction in such a way as to be freely moving/rotating. The friction transmission portion 23aa is interposed between the long shaft portion 23ab and the short shaft portion 23ac. The diameter of the short shaft portion 23ac is set to be smaller than the diameter of the friction transmission portion 23aa.

Also, the shaft main body 23a is formed into a shape where each of the component parts is provided in an integrally linked manner such that the center axis of the friction transmission portion 23aa, and each of the center axes of the long shaft portion 23ab and the short shaft portion 23ac are substantially coincident.

As shown in FIG. 9, a perforating hole 23d perforating the long shaft portion 23ab, the friction transmission portion 23aa, and the short shaft portion 23ac is formed in the shaft main body 23a configured in this manner. As shown in FIGS. 12, 14, and so on, the second gear shaft 239 is inserted and arranged in the perforating hole 23d. Also, both ends of the second gear shaft 239 are turnably supported to be freely turnable with respect to the fixing portion of the main barrel 22.

Figure 10:
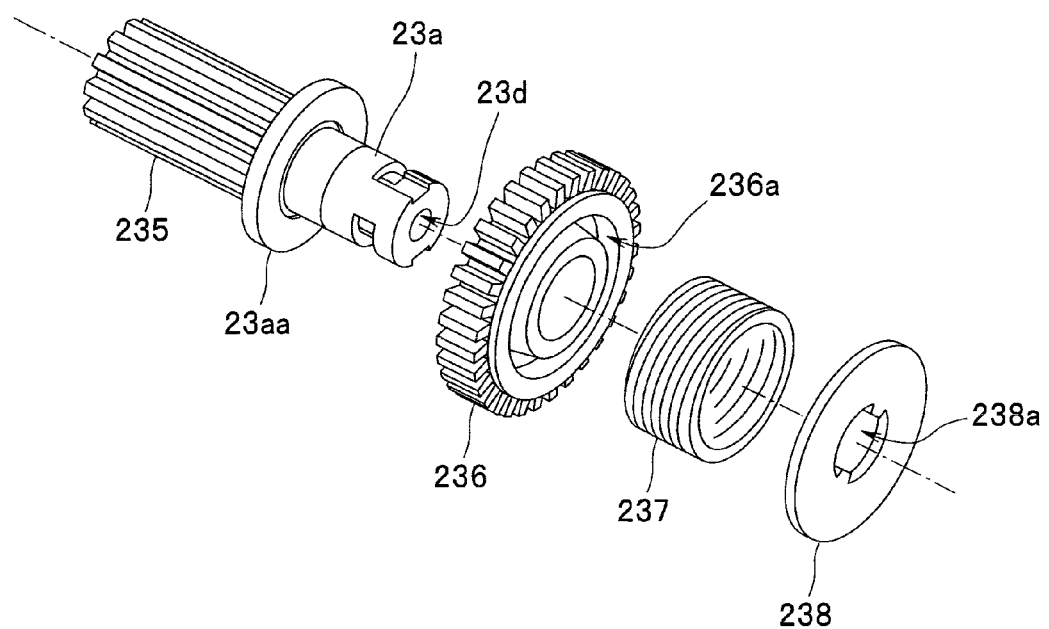
FIG. 10 is an exploded perspective view of major portions taking out, and illustrating, only a part of components (a friction structure part) of the gear box among the internal component members of the lens barrel of FIG. 1.

Furthermore, as shown in FIGS. 9 and 10, a circumferential groove 236a is provided in a drilled manner on one surface of on the spur gear portion 236 at a portion approximately in the middle of the radial direction. One end of a coil-shaped pressure spring 237 is inserted and arranged in the circumferential groove 236a.

On the other hand, a circumferential groove 23c is formed on the outer circumference surface of the short shaft portion 23ac near one end portion. The spring bracket washer 238 is impacted into the circumferential groove 23c in such a way as to be freely movable within a predetermined range in the axial direction of the short shaft portion 23ac For this reason, the circumferential groove 23c is formed to have a groove width that just allows, in a state where the spring bracket washer 238 is impacted, the spring bracket washer 238 to move in the axial direction of the short shaft portion 23ac within a predetermined range. The spring bracket washer 238 is formed of a substantially disc-shaped thin plate member, and a hole 238a through which the short shaft portion 23ac can be inserted is formed at a substantially center portion.

Note that a retaining structure is provided for the circumferential groove 23c and the hole 238a of the spring bracket washer 238, which is for allowing the spring bracket washer 238 to be impacted into the circumferential groove 23c after the short shaft portion 23ac is inserted through the hole 238a of the spring bracket washer 238, and also, for maintaining this state (the state where the spring bracket washer 238 is impacted into the circumferential groove 23c) and preventing the spring bracket washer 238 from coming out of the short shaft portion 23ac. The details of the specific configuration of the retaining structure will be omitted since they are not directly related to the gist of the present invention, and in the present embodiment, a conventionally well-known technique (a technique related to a retaining structure of a disc-shaped member with respect to a shaft member) is assumed to be used.

The pressure spring 237 is interposed between the spring bracket washer 238 and the spur gear portion 236 by such configuration. Here, one end surface of the pressure spring 237 is in the state of being inserted and arranged in the circumferential groove 236a of the spur gear portion 236, and the other end surface of the pressure spring 237 is in the state of being held down by the spring bracket washer 238. In this state, the pressure spring 237 is in a slightly compressed state.

Therefore, in the second gear sub-assembly, the spur gear portion 236 is in a state of being inserted and arranged while being in a state of being able to move in the axial direction of the short shaft portion 23*ac*, and also, the spur gear portion 236 is pressed toward the friction transmission portion 23*aa* by the spring bracket washer 238 via the pressure spring 237. With this configuration, the second gear sub-assembly has a shape where the shaft-type gear portion 235 and the spur gear portion 236 are integrated into one via the shaft main body 23*a*, and both gear portions 235 and 236 are thereby configured to be turnable in the same direction and on the same axis. Also, at this time, if an excessive load or the like higher than the bias force of the pressure spring 237 is applied to the shaft-type gear portion 235, for example, slipping occurs between the shaft-type gear portion 235 and the spur gear portion 236, and thus, the spur gear portion 236 is configured to turn independently while slipping and following the rotation of the shaft-type gear portion 235 and the shaft main body 23*a*. As described, the gear box 23 is configured to function as a so-called slip clutch mechanism.

When the gear box 23 configured in this manner is in a state of being assembled with the main barrel 22 of the lens barrel 1, the inner gear 24*a* of the zoom ring 24 is meshed with the shaft-type gear portion 231 of the first gear sub-assembly of the gear box 23.

Thus, when a turning operation is performed on the zoom ring 24 around the optical axis O, the shaft-type gear portion 231 of the first gear sub-assembly turns in conjunction, and also, the spur gear portion 232 of the first gear sub-assembly turns in the same direction.

The spur gear portion 232 of the first gear sub-assembly is meshed with the shaft-type gear portion 235 of the second gear sub-assembly. Accordingly, if the spur gear portion 232 of the first gear sub-assembly turns, as described above, the shaft-type gear portion 235 of the second gear sub-assembly meshed with the spur gear portion 232 turns, and at the same time, the spur gear portion 236 of the second gear sub-assembly also turns in the same direction.

If, at this time, the zoom ring 24 is arranged at a position corresponding to the manual zoom mode (the state illustrated in FIG. 8), the spur gear portion 236 of the second gear sub-assembly is meshed with the motor gear 41*d*. Accordingly, in this state, an operation input for the zoom ring 24 in a turning direction is configured to cause the motor gear 41*d* to turn via the first gear sub-assembly and the second gear sub-assembly of the gear box 23. With this configuration, the driving force based on turning operation input for the zoom ring 24 is transmitted to the third group frame moving mechanism via the gear box 23, and manual zooming is thereby enabled.

As described, in the manual zoom mode, a configuration is achieved where the third lens frame 33 is moved in the direction along the optical axis O by turning the zoom ring 24 in a normal/reverse direction around the optical axis O. In this configuration, if, for example, the zoom ring 24 is kept turning in one direction, the third group nut 45 will eventually reach one end of the screw 41*b* and will not be able to move further. If the zoom ring 24 is made to turn further in the same direction in such a situation, an excessive load is applied to the driving force transmission path between the zoom ring 24 and the screw 41*b* via the gear box 23, resulting in possible breakage.

However, in the lens barrel 1 of the present embodiment, since a slip clutch mechanism is provided in the gear box 23, as described above, even if an excessive load is applied to the gear box 23 due to turning operation input for the zoom ring 24, slipping occurs between the shaft-type gear portion 235 and the spur gear portion 236 by the work of the slip clutch mechanism. It is thereby possible to, together with reducing the excessive load, avoid the possible breakage of components of the gear box 23 and the like and continue the turning operation input for the zoom ring 24.

On the other hand, if the zoom ring 24 is arranged at a position corresponding to the electric zoom mode (the state illustrated in FIG. 7), the spur gear portion 236 of the second gear sub-assembly is in a state where meshing with the motor gear 41*d* is released. In other words, the driving force transmission path between the zoom ring 24 and the third group frame moving mechanism is in a state of being interrupted. Accordingly, in this state, the spur gear portion 236 of the second gear sub-assembly merely idles. That is, the driving force based on turning operation input for the zoom ring 24 is not transmitted to the third group frame moving mechanism, and when the lens barrel 1 is set to the electric zoom mode, manual zooming is not performed even if turning operation for the zoom ring 24 is performed.

Incidentally, in the lens barrel 1, an operation of causing the zoom ring 24 to slidingly move in the direction along the optical axis O is performed to thereby perform switching of settings between the electric zoom mode and the manual zoom mode, as described above.

Here, the driving force transmission path through the zoom ring 24, the gear box 23, and the third group frame moving mechanism in the lens barrel 1 of the present embodiment, the work at the time of coordination of the driving force transmission path and the work at the time of interruption of the same will be briefly described below based on FIGS. 7, 8, and so on.

Note that, in order to illustrate the internal structure of the lens barrel 1, FIGS. 7 and 8 illustrate a state where the exterior ring 27 is omitted from the state in which the lens barrel 1 is assembled. Also, FIG. 7 illustrates a state where the lens barrel 1 is set to the electric zoom mode. FIG. 8 illustrates a state where the lens barrel 1 is set to the manual zoom mode.

For example, it is assumed that a user performs an operation of slidingly moving the zoom ring 24 in the direction along the optical axis O (the direction of an arrow X in FIGS. 7 and 8), which is the direction of an arrow X2 in FIG. 7 when the zoom ring 24 is in a state of being set to the electric zoom mode (the state in FIG. 7).

Then, the slide member 25 also moves in the same direction by the sliding movement operation for the zoom ring 24, and the support member 234 and the second gear sub-assembly of the gear box 23 also move in the same direction. Note that, at this time, the first gear sub-assembly is at a fixed position with respect to the main barrel 22 and thus, does not move.

Then, the spur gear portion 236 of the second gear sub-assembly meshes with the motor gear 41*d* by this series of works. The driving force transmission path through the zoom ring 24, the gear box 23, and the third group frame moving mechanism in the lens barrel 1 is thereby coordinated, and the manual zoom mode is set (transition to the state in FIG. 8).

At the time of the spur gear portion 236 of the second gear sub-assembly moving in the same direction in accordance with the sliding movement of the zoom ring 24 in the direction of the arrow X2 and meshing with the motor gear 41*d* in the above manner, the two gears (236, 41*d*) do not necessarily mesh smoothly.

Thus, in the lens barrel 1 of the present embodiment, whereas the zoom ring 24 and the slide member 25 slidingly move in the direction along the optical axis O while being provided in a linked manner, the gear box 23 follows in the same direction via the coil spring 23*b* that is suspended between the support member 234 and slide member 25.

Accordingly, with this configuration, when the slide member 25 moves in the same direction following the sliding movement of the zoom ring 24 in the optical axis direction (the direction of the arrow X2), and the support member 234 and the second gear sub-assembly of the gear box 23 slidingly move in the same direction (the direction of the arrow X2), if the spur gear portion 236 of the second gear sub-assembly is abutted against the motor gear 41*d* but the two gears 236 and 41*d* do not mesh with each other due to interference between gear teeth, the zoom ring 24 will continue moving in the same direction, but the sliding movement of the support member 234 and the second gear sub-assembly will be stopped by the expansion of the coil spring 23*b*. At this time, the slide member 25 and the support member 234 (that is, the gear box 23) that have been moving in an integrally abutted state are temporarily separated. Damage due to interference between the gear teeth is prevented by this separation. Then when the relative positional relationship of the spur gear portion 236 and the motor gear 41*d* changes and the two gears 236 and 41*d* fall into a state where meshing is possible, the support member 234 and the second gear sub-assembly are pulled to the slide member 25 side by the bias force of the coil spring 23*b* in the contracting direction. The two gears 236 and 41*d* thereby fall into a meshed state.

To switch from this state, that is, the state where the zoom ring 24 is set to the manual zoom mode (the state in FIG. 8), to the electric zoom mode, a user performs an operation of slidingly moving the zoom ring 24 in the direction along the optical axis O (the direction of the arrow X in FIGS. 7 and 8), which is the direction of an arrow X1 in FIG. 8.

The slide member 25 moves in the same direction by the sliding movement operation for the zoom ring 24, and also, the support member 234 and the second gear sub-assembly of the gear box 23 move in the same direction. Also at this time, as in the case described above, the first gear sub-assembly is at a fixed position with respect to the main barrel 22, and thus does not move.

The meshing state of the spur gear portion 236 of the second gear sub-assembly and the motor gear 41*d* is released by this series of works. The driving force transmission path through the zoom ring 24, the gear box 23, and the third group frame moving mechanism in the lens barrel 1 is thereby interrupted, and the electric zoom mode is set (return to the state in FIG. 7).

As described above, the spur gear portion 236 of the second gear sub-assembly and the motor gear 41*d* are meshed only when the lens barrel 1 is in the manual zoom mode (the state illustrated in FIG. 8).

Next, a configuration for realizing function (3) (zoom mode position detection means) of the functions of the slide member 25 mentioned above will be described in detail.

Figure 15:
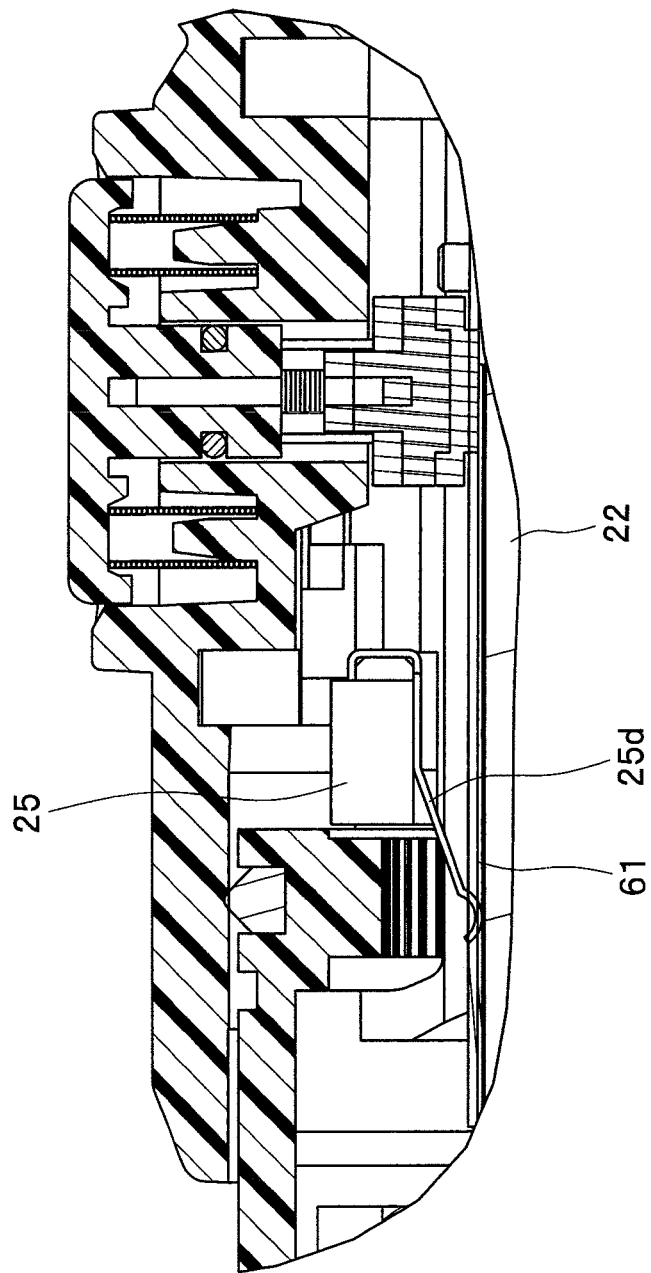
FIG. 15 is an enlarged cross-sectional view of major portions mainly illustrating, in an enlarged manner, a disposed part of zoom mode position detection means of the internal structure of the lens barrel of FIG. 1.

As illustrated in FIG. 15, contact members 25*d* for zoom mode position detection in the optical axis direction of the zoom ring 24 formed from a plurality of flat spring metal members (conductive members) or the like protruding toward the inner side surface, that is, the outer circumference surface side of the main barrel 22, are fixedly installed on the slide member 25. Note that, in the present embodiment, an example is indicated where three contact members 25*d* are disposed, as illustrated in FIG. 3, for example.

At parts facing the plurality of contact members 25*d*, which are predetermined parts on the outer circumference surface (fixing portion) on the main barrel 22 side, parts of the flexible printed board 61 configuring a part of the zoom mode position detection means and including, on the mounting surface, a plurality of electrical contact portions corresponding to the plurality of contact members 25*d* are fixedly installed. Note that the electrical contact portions related to the zoom mode position detection means, among the electrical contact portions of the flexible printed board 61, are provided in a region 61*x* illustrated in FIG. 16, and are electrical contact portions indicated by signs 61*a*, 61*b*, 61*c*, and 61*d*, respectively.

With this configuration, when the slide member 25 moves in the same direction in conjunction with the movement of the zoom ring 24 in the direction of the optical axis O and stops at a predetermined position by the work of the click mechanism, distal end contact portions of the plurality of contact members 25*d* of the slide member 25 contact predetermined parts among the plurality of electrical contact portions (61*a*, 61*b*, 61*c*, and 61*d*) on the flexible printed board 61. The position of the zoom ring 24 in the direction of the optical axis O can thereby be detected. Then, the detection result is transmitted to the control circuit 28*x* (FIG. 34) of the lens barrel motherboard 28, and, upon reception thereof, the control circuit 28*x* performs control of switching the set state of the zoom mode of the lens barrel 1 to any one of the electric zoom mode, the manual zoom mode, and the macro mode.

As described, a slide encoder functioning as the zoom mode position detection means that realizes the function of detecting the position of the zoom ring 24 in the direction along the optical axis O is configured by the plurality of contact members 25*d* of the slide member 25 and the plurality of electrical contact portions 61*a*, 61*b*, 61*c*, and 61*d* in the region 61*x* of the flexible printed board 61 fixedly installed on the main barrel 22 side.

In other words, the slide member 25 having the plurality of contact members 25*d* functions as a part of the zoom mode position detection means that detects the position of the zoom ring 24 in the direction along the optical axis O by coming into contact with predetermined parts among the plurality of electrical contact portions 61*a*, 61*b*, 61*c*, and 61*d* of the flexible printed board 61 fixedly installed on the main barrel 22 side.

Figure 16:
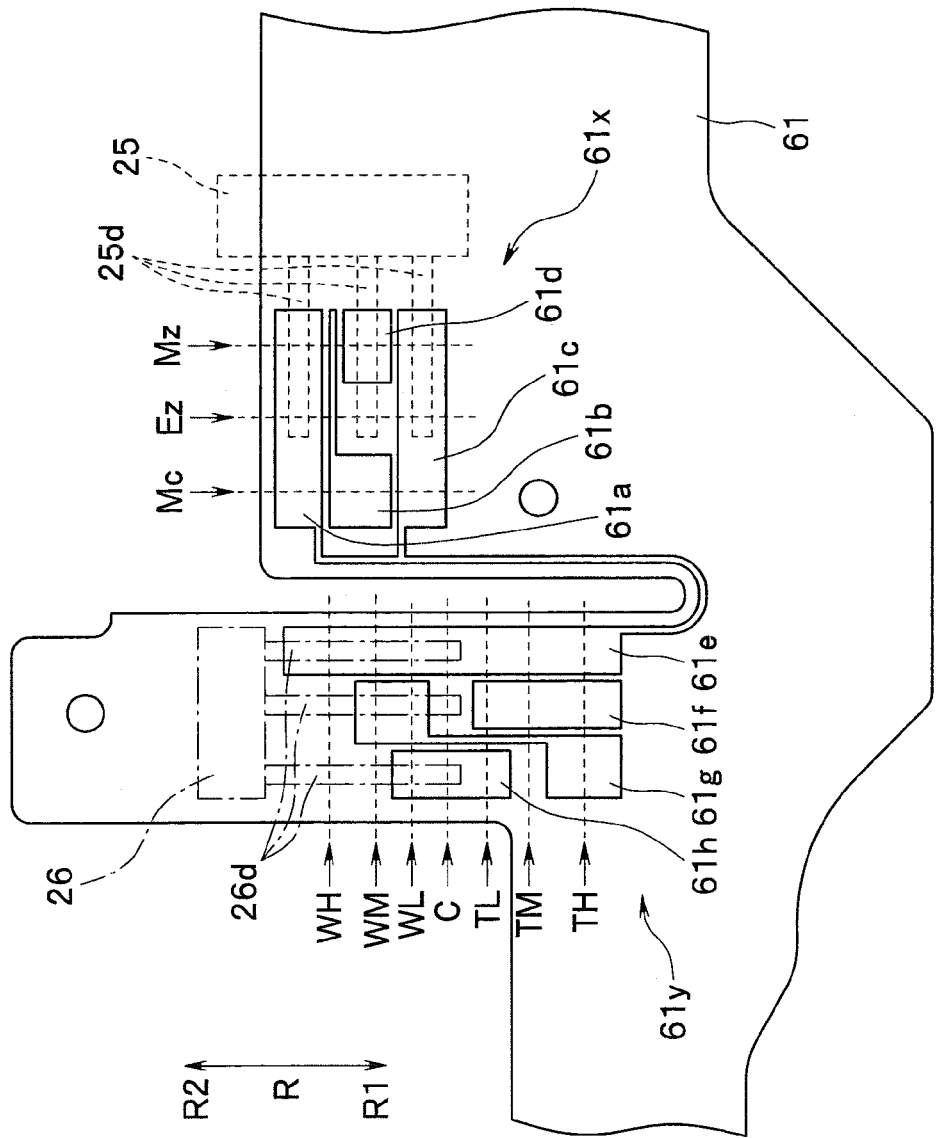
FIG. 16 is a view illustrating an example of a pattern of a plurality of electrical contacts of a flexible printed board configuring a part of the zoom mode position detection means and zoom ring position detection means of the lens barrel of FIG. 1.
Figure 17:
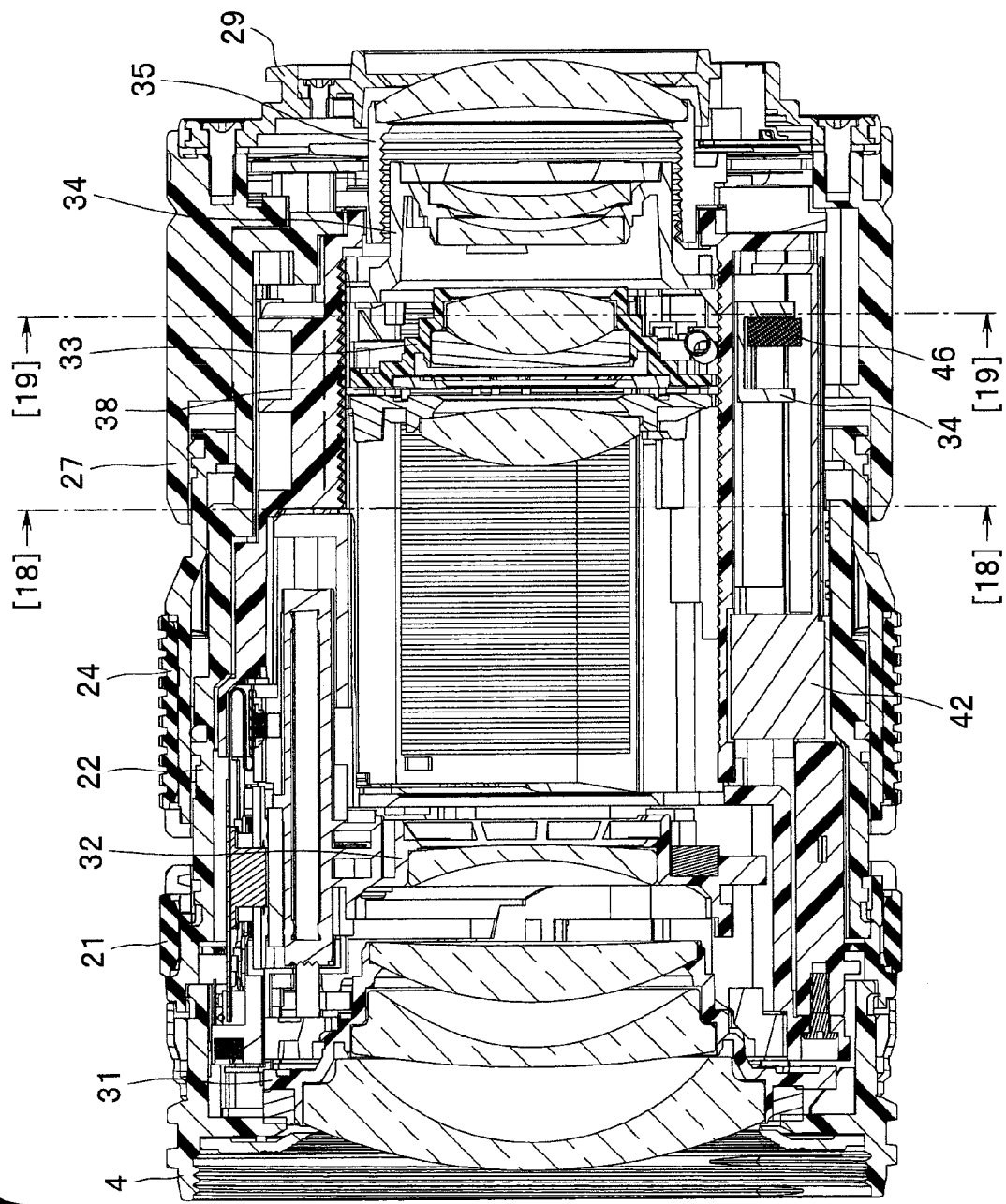
FIG. 17 is a cross-sectional view illustrating the internal structure of the lens barrel of FIG. 1.

An example of the pattern of the plurality of electrical contacts of the flexible printed board 61 configuring a part of the zoom mode position detection means is illustrated in FIG. 16. Note that, in FIG. 16, the arrangement of the slide member 25 and the plurality of contact members 25*d* provided with respect to the flexible printed board 61 are conceptually illustrated by virtual lines (two-dot chain lines).

An example is illustrated for the flexible printed board 61 illustrated in FIG. 16 where four electrical contact portions 61*a*, 61*b*, 61*c*, and 61*d* are provided. It is assumed that the flexible printed board 61 is fixedly installed on the outer circumference surface of the main barrel 22. In this case, the contact members 25*d* are assumed to move in the direction of the arrow X illustrated in FIG. 16 (the direction along the optical axis O) with respect to the flexible printed board 61. Furthermore, in the direction along the arrow X, the direction of the arrow X1 is made the front of the lens barrel 1, and the direction of the arrow X2 is made the rear of the lens barrel 1.

Accordingly, the plurality of contact members 25*d* of the slide member 25 are configured to slide in the direction of the arrow X of FIG. 16 with respect to the mounted surface of the flexible printed board 61 fixed on the main barrel 22.

Then, for example, when all of the plurality of contact members 25*d* are arranged within a predetermined range including a line indicated by a sign Mc in FIG. 16, a position corresponding to the macro mode is detected. Specifically, as illustrated in FIG. 16, when one of the contact members 25*d* is in contact with the electrical contact portion 61*a*, another one is in contact with the electrical contact portion 61*c*, and another one is in contact with the electrical contact portion 61*b*, respectively, a position corresponding to the macro mode is detected.

Also, when all of the plurality of contact members 25d are arranged within a predetermined range including a line indicated by a sign EZ in FIG. 16, a position corresponding to the electric zoom mode is detected. Specifically, as illustrated in FIG. 16, when one of the contact members 25d is in contact with the electrical contact portion 61a, another one is in contact with the electrical contact portion 61c, and another one is not in contact with any of the electrical contact portions, a position corresponding to the electric zoom mode is detected.

Further, when all of the plurality of contact members 25d are arranged within a predetermined range including a line indicated by a sign MZ in FIG. 16, a position corresponding to the manual zoom mode is detected. Specifically, as illustrated in FIG. 16, when one of the contact members 25d is in contact with the electrical contact portion 61a, another one is in contact with the electrical contact portion 61c, and another one is in contact with the electrical contact portion 61d, respectively, a position corresponding to the manual zoom mode is detected.

Furthermore, zoom lens frame position detection means is provided in the lens barrel 1 when performing position detection, along the optical axis direction, for lens groups (the third lens group 33a, and the fourth lens group 34a) mainly contributing to zooming (magnification change action).

Figure 18:
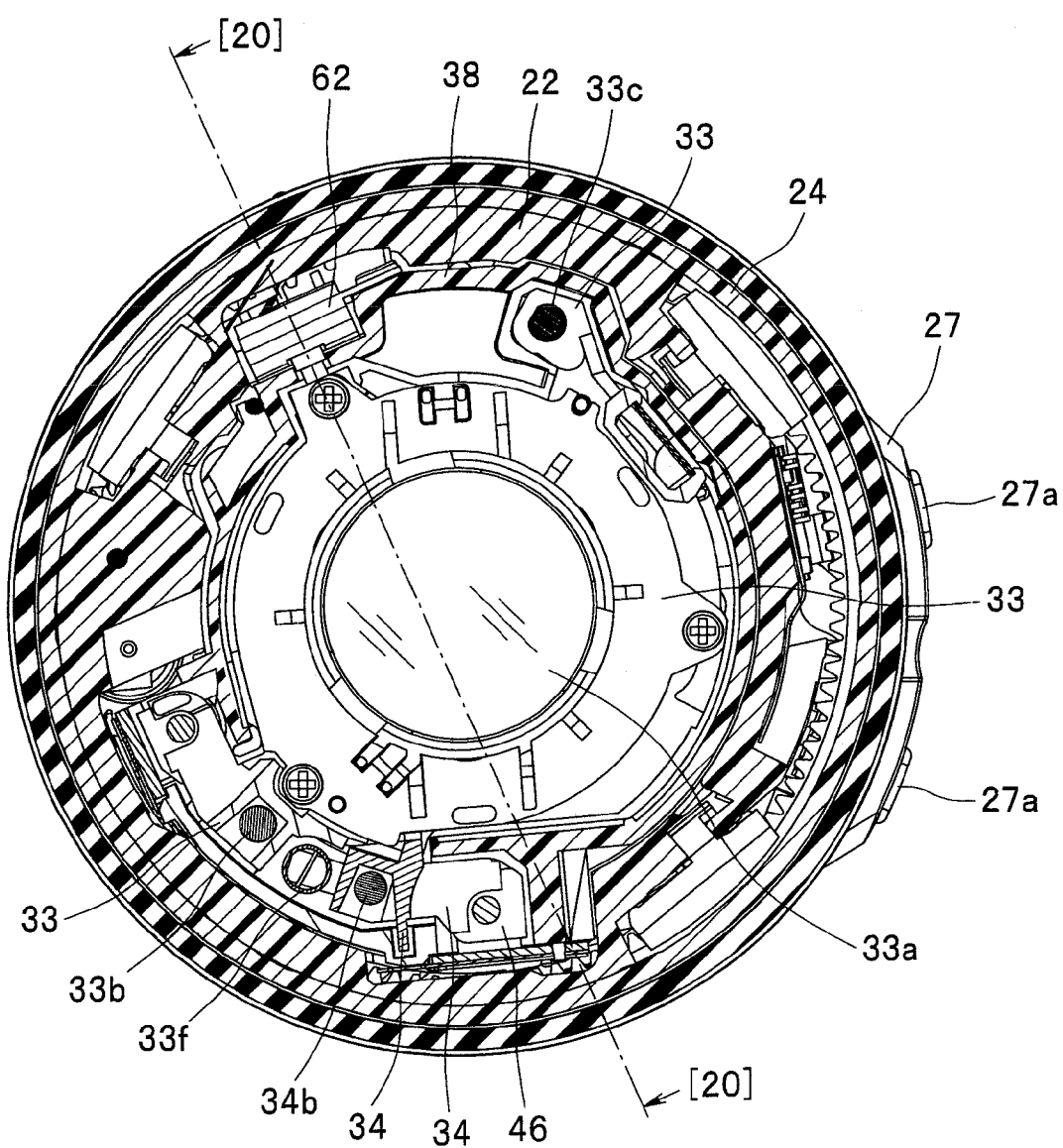
FIG. 18 is a cross-sectional view along a line [18]-[18] in FIG. 17.
Figure 19:
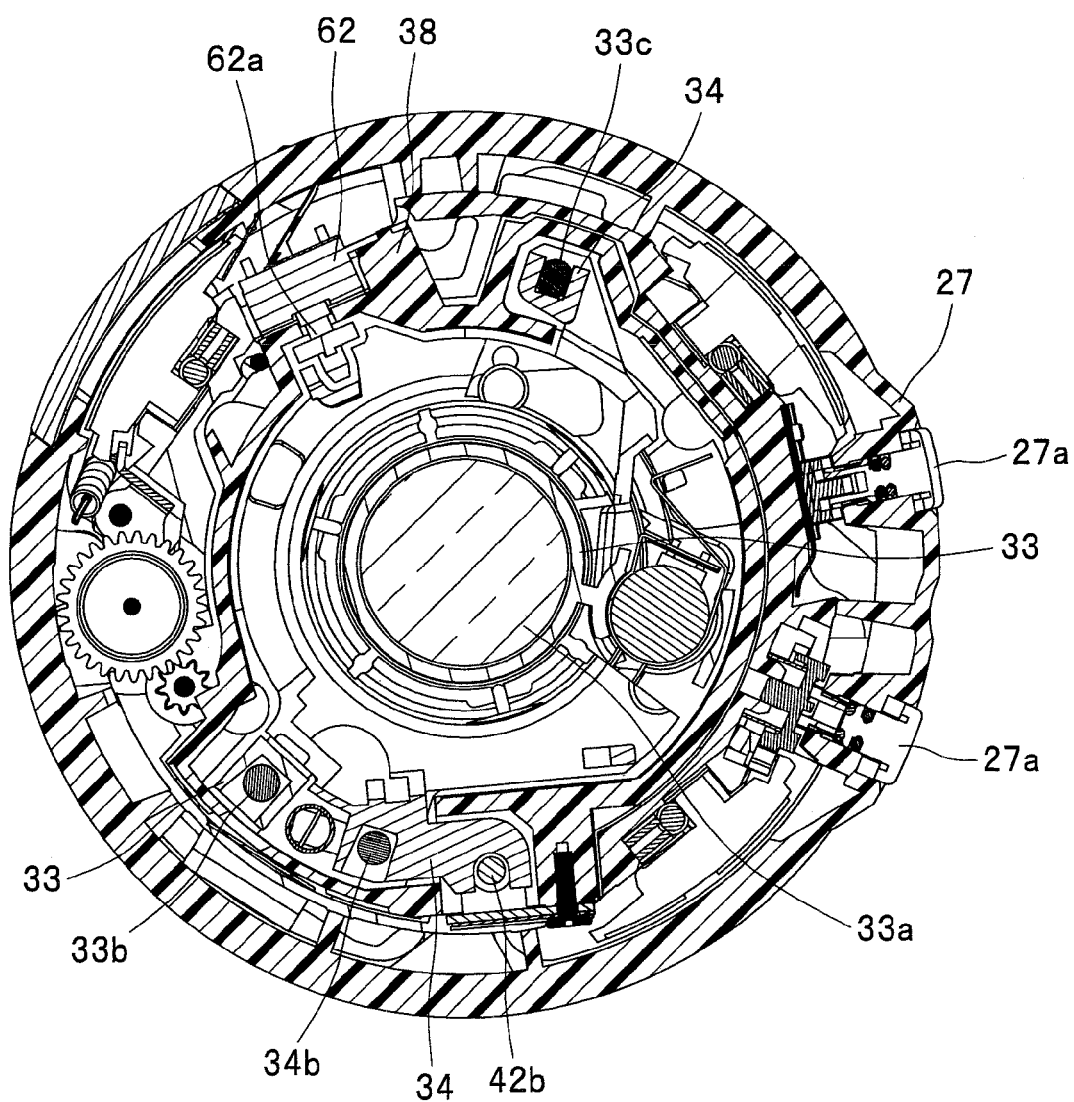
FIG. 19 is a cross-sectional view along a line [19]-[19] in FIG. 17.
Figure 20:
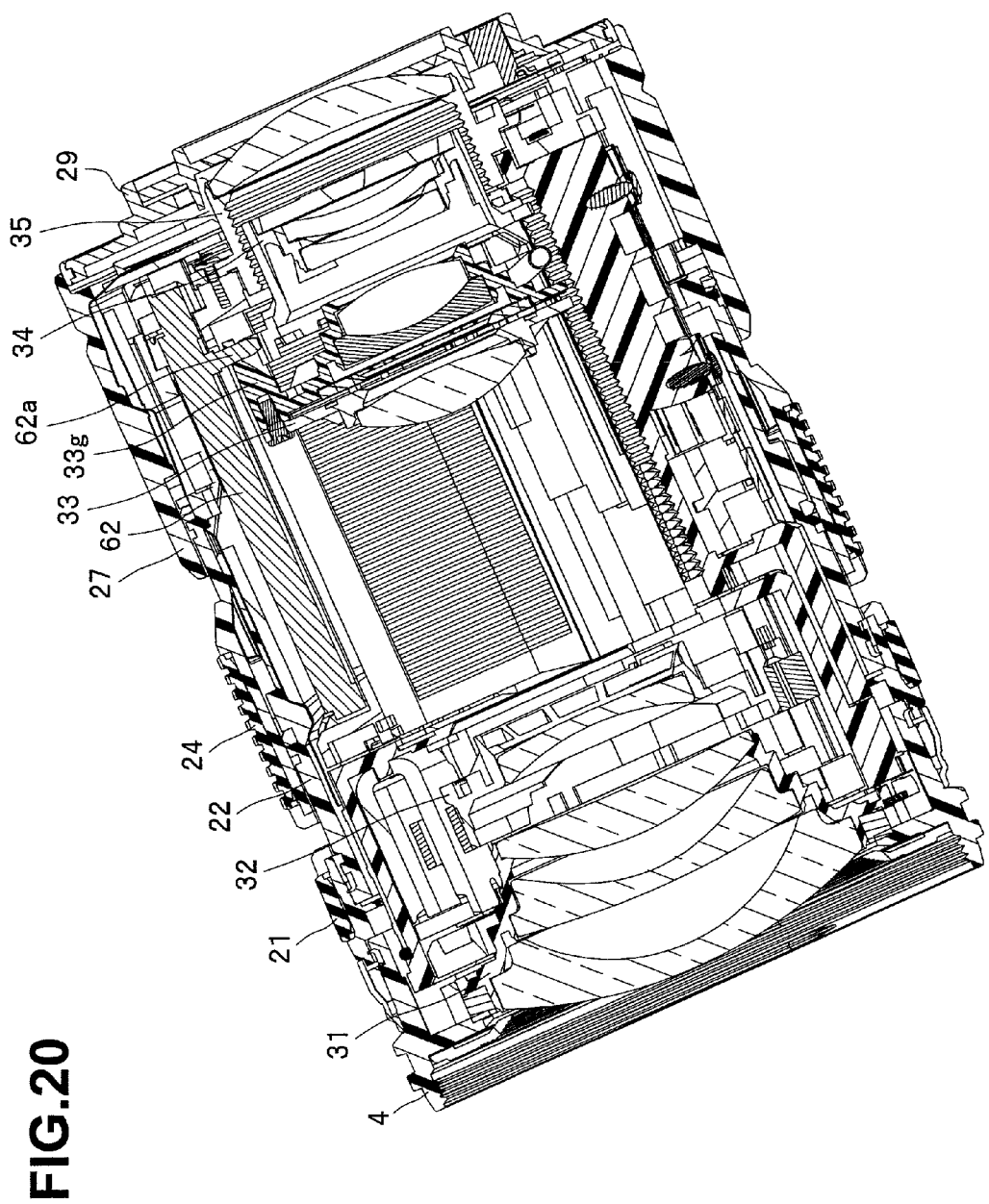
FIG. 20 is a cross-sectional view along a line [20]-[20] in FIG. 18, illustrating a structure of third group frame position detection means of the internal structure of the lens barrel of FIG. 1.

First, as illustrated in FIGS. 18 to 20, in the lens barrel 1, a potentiometer 62, which is third group frame position detection means and a resistance linear encoder, is disposed at a predetermined part on the outer circumference side of the fixing barrel 38 to detect the absolute position of the third lens frame 33 (the third lens group 33a) in the optical axis direction. As illustrated in FIG. 20, the potentiometer 62 has a shaft-type knob portion 62a that is provided from the outside, toward the inside, of the fixing barrel 38 engaging with a part of the third lens frame 33. The shaft-type knob portion 62a is configured to move in the same direction following the movement of the third lens frame 33 along the optical axis O. With this configuration, the potentiometer 62 detects the absolute position of the third lens frame 33 in the optical axis direction.

Figure 21:
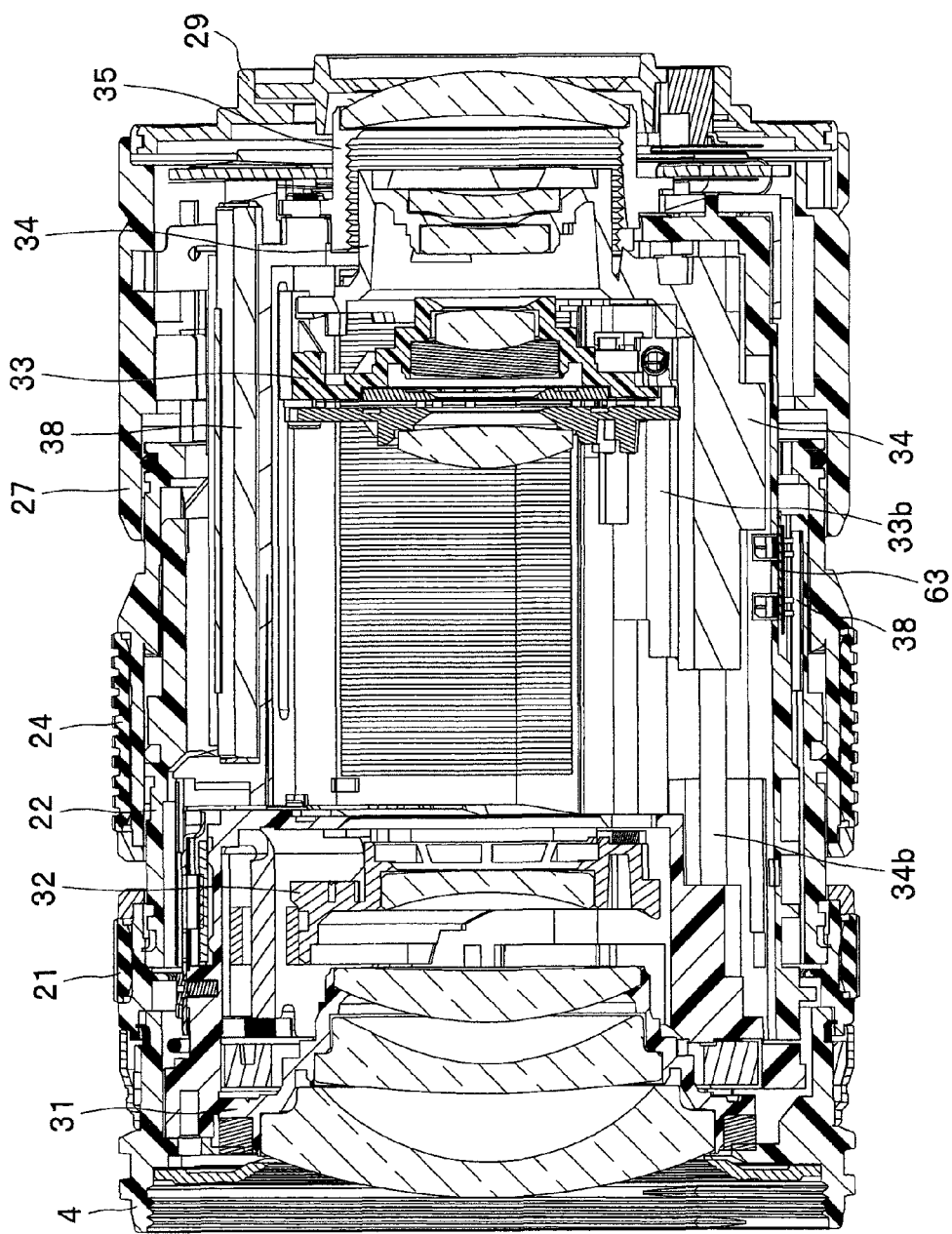
FIG. 21 is a cross-sectional view illustrating a structure of fourth group frame position detection means of the internal structure of the lens barrel of FIG. 1.

On the other hand, movement of the fourth lens frame 34 is controlled in accordance with the movement of the third lens frame 33. That is, movement of the position of the fourth lens frame 34 is controlled so as to move the fourth lens frame 34 to a predetermined position corresponding to the third lens frame 33. Therefore, as illustrated in FIG. 21, to set the position of the fourth lens frame 34 (the fourth lens group 34a), a photo interrupter 63, which is fourth group frame position detection means, is disposed at a predetermined part on the inner surface side of the fixing barrel 38. The photo interrupter 63 is set to be initialized (reset) when a camera (not illustrated) to which the lens barrel 1 is attached falls into a power-on state, for example. The control of moving the fourth lens frame 34 to a predetermined position corresponding to the position of the third lens frame 33 is performed by the control circuit 28x (FIG. 34) of the lens barrel motherboard 28 performing pulse management of the fourth group motor 42 (the stepper motor).

Next, the detailed configuration of component members that are in conjunction with the zoom ring 24 at the time of turning operation of the zoom ring 24, that is, at the time of zooming operation, will be described below, with reference to FIGS. 3, and 22 to 27, using mainly the schematic view of FIG. 28.

In the lens barrel 1, zooming can be manually performed at the time of the manual zoom mode by turning the zoom ring 24. At this time, as described above, driving force based on the turning operation input for the zoom ring 24 is transmitted to the third group frame moving mechanism via the gear box 23. Upon receiving the driving force, the third lens frame 33 moves forward/backward in the direction of the optical axis O. Then, the movement of the fourth lens frame 34 is controlled via a motor according to the position to which the third lens frame 33 has moved.

In this manner, in the lens barrel 1, the position of the third lens frame 33 in the optical axis direction is, at the time of the manual zoom mode, set based on the mechanical displacement of the zoom ring 24 by manual operation (the amount of turning and the turning direction of the zoom ring 24 by a turning operation), and the position of the fourth lens frame 34 is set via electrical control based on the position information of the third lens frame 33.

That is, in the lens barrel 1, when in the manual zoom mode, zooming is performed by mechanically setting the position of the third lens frame 33 by a user freely and manually setting the amount of operation and the direction of the operation (the amount of turning and the turning direction) of the zoom ring 24 at the second position.

On the other hand, when in the electric zoom mode, the lens barrel 1 is configured such that the third group motor 41 is drive-controlled by the user performing a turning operation of the zoom ring 24 within a predetermined range at the first position.

Figure 22:
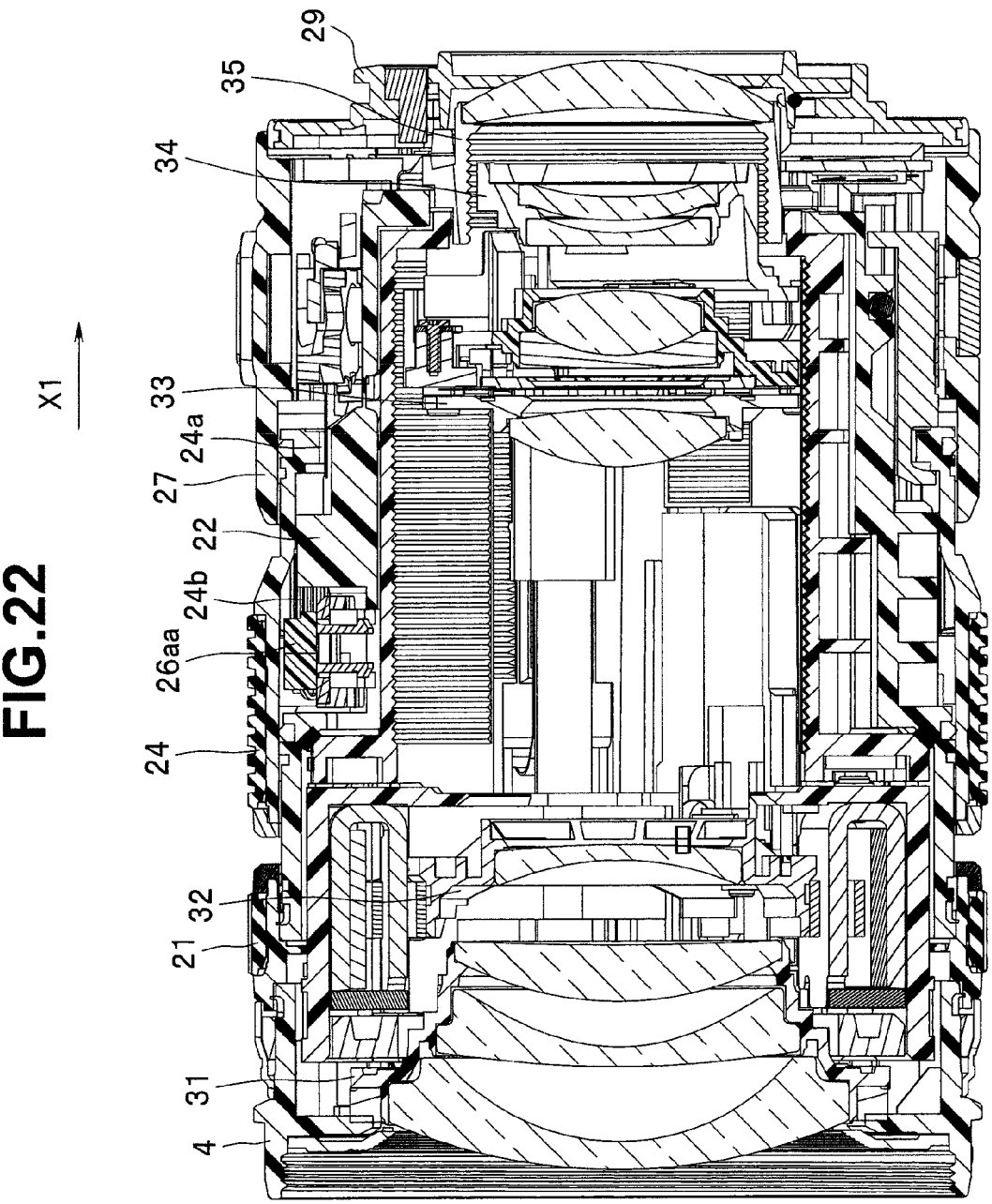
FIG. 22 is a cross-sectional view illustrating a positional relationship, at the time of the electric zoom mode, between the zoom ring and an electric zoom conjunction member of the internal structure of the lens barrel of FIG. 1.

The lens barrel 1 has the electric zoom conjunction member 26 or the like that detects the turning direction and the amount of turning of the zoom ring 24 (the turning position of the zoom ring 24), when turning operation input for the zoom ring 24 is performed when the electric zoom mode is set, that is, when the zoom ring 24 is arranged at a position, the first position, corresponding to the electric zoom mode (the state illustrated in FIG. 7 or 22). The electric zoom conjunction member 26 is a component member that is arranged along the outer circumference surface of the main barrel 22.

As shown in FIGS. 3, 22 to 27, and so on, the electric zoom conjunction member 26 is mainly configured from an engagement member 26a, turning restriction members (26ba, 26bb), a coil spring 26c, and so on.

Figure 25:
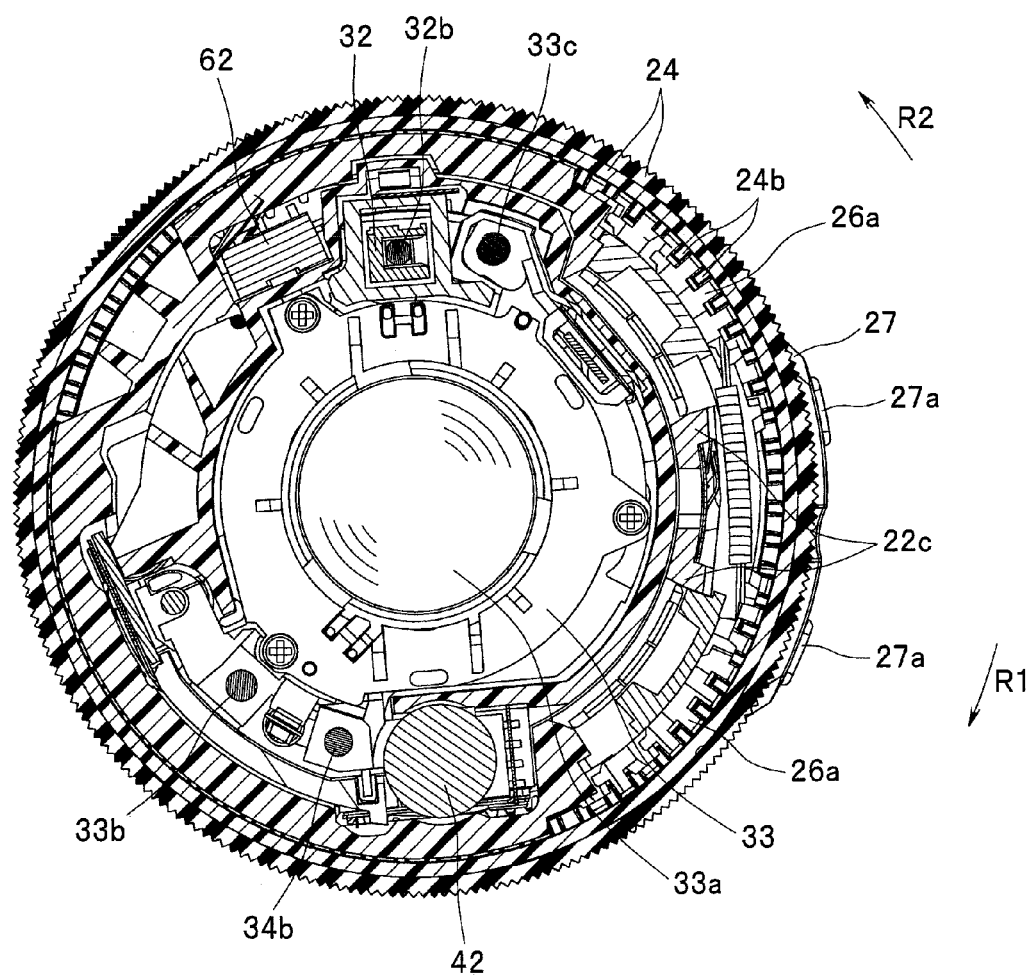
FIG. 25 is a cross-sectional view along a line [25]-[25] in FIG. 24.
Figure 26:
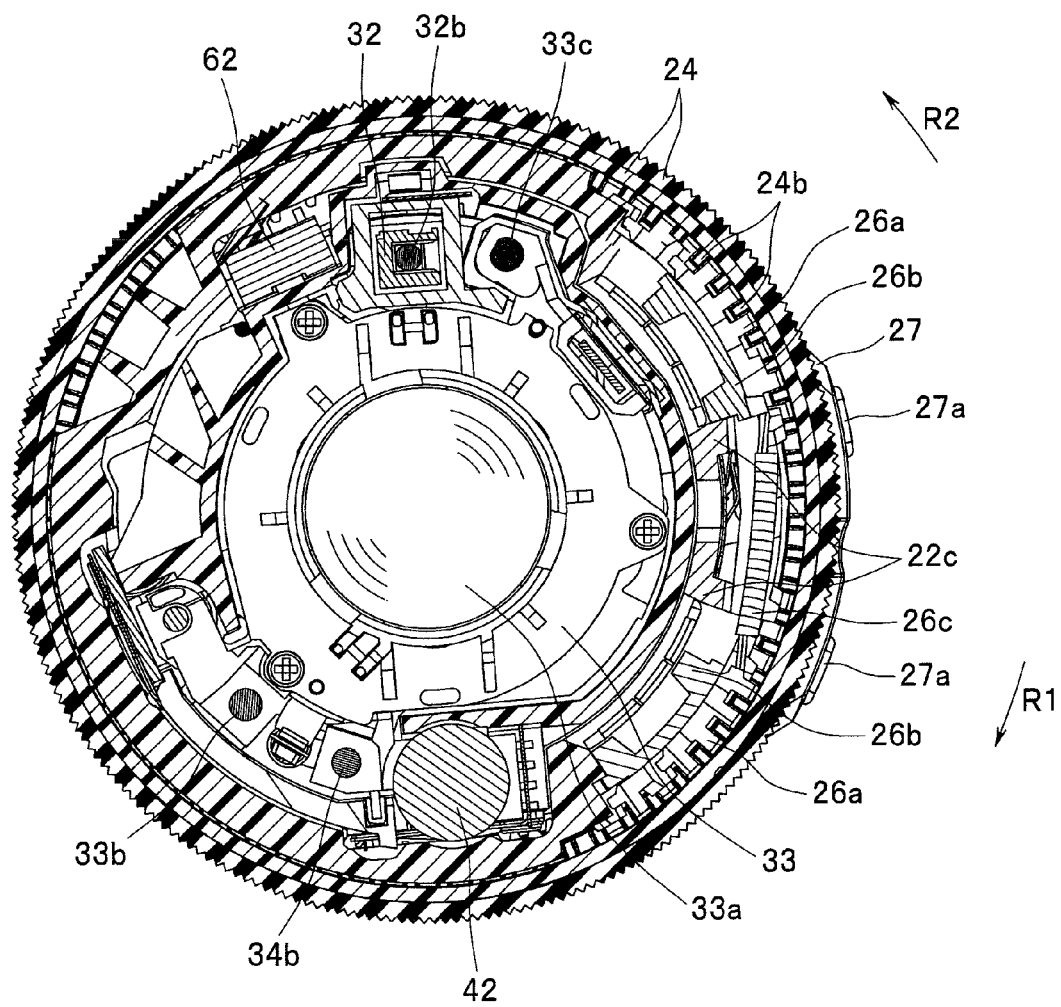
FIG. 26 is a cross-sectional view along a line [25]-[25] in FIG. 24.
Figure 27:
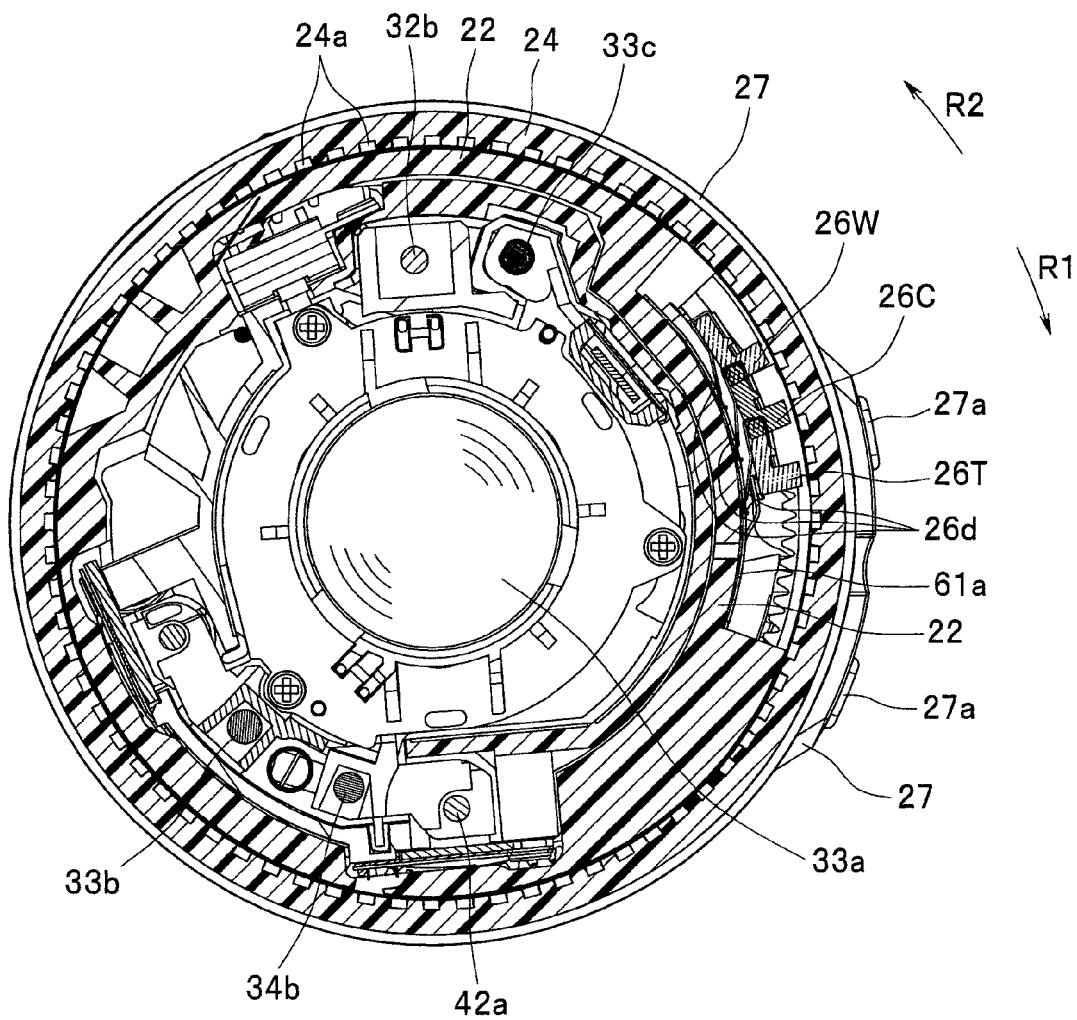
FIG. 27 is a cross-sectional view along a line [27]-[27] in FIG. 24.

As illustrated in FIGS. 25 to 27, the engagement member 26a is configured to substantially coincide with a partial outer-circumference curved surface of the main barrel 22, to have a curved surface or a ridge portion (not illustrated) capable of sliding on the outer-circumference curved surface, and to have a comb-like portion 26aa that is to be meshed with an inner-circumference comb-like portion 24b of the zoom ring 24 when the zoom ring 24 is arranged at a position corresponding to the electric zoom mode.

Correspondingly, a plurality of comb-like portions 24b are formed, in a comb-like manner, on the zoom ring 24 at a portion approximately in the middle of the inner circumference surface along a substantially same circumference, in the direction along the optical axis O and toward the front.

Figure 28:
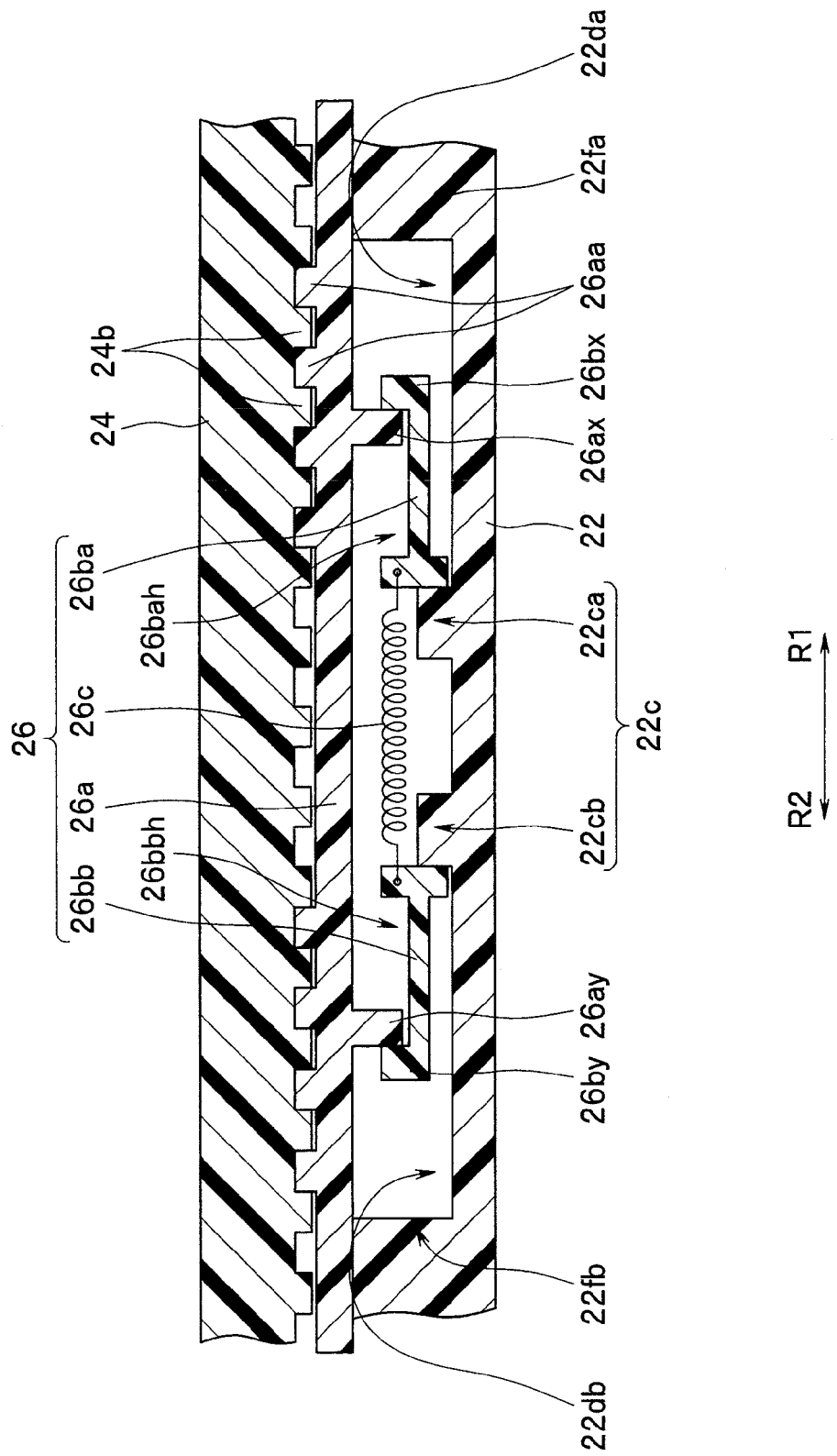
FIG. 28 is a schematic view illustrating outline configurations of the zoom ring and the electric zoom conjunction member of the internal structure of the lens barrel of FIG. 1.

In contrast, in the schematic view of FIG. 28, the configuration of the electric zoom conjunction member 26 at the time of the electric zoom mode is simplified for the sake of explanation, and each member is illustrated to have a linear form.

With this configuration, as illustrated in FIG. 22, when the zoom ring 24 is set to the electric zoom mode, the inner-circumference comb-like portion 24b of the zoom ring 24 and the comb-like portion 26aa of the engagement member 26a of the electric zoom conjunction member 26 mesh with each other.

Figure 23:
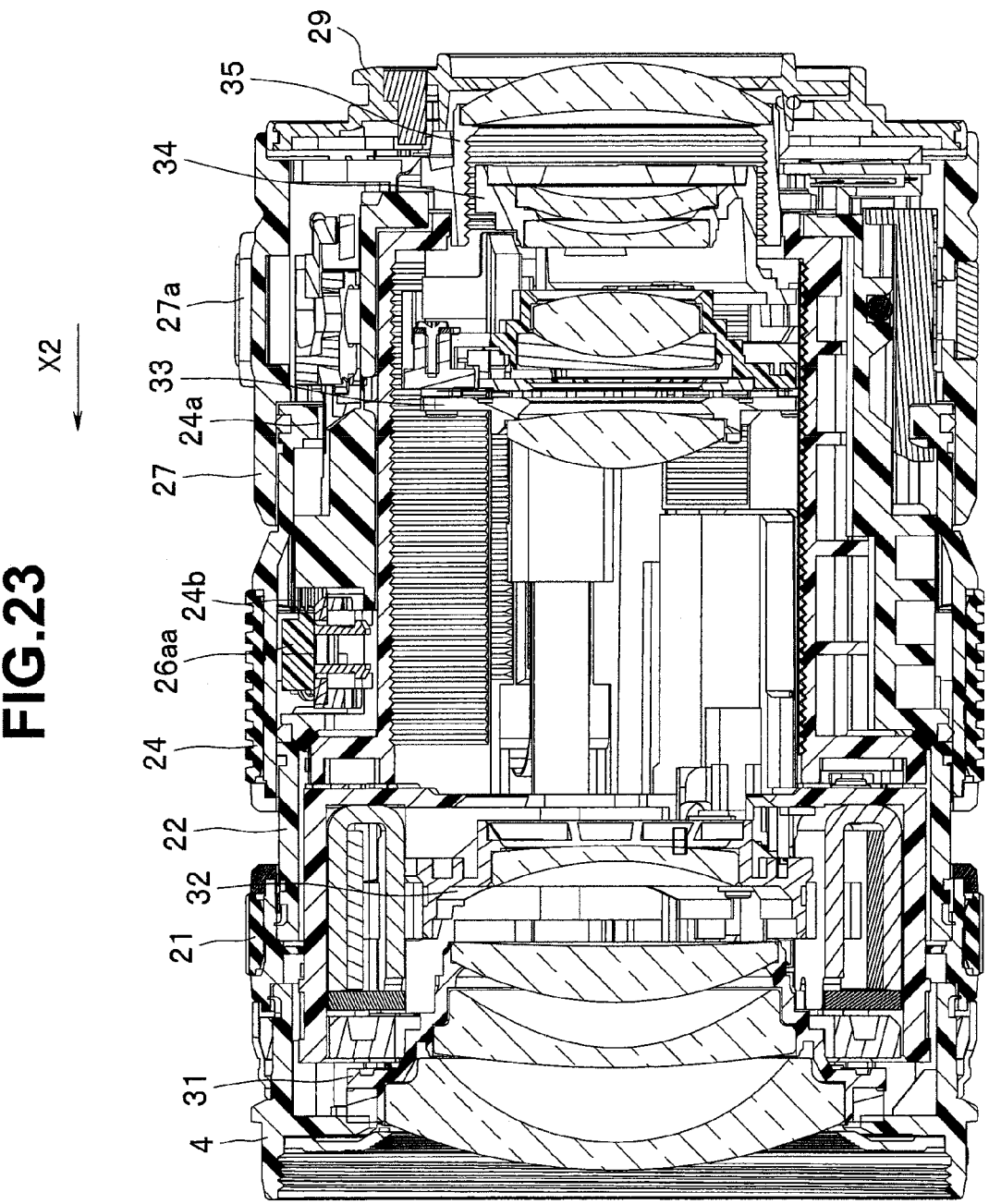
FIG. 23 is a cross-sectional view illustrating a positional relationship, at the time of the manual zoom mode, between the zoom ring and the electric zoom conjunction member of the internal structure of the lens barrel of FIG. 1.
Figure 24:
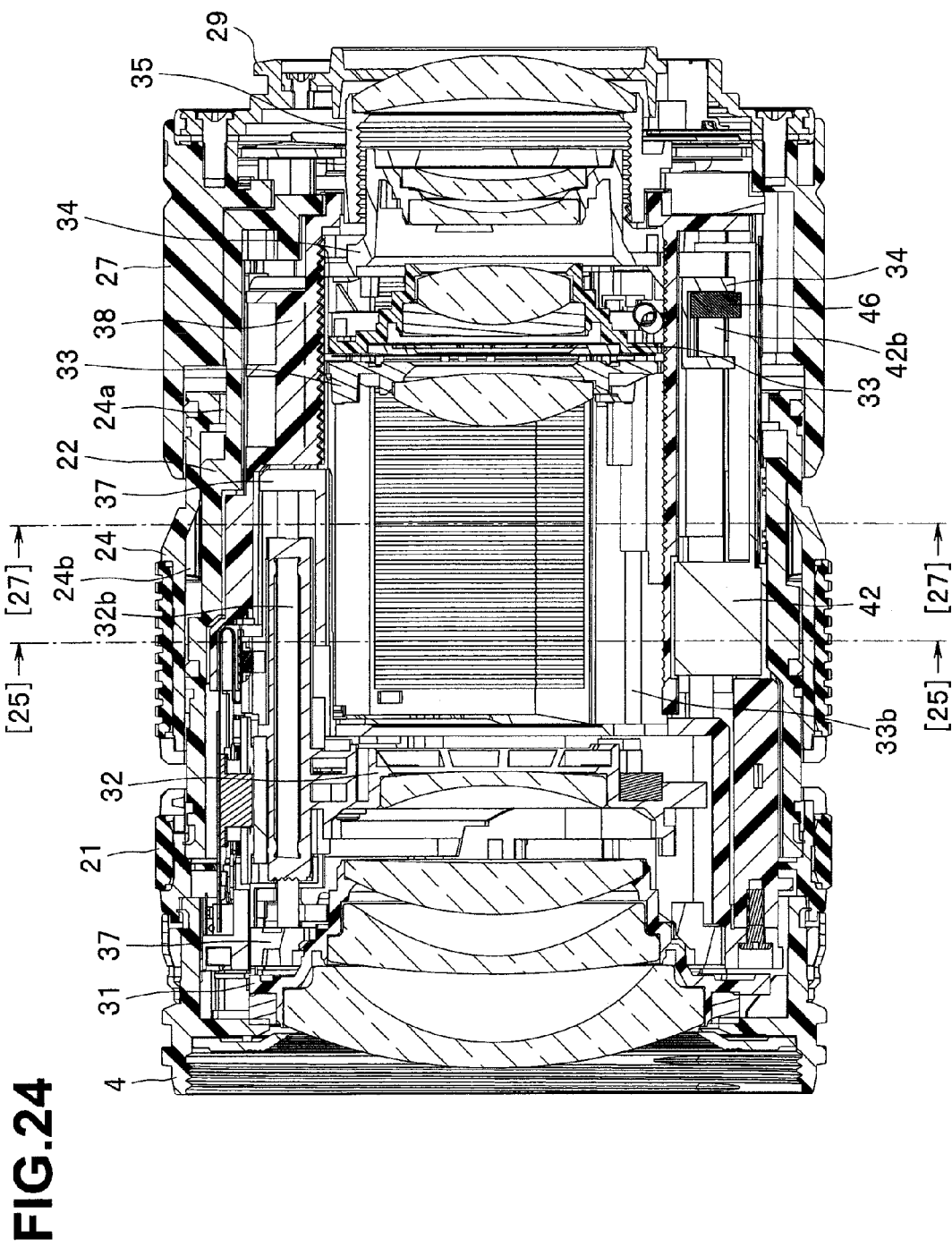
FIG. 24 is a cross-sectional view illustrating an internal structure at the time of when the lens barrel of FIG. 1 is in the electric zoom mode.

Also, when the zoom ring 24 slidingly moves in the direction, which is the direction of the arrow X1 illustrated in FIG. 22, along the optical axis O from a state where it is set to the electric zoom mode (see FIG. 22), and the zoom ring 24 is set to the manual zoom mode, the inner-circumference comb-like portion 24*b* and the comb-like portion 26*aa* are arranged at positions separate from each other, as illustrated in FIG. 23, and the meshing state between the two is configured to be released.

Furthermore, when the zoom ring 24 slidingly moves in the direction, which is the direction of the arrow X2 illustrated in FIG. 23, along the optical axis O from a state where it is set to the manual zoom mode (see FIG. 23), and the zoom ring 24 is set to the electric zoom mode, the state illustrated in FIG. 22, that is, the state where the inner-circumference comb-like portion 24*b* and the comb-like portion 26*aa* are meshed again, is achieved.

Note that the state illustrated in FIG. 28 illustrates a state where the inner-circumference comb-like portion 24*b* and the comb-like portion 26*aa* are meshed.

Furthermore, two aspects are simultaneously illustrated; namely, a state in FIG. 25 where the electric zoom conjunction member 26 is at a position after turning in the direction of an arrow R2 in FIG. 25 (an instruction end position in the wide direction), and a state in FIG. 26 where the electric zoom conjunction member 26 is at a position after turning in the direction of an arrow R1 in FIG. 26 (an instruction end position in the telephoto direction).

In FIG. 27, states where the electric zoom conjunction member 26 is at a wide end position (sign 26W), is at a middle position (sign 26C), and at a telephoto end position (sign 26T) are simultaneously illustrated by being superimposed on each other.

On the other hand, the two turning restriction members (26*ba*, 26*bb*) for restricting the amount of turning of the zoom ring 24 to be within a predetermined range are placed on the electric zoom conjunction member 26 to be relatively displaceable and slidable. As illustrated in FIG. 28, the turning restriction member 26*ba* restricts the range of turning of the zoom ring 24 in one direction around the optical axis O (for example, the direction of the arrow R1 in FIG. 28), and the other turning restriction member, 26*bb*, restricts the range of turning in the other direction (for example, the direction of the arrow R2 in FIG. 28).

The two turning restriction members 26*ba* and 26*bb* are stored in two concave groove portions 22*da* and 22*db*, respectively, extending in the circumferential direction on the outer circumference surface of the main barrel 22. The two concave portions 22*da* and 22*db* are formed adjacent to each other in the circumferential direction with locking wall portions 22*ca* and 22*cb* which are fixing portions forming a part of the main barrel 22 in-between. Also, the two turning restriction members 26*ba* and 26*bb* stored in the two concave portions 22*da* and 22*db*, respectively, are connected by being pulled toward each other by the coil spring 26*c*, which is formed of a contractable elastic material or the like, for example.

Furthermore, rectangular concave portions 26*bah* and 26*bbh* caved in the radial direction around the optical axis are provided on the turning restriction members 26*ba* and 26*bb*, respectively. Convex portions 26*ay* and 26*ax*, which are convex in the radial direction of the engagement member 26*a*, are impacted into the concave portions 26*bah* and 26*bbh*, respectively. Further, the convex portion 26*ay* is freely fitted in the concave portion 26*bah* in the direction around the optical axis, and the convex portion 26*ax* is freely fitted in the concave portion 26*bbh* in the direction around the optical axis.

Also, the two turning restriction members 26*ba* and 26*bb* are configured to be able to follow the turning (movement) of the engagement member 26*a* and to turn (move) in the same direction, by being engaged with the engagement member 26*a* at parts described below.

Specifically, as illustrated in FIG. 28, for example, an end portion 26*bx* of the turning restriction member 26*ba*, of the two turning restriction members 26*ba* and 26*bb*, is abutted against one engagement protrusion portion 26*ax* of the engagement member 26*a*. Also, an end portion 26*by* of the other turning restriction member, 26*bb*, is abutted against another engagement protrusion portion 26*ay* of the engagement member 26*a*.

With this configuration, the two turning restriction members 26*ba* and 26*bb* are in a state of being pulled toward each other and being balanced by the elastic force of the coil spring 26*c* while being stored within the two concave portions 22*da* and 22*db*, respectively. In this state, the locking wall portion 22*c* of the main barrel 22 is sandwiched between the two turning restriction members 26*ba* and 26*bb*. Accordingly, the two turning restriction members 26*ba* and 26*bb* each have one end thereof abutted against a corresponding locking wall portion 22*c* (see FIG. 28). Note that the two turning restriction members 26*ba* and 26*bb* are in a state of being engageably inserted into the two concave portions 22*da* and 22*db* while being freely movable in respective longitudinal directions.

The work of the electric zoom conjunction member 26 configured as above is simply described as follows using FIG. 28.

First, the state illustrated in FIG. 28 is a state where the inner-circumference comb-like portion 24*b* of the zoom ring 24 and the comb-like portion 26*aa* of the electric zoom conjunction member 26 are meshed, and where no load is applied to the zoom ring 24 in the turning direction (a state where the zoom ring 24 is in a middle position; refer also to the sign 26C in FIG. 27).

It is assumed that, in a state where the zoom ring 24 is at a zoom middle position (middle of the telephoto end and the wide end of zooming) in the electric zoom mode state, a user performs a turning operation of applying a load on the zoom ring 24 in the direction of the arrow R1 in FIG. 28, for example. The zoom ring 24 thereby turns (moves) toward the direction of the arrow R1 in FIG. 28. Then, the engagement member 26*a* also turns (moves) in the direction of R1 by the meshing between the comb-like portion 24*b* and the comb-like portion 26*aa*. Also, due to one engagement protrusion portion, 26*ax*, of the engagement member 26*a* and the end portion 26*bx* of one turning restriction member, 26*ba*, being abutted against each other, the engagement member 26*a* resists the elastic force of the coil spring 26*c* and moves the one turning restriction member, 26*ba*, in the R1 direction. The one turning restriction member, 26*ba*, thereby follows in the same R1 direction. The movement range of the one turning restriction member, 26*ba*, at this time is restricted by the concave portion 22*da*. That is, the movement range of the one turning restriction member, 26*ba*, will be a range until the end portion 26*bx* abuts against one fixing wall, 22*fa*, of the main barrel 22. Note that the position of the zoom ring 24 at the time of the end portion 26*bx* being abutted against the one fixing wall, 22*fa*, of the main barrel 22 will be assumed to be a telephoto end position, for example. The telephoto end position refers to a position nearest to a longest focal point on the long focal point side (the telephoto side) in a focal length range (a zoom range) that can be set in the lens barrel 1 (also refer to the sign 26T in FIG. 27).

Also, when the one turning restriction member, 26*ba*, resists the elastic force of the coil spring 26*c* and moves in the R1 direction, the other turning restriction member, 26*bb*, falls into a state where movement is restricted, by being abutted against the locking wall portion 22*cb* of the main barrel 22. Accordingly, at this time, the other turning restriction member, 26*bb*, is maintained in a non-moving state.

If the user releases the load on the zoom ring 24 in the direction of the arrow R1 in this state, the one turning restriction member, 26ba, turns (moves) in the direction of the arrow R2 in FIG. 28 by an elastic restoring force of the coil spring 26c. The one turning restriction member, 26ba, thereby causes the engagement member 26a to turn (move) in the R2 direction. Then, the zoom ring 24 also turns (moves) in the R2 direction. Then, the two turning restriction members 26ba and 26bb are eventually pulled toward each other within the two concave portions 22da and 22db by the elastic force of the coil spring 26c, and the two turning restriction members 26ba and 26bb are abutted against locking wall portions 22ca and 22cb, respectively, and fall into a balanced state. The zoom ring 24 thereby returns to the predetermined middle position, and this state is maintained.

In contrast, it is assumed that the user performs a turning operation of applying a load on the zoom ring 24 in the direction of the arrow R2 from the state illustrated in FIG. 28 (the zoom ring 24 at the middle position). The zoom ring 24 thereby turns (moves) toward the direction of the arrow R2 in FIG. 28. Then, the engagement member 26a also turns (moves) in the direction of R2. Also, due to another engagement protrusion portion, 26ay, of the engagement member 26a and the end portion 26by of another turning restriction member, 26bb, being abutted against each other, the engagement member 26a resists the elastic force of the coil spring 26c and moves the other turning restriction member, 26bb, in the R2 direction. The other turning restriction member, 26bb, thereby follows in the same R2 direction. The movement range of the other turning restriction member, 26bb, at this time is restricted by the concave portion 22db. That is, the movement range of the other turning restriction member, 26bb, will be a range until the end portion 26by abuts against another fixing wall, 22fb, of the main barrel 22. Note that the position of the zoom ring 24 at the time of the end portion 26by being abutted against the other fixing wall, 22fb, of the main barrel 22 will be assumed to be a wide end position, for example. The wide end position refers to a position nearest to a shortest focal point on the short focal point side (the wide side) in a focal length range (a zoom range) that can be set in the lens barrel 1 (also refer to the sign 26W in FIG. 27).

Also, when the other turning restriction member, 26bb, resists the elastic force of the coil spring 26c and moves in the R2 direction, the one turning restriction member, 26ba, falls into a state where movement is restricted, by being abutted against the locking wall portion 22ca of the main barrel 22. Accordingly, at this time, the one turning restriction member, 26ba, is maintained in a non-moving state.

If the user releases the load on the zoom ring 24 in the direction of the arrow R2 in this state, the other turning restriction member, 26bb, turns (moves) in the direction of the arrow R1 in FIG. 28 by the elastic restoring force of the coil spring 26c. The other turning restriction member, 26bb, thereby causes the engagement member 26a to turn (move) in the R1 direction. Then, the zoom ring 24 also turns (moves) in the R1 direction. Then, the two turning restriction members 26ba and 26bb are eventually pulled toward each other within the two concave portions 22da and 22db by the elastic force of the coil spring 26c, and the two turning restriction members 26ba and 26bb are abutted against the locking wall portions 22ca and 22cb, respectively, and fall into a balanced state. The zoom ring 24 thereby returns to the predetermined middle position, and this state is maintained.

Furthermore, the lens barrel 1 has zoom ring position detection means that detects the turning position (the turning direction and the amount of turning) of the zoom ring 24 around the optical axis O.

That is, as illustrated in FIG. 27, contact members 26d which are formed from a plurality of flat spring metal members (conductive members) or the like protruding toward the outer circumference surface side of the main barrel 22 and which configure parts of zoom ring position detection means that detects the position of the zoom ring 24 in the turning direction are fixedly installed on the electric zoom conjunction member 26. Note that, in the present embodiment, three contact members 26d are disposed, as illustrated in FIG. 16 (virtual lines), for example.

At parts facing the plurality of contact members 26d, which are predetermined parts on the outer circumference surface (fixing portion) on the main barrel 22 side, parts of the flexible printed board 61 including, on the mounting surface, a plurality of electrical contact portions corresponding to the plurality of contact members 26d are fixedly installed. As described above, the flexible printed board 61 configures a part of the zoom mode position detection means, and also, a part of the zoom ring position detection means.

Note that electrical contact portions related to the zoom ring position detection means, among the electrical contact portions of the flexible printed board 61, are provided in a region 61y illustrated in FIG. 16, and are electrical contact portions indicated by signs 61e, 61f, 61g, and 61h.

With this configuration, when the electric zoom conjunction member 26 turns in conjunction with, and in the same direction as, the turning of the zoom ring 24 around the optical axis O, distal end contact portions of the plurality of electrical contact members 26d of the electric zoom conjunction member 26 contact predetermined parts of the plurality of electrical contact portions (61e, 61f, 61g, 61h) on the flexible printed board 61. In this case, the combinations among the plurality of contact members 26d and the plurality of electrical contact portions 61e, 61f, 61g, and 61h are different depending on the position of the zoom ring 24, and thus, the position of the zoom ring 24 in the turning direction around the optical axis O is allowed to be detected.

With the configuration described above, a slide encoder is configured that functions as the zoom ring position detection means that realizes the function of detecting the position of the zoom ring 24 in the turning direction around the optical axis O and detects the turning position of the zoom ring 24, by the plurality of contact members 26d of the electric zoom conjunction member 26 and the plurality of electrical contact portions 61e, 61f, 61g, and 61h in the region 61y of the flexible printed board 61 fixedly installed on the main barrel 22 side.

In other words, the electric zoom conjunction member 26 having the plurality of contact members 26d functions as a part of the zoom ring position detection means that contacts predetermined parts among the plurality of electrical contact portions 61e, 61f, 61g, and 61h of the flexible printed board 61 fixedly installed on the main barrel 22 side and detects the position of the zoom ring 24 in the turning direction around the optical axis O.

Then, the position information of the zoom ring 24 detected in the manner described above is transmitted to the control circuit 28x (FIG. 34) of the lens barrel motherboard 28, and the control circuit 28x which has received the position information drive-controls each of the third group motor 41 and the fourth group motor 42, and performs drive-control of the zooming direction, the zoom speed, and the like at the time of the electric zooming action.

For example, an example of the pattern of the plurality of electrical contacts of the flexible printed board 61 configuring a part of the zoom ring position detection means is illustrated in FIG. 16. Note that, in FIG. 16, the arrangement of the electric zoom conjunction member 26 and the plurality of contact members 26*d* provided with respect to the flexible printed board 61 are conceptually illustrated by virtual lines (two-dot chain lines).

The contact member 26*d* is assumed to move in the direction of the arrow R illustrated in FIG. 16 (the turning direction around the optical axis O) with respect to the flexible printed board 61. Also, at a time when the zoom ring 24 is at the middle position in the direction along the arrow R, when the zoom ring 24 turns in the direction of the arrow R1, zooming from the middle position toward the long focal length side is assumed to be performed, and in contrast, when the zoom ring 24 turns in the direction of the arrow R2, zooming from the middle position toward the short focal length side is assumed to be performed.

With this configuration, when the zoom ring 24 turns around the optical axis O, the plurality of contact members 26*d* of the electric zoom conjunction member 26 are configured to slide in the direction of the arrow R in FIG. 16 with respect to the mounting surface of the flexible printed board 61 fixed on the main barrel 22.

Then, for example, when all of the plurality of contact members 26*d* are positioned in a predetermined range including the line indicated by a sign C in FIG. 16, it is detected to be a position corresponding to a substantially middle focal length in a zoom range that can be set in the lens barrel 1. Note that the position indicated by the sign C in FIG. 16 is to be the zoom middle position. The zoom middle position is a middle focal length that is set in advance for each lens barrel as a product. This state (the state where the contact members 26*d* are at the zoom middle position (the sign C in FIG. 16)) corresponds to the state where the zoom ring 24 is at the middle position by the work of the elastic force of the coil spring 26*c* of the electric zoom conjunction member 26, as described above.

Specifically, as illustrated in FIG. 16, in a state where one of the contact members 26*d* is in contact with the electrical contact portion 61*e*, another one is in contact with the electrical contact portion 61*h*, and another one of the contact members 26*d* is not in contact with any of the electrical contact portions, it is detected that the zoom ring 24 is at a position corresponding to the zoom middle position.

Also, when the zoom ring 24 is turned by a user's turning operation from a state where the zoom ring 24 is at the zoom middle position, the plurality of contact members 26*d* move in the direction of the arrow R1 in FIG. 16, for example, and all of the plurality of contact members 26*d* are arranged in a predetermined range including any of the lines indicated by signs TL, TM, and TH in FIG. 16, it is detected that the zoom ring 24 has been turned toward the long focal length side (in the direction of the arrow R1) from the zoom middle position in the zoom range that can be set in the lens barrel 1 (detection of the turning direction). Note that, by detecting each position of the signs TL, TM, and TH, the magnitude of the turning angle of the zoom ring 24 can also be detected. Here, the turning angle of the zoom ring 24 is set to correspond to each of the positions of the signs TL, TM, and TH in this order as the turning operation becomes greater (detection of relative amount of turning). Note that the turning angle of the zoom ring 24 at the time of the electric zoom mode is set to about ±10 to 15 degrees, for example.

For example, when all of the plurality of contact members 26*d* are positioned within a predetermined range including the line indicated by the sign TL, the zoom ring 24 is turned from the zoom middle position (the sign C) toward the long focal length side (in the direction of the arrow R1), and it is detected that the turning angle is small. Specifically, as illustrated in FIG. 16, when one of the contact members 26*d* is in contact with the electrical contact portion 61*e*, another one is in contact with the electrical contact portion 61*f*, and another one is in contact with the electrical contact portion 61*h*, respectively, the zoom ring 24 is detected to have been turned toward the long focal length side (in the direction of the arrow R1) with the turning angle being a "small" angle. At this time, the control circuit 28*x* (FIG. 34) performs control of drive-controlling the zooming in the long focal point direction by low-speed driving.

Also, when all of the contact members 26*d* are positioned within a predetermined range including the line indicated by the sign TM, the zoom ring 24 is turned from the zoom middle position (the sign C) toward the long focal length side (in the direction of the arrow R1), and it is detected that the turning angle is medium. Specifically, as illustrated in FIG. 16, when one of the contact members 26*d* is in contact with the electrical contact portion 61*e*, another one is in contact with the electrical contact portion 61*f*, and another one of the contact members 26*d* is not in contact with any of the electrical contact portions, the zoom ring 24 is detected to have been turned toward the long focal length side (in the direction of the arrow R1) with the turning angle being a "medium" angle. At this time, the control circuit 28*x* (FIG. 34) performs control of drive-controlling the zooming in the long focal point direction by medium-speed driving, which is faster compared to the "low-speed driving" mentioned above.

Furthermore, when all of the contact members 26*d* are positioned within a predetermined range including the line indicated by the sign TH, the zoom ring 24 is turned from the zoom middle position (the sign C) toward the long focal length side (in the direction of the arrow R1), and it is detected that the turning angle is large. Specifically, as illustrated in FIG. 16, when one of the contact members 26*d* is in contact with the electrical contact portions 61*e*, another one is in contact with the electrical contact portion 61*f*, and another one is in contact with the electrical contact portion 61*g*, respectively, the zoom ring 24 is detected to have been turned toward the long focal length side (in the direction of the arrow R1) with the turning angle being a "large" angle. At this time, the control circuit 28*x* (FIG. 34) performs control of drive-controlling the zooming in the long focal point direction by high-speed driving, which is faster compared to the "medium-speed driving" mentioned above.

On the other hand, when the zoom ring 24 is turned by a user's turning operation from a state where the zoom ring 24 is at the zoom middle position, and the plurality of contact members 26*d* slide in the direction of the arrow R2 in FIG. 16, for example, and are arranged within a predetermined range including any of the lines indicated by signs WL, WM, and WH in FIG. 16, it is detected that the zoom ring 24 has been turned toward the short focal length side (in the direction of the arrow R2) from the zoom middle position in the zoom range that can be set in the lens barrel 1 (detection of the turning direction). Note that, by detecting each position of the signs WL, WM, and WH, the magnitude of the turning angle of the zoom ring 24 can also be detected. Here, the turning angle of the zoom ring 24 is set to correspond to each of the positions of the signs WL, WM, and WH in this order as the turning operation becomes greater (detection of relative amount of turning).

For example, when all of the plurality of contact members 26*d* are positioned within a predetermined range including the line indicated by the sign WL, the zoom ring 24 is turned from the zoom middle position (the sign C) toward the short focal length side (in the direction of the arrow R2), and it is detected that the turning angle is a "small" angle. Specifically, as illustrated in FIG. 16, when one of the contact members 26d is in contact with the electrical contact portion 61e, another one is in contact with the electrical contact portion 61g, and another one is in contact with the electrical contact portion 61h, respectively, the zoom ring 24 is detected to have been turned toward the short focal length side (in the direction of the arrow R2) with the turning angle being a "small" angle. At this time, the control circuit 28x (FIG. 34) performs control of drive-controlling the zooming in the short focal point direction by "low-speed driving."

Also, when all of the contact members 26d are positioned within a predetermined range including the line indicated by the sign WM, the zoom ring 24 is turned from the zoom middle position (the sign C) toward the short focal length side (in the direction of the arrow R2), and it is detected that the turning angle is a "medium" angle. Specifically, as illustrated in FIG. 16, when one of the contact members 26d is in contact with the electrical contact portion 61e, another one is in contact with the electrical contact portion 61g, and another one of the contact members 26d is not in contact with any of the electrical contact portions, the zoom ring 24 is detected to have been turned toward the short focal length side with the turning angle being a "medium" angle. At this time, the control circuit 28x (FIG. 34) performs control of drive-controlling the zooming in the short focal point direction by "medium-speed driving," which is faster compared to the "low-speed driving" mentioned above.

Furthermore, when all of the contact members 26d are positioned within a predetermined range including the line indicated by the sign WH, the zoom ring 24 is turned from the zoom middle position (the sign C) toward the short focal length side (in the direction of the arrow R2), and it is detected that the turning angle is a "large" angle. Specifically, as illustrated in FIG. 16, when one of the contact members 26d is in contact with the electrical contact portions 61e, and other two contact members 26d are not in contact with any of the electrical contact portions, the zoom ring 24 is detected to have been turned toward the short focal length side with the turning angle being a "large" angle. At this time, the control circuit 28x (FIG. 34) performs control of drive-controlling the zooming in the short focal point direction by "high-speed driving," which is faster compared to the "medium-speed driving" mentioned above.

As described above, with the lens barrel 1, a user can slidingly move the zoom ring 24 in the direction along the optical axis O by manual operation, and can thereby perform an operation of switching between each mode including the electric zoom mode, the manual zoom mode, and the macro mode. Thus, if, for example, the zoom ring 24 is unintentionally, slidingly moved during use of a camera (not illustrated) to which the lens barrel 1 is attached, switching to a different setting will take place in spite of the usage intention of the user.

Therefore, the lens barrel 1 has zoom operation switch means that restricts or allows movement of the zoom ring 24 in the optical axis direction according to each set mode when each zoom mode or the macro mode has been set, and that performs an operation of switching between respective zoom modes and the macro mode.

In the lens barrel 1, the zoom operation switch means is configured mainly from one of the operation members 27a provided on the exterior ring 27 of the exterior unit 2, a zoom ring locking member 64 that restricts the movement of the zoom ring 24 in the optical axis direction or allows the movement, in conjunction with a press operation on the operation member 27a, and a locking member holding portion 22e that holds the zoom ring locking member 64.

Note that two operation members 27a are assumed to be disposed on the lens barrel 1, as described above. One of the two operation members 27a is an operation member for performing an operation of switching between action modes related to focusing, and the other is an operation member that is included in the zoom operation switch means. The present invention relates particularly to a configuration related to a zoom operation, and thus, in the following explanation, only the operation member 27a as a part of the zoom operation switch means will be described in detail, and explanation for the other operation members 27a will be omitted.

FIGS. 29 to 33 are enlarged cross-sectional views of major portions illustrating, in an enlarged manner, cross sections of a part where the zoom ring 24 and the operation member 27a in the lens barrel 1 of the present embodiment are disposed. Note that, in each of the drawings, the configuration of the part is illustrated in a simplified manner, and thus, only the zoom ring 24, the operation member 27a, and members related to the two are illustrated, and illustration of other members is omitted.

Figure 29:
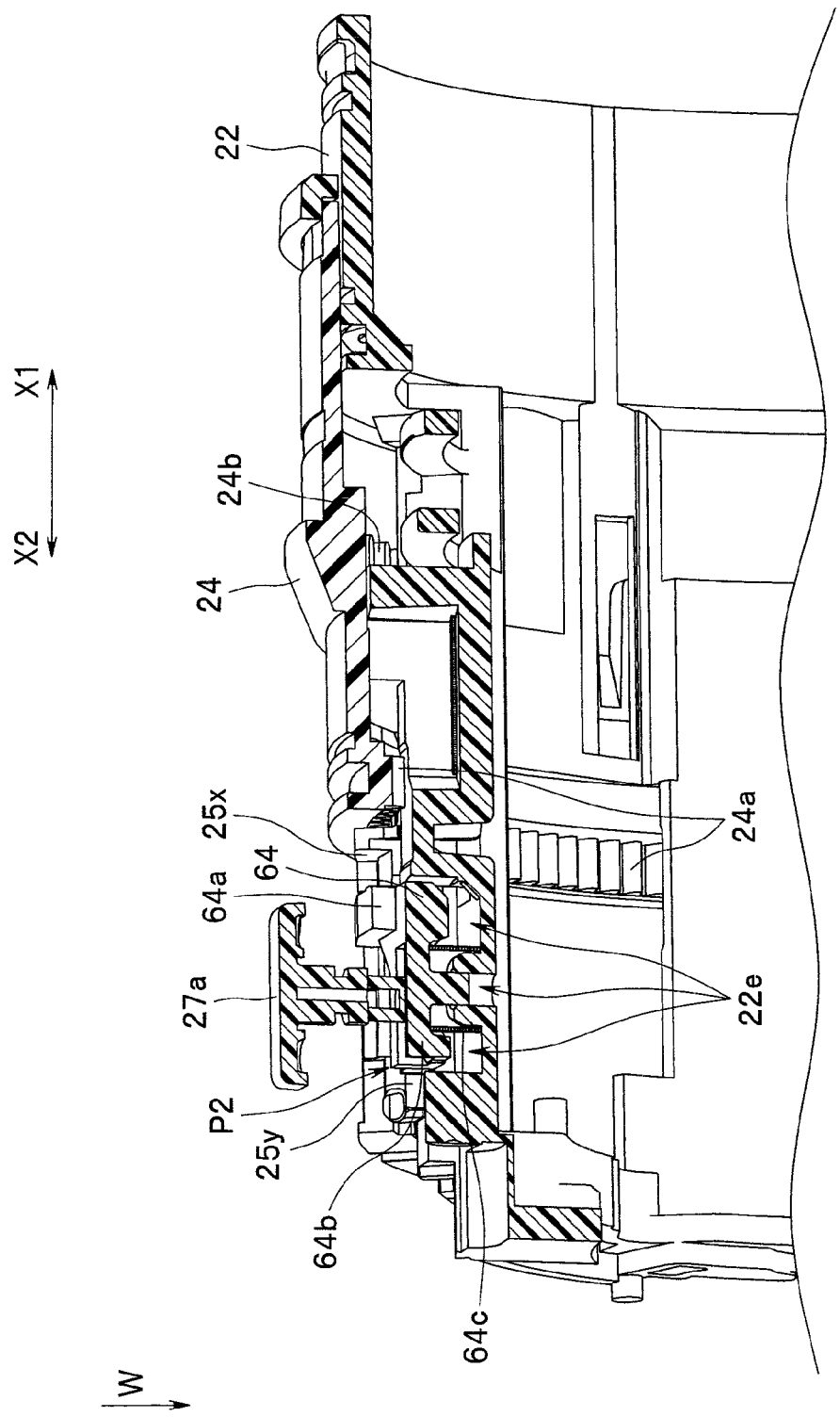
FIG. 29 is an enlarged cross-sectional view of major portions illustrating an outline configuration of a disposed part of the zoom ring and an operation member of the lens barrel of FIG. 1, and is a view illustrating an electric zoom mode set state in a normal use mode.
Figure 30:
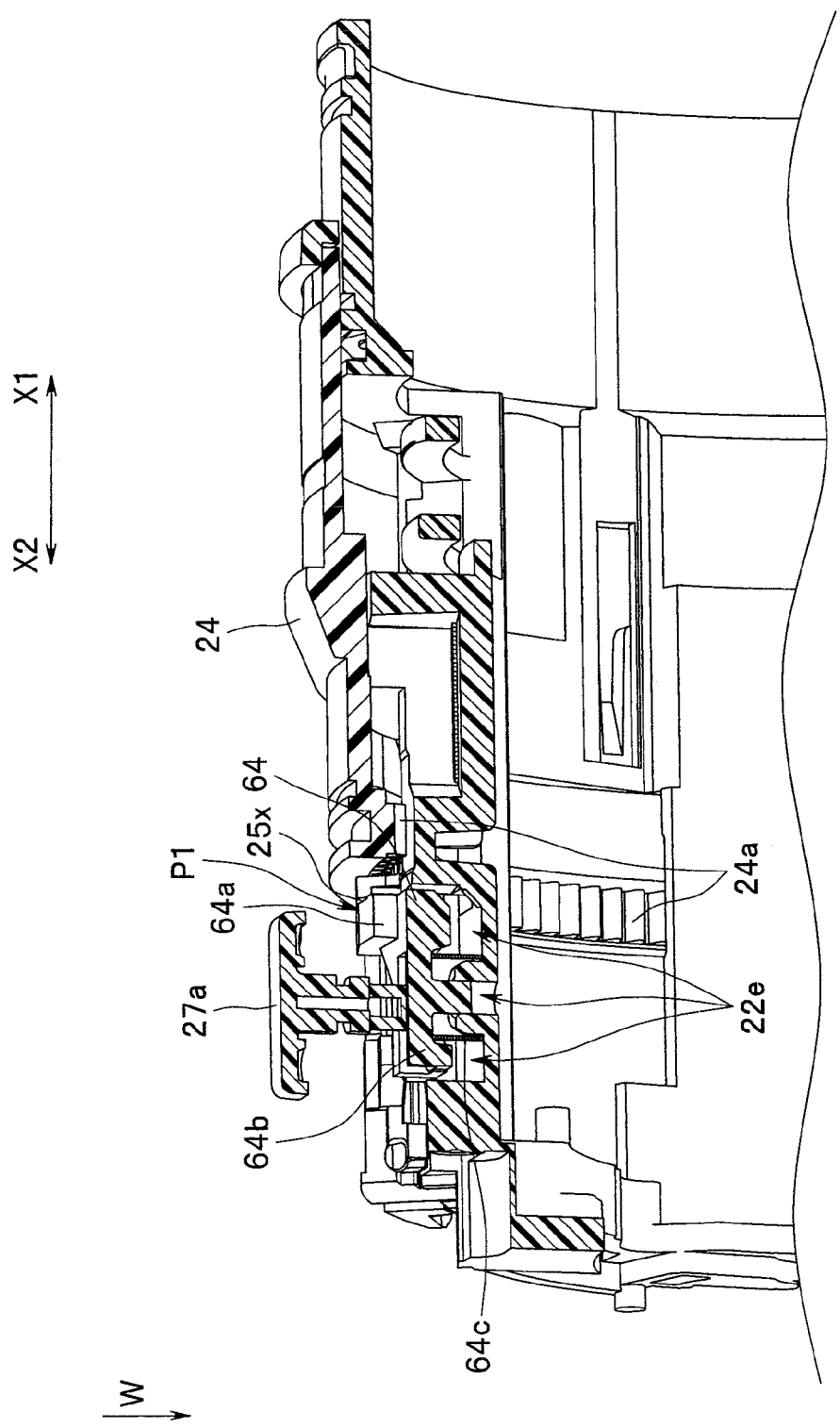
FIG. 30 is an enlarged cross-sectional view of major portions illustrating an outline configuration of a state where setting is changed from the state in FIG. 29 to the manual zoom mode.

Among the drawings, FIGS. 29 and 30 illustrate the arrangement of each member in a normal use mode (a mode of switching between, and using, the electric zoom mode and the manual zoom mode) that is set by the zoom mode switch means, and FIGS. 29 and 30 respectively illustrates a state where the electric zoom mode is set and a state where the manual zoom mode is set. In the states of FIGS. 29 and 30, the operation member 27a of the zoom operation switch means is not in a pressed state.

Figure 31:
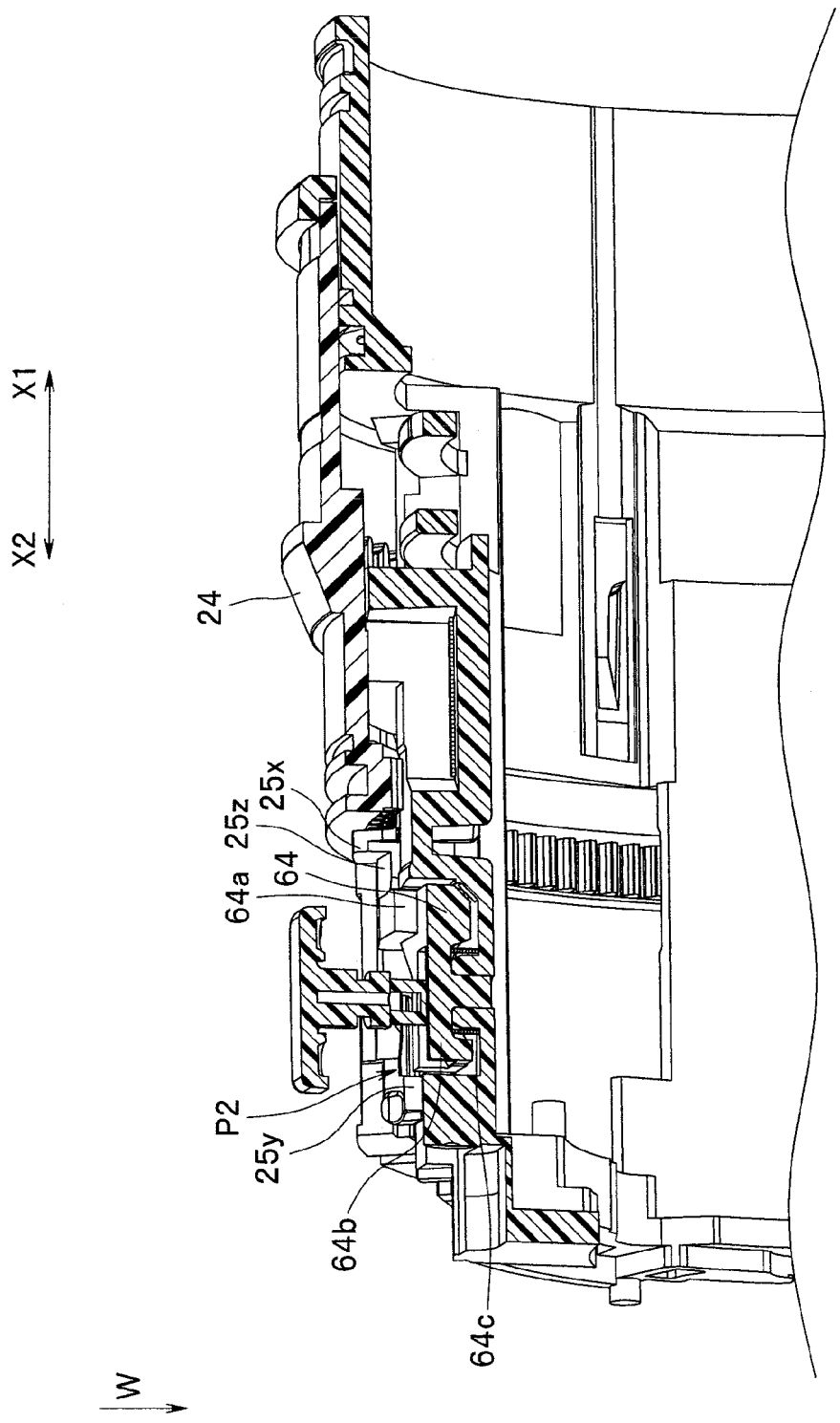
FIG. 31 is an enlarged cross-sectional view of major portions illustrating an outline configuration of a disposed part of the zoom ring and the operation member of the lens barrel of FIG. 1, and is a view illustrating an electric zoom mode set state in a second use mode.
Figure 32:
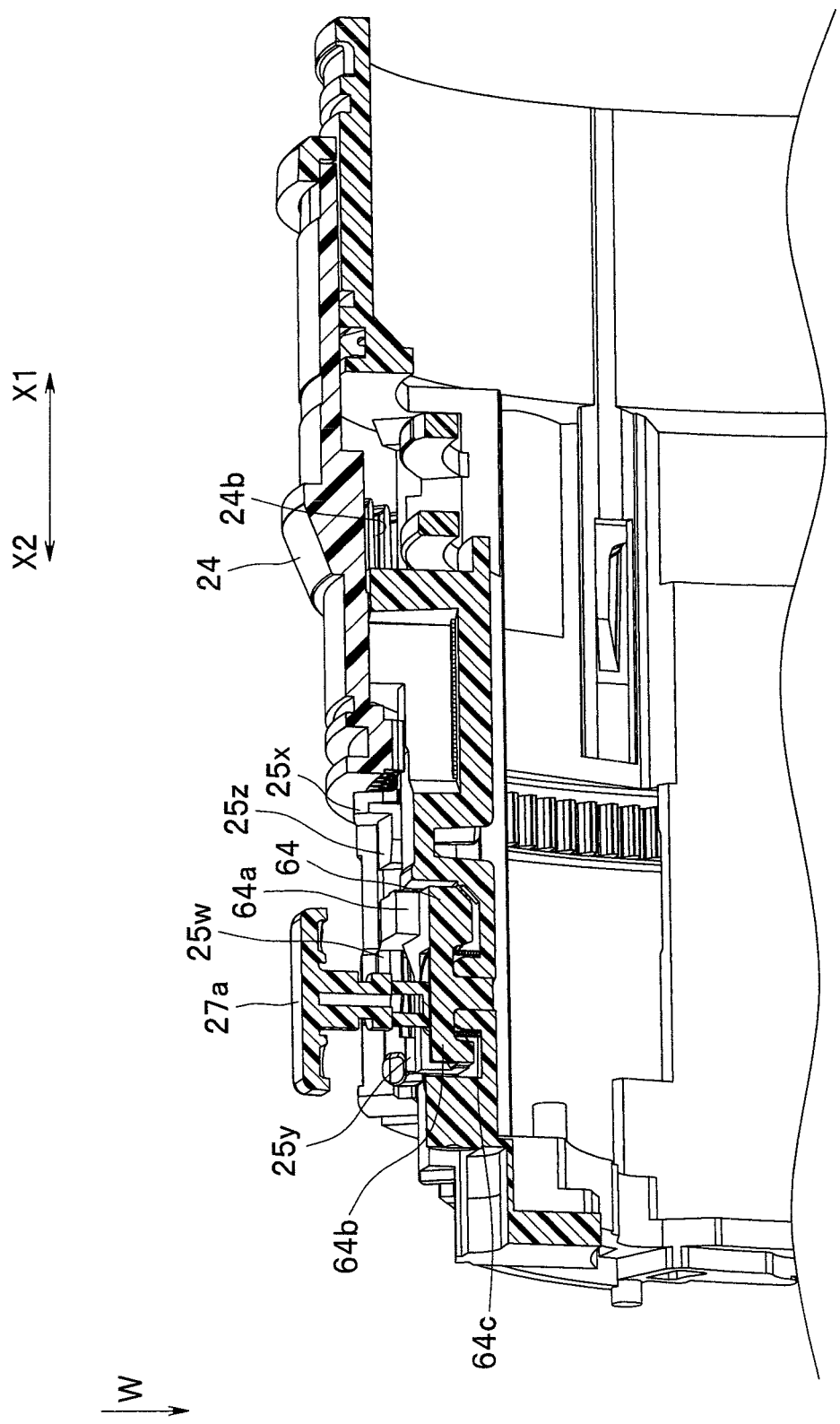
FIG. 32 is an enlarged cross-sectional view of major portions illustrating an outline configuration of a state where setting is changed from the state in FIG. 31 to a macro mode.

Also, FIGS. 31 and 32 illustrate the arrangement of each member in a second use mode (a mode of switching between, and using, the electric zoom mode and the macro mode) that is set by the zoom operation switch means, and FIGS. 31 and 32 respectively illustrate a state where the electric zoom mode is set and a state where the macro mode is set. In the states of FIGS. 31 and 32, the operation member 27a of the zoom operation switch means is in a pressed state.

Figure 33:
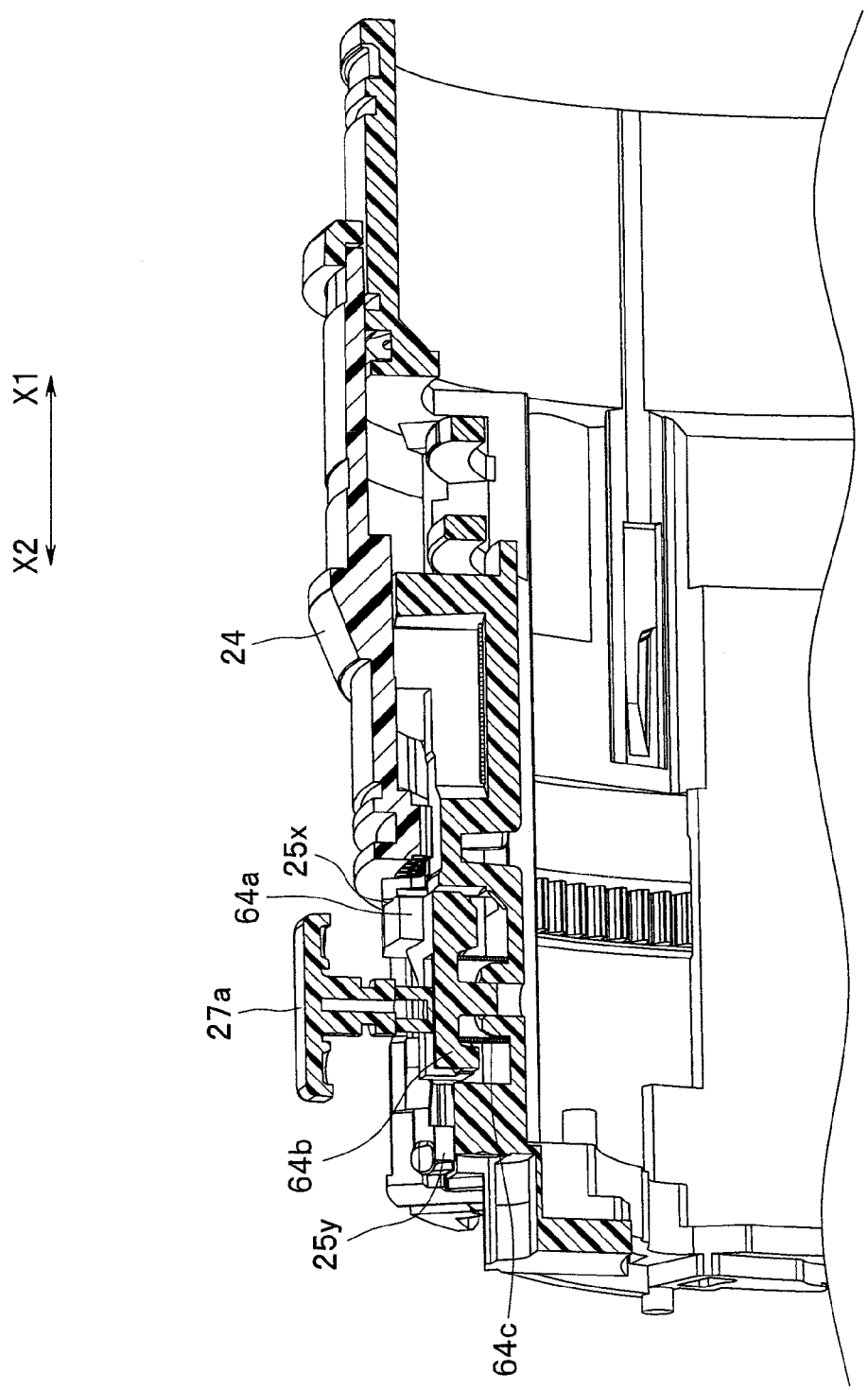
FIG. 33 is an enlarged cross-sectional view of major portions illustrating an outline configuration of a state where setting is changed from the state in FIG. 32 to the manual zoom mode.

Furthermore, FIG. 33 illustrates the arrangement of each member in a third use mode (a mode of switching between, and using, the manual zoom mode and the macro mode) that is set in the zoom operation switch means, and FIG. 33 illustrates a state where the manual zoom mode is set. The state in FIG. 33 is a state where the operation member 27a of the zoom operation switch means has been returned.

The operation member 27a is, as described above, an operation member that is provided on the exterior ring 27 and the main barrel 22 of the exterior unit 2. The operation member 27a is a press-type operation member on which a user performs a pressing operation from outside using a finger or the like. Note that the pressing direction of the operation member 27a in the lens barrel 1 is the direction of an arrow W illustrated, for example, in FIG. 29, that is, a direction orthogonal to the optical axis O. The operation member 27a is constantly in a state of being biased toward the outside from the outer circumference surface of the exterior ring 27.

The zoom ring locking member 64 is configured to be able to move in the same direction as the pressing direction of the operation member 27a in conjunction with the pressing operation on the operation member 27a. The zoom ring locking member 64 is held by the locking member holding portion 22e that is formed on a part of the outer circumference surface of the main barrel 22 near the rear end. The zoom ring locking member 64 is stored and held within the locking member holding portion 22e to be freely movable in the same direction as the pressing direction of the operation member 27a. The zoom ring locking member 64 is constantly in a state of being biased toward the outside from within the locking member holding portion 22e, by a biasing member 64c such as a coil spring.

In other words, the zoom ring locking member 64 is disposed to be freely movable in such a way as to protrude/retract with respect to a movement path of the slide member 25 that slidingly moves in the same direction with the zoom ring 24. That is, the zoom ring locking member 64 is freely movable between a lock position at which the zoom ring locking member 64 protrudes in the movement path of the slide member 25 and locks the sliding movement of the slide member 25, and a retreat position at which the zoom ring locking member 64 retreats from the movement path of the slide member 25 and allows the sliding movement of the slide member 25.

In a state, of the lens barrel 1, where the zoom ring 24 is arranged at the zoom middle position corresponding to the electric zoom mode (this state is referred to as a normal state) and the operation member 27a is not pressed, the zoom ring locking member 64 is arranged at a locking position protruding in the sliding movement path of the slide member 25, as illustrated in FIG. 29.

In this state, the sliding movement of the zoom ring 24 and the slide member 25 in the direction of the arrow X1 in FIG. 29 is locked by a second lock receptacle portion 25y near a rear end of the slide member 25 and a locking portion 64b near a rear end of the zoom ring locking member 64 being abutted against each other at a lock point indicated by a sign P2 in FIG. 29. Switching from the electric zoom mode to the macro mode is thereby locked.

On the other hand, switching from the state illustrated in FIG. 29 (the electric zoom mode state) to the state illustrated in FIG. 30 (the manual zoom mode state) by slidingly moving the zoom ring 24 and the slide member 25 in the direction of the arrow X2 in FIG. 29 is allowed. Further, in this state, the sliding movement of the zoom ring 24 and the slide member 25 in the direction of the arrow X2 in FIG. 30 is locked by a first lock receptacle portion 25x near a distal end of the slide member 25 and a locking portion 64a near the distal end of the zoom ring locking member 64 being abutted against each other at a lock point indicated by a sign P1 in FIG. 30. Further movement of the zoom ring 24 and the slide member 25 from the manual zoom mode toward the rear is thereby locked.

As described above, in the states illustrated in FIGS. 29 and 30, by the zoom ring locking member 64 locking the movement in the switching direction to the macro mode, among the sliding movements, of slide member 25, normal use, that is, use based on arbitrary switching between the electric zoom mode and the manual zoom mode, is enabled. At the same time, switching to the macro mode, which is a use mode different from the normal use above, is in a locked state, and thus, is not unintentionally performed against the user's intention.

Next, when the operation member 27a is pressed in the direction of the arrow W in the state illustrated in FIG. 29 described above, and the state is being maintained, the zoom ring locking member 64 is moved to a retreat position to which the zoom ring locking member 64 retreats from the sliding movement path of the slide member 25, as illustrated in FIG. 31. The locking portion 64b of the zoom ring locking member 64 retreats from the sliding movement path of the slide member 25 at a lock point P2 illustrated in FIG. 31, and the locked state of the second lock receptacle portion 25y of the slide member 25 is thereby released. Accordingly, the zoom ring 24 and the slide member 25 are enabled to slidingly move in the direction of the arrow X1 in FIG. 31, and can be arranged at positions corresponding to the macro mode illustrated in FIG. 32.

Then, when the state illustrated in FIG. 32 (the macro mode) is reached, the sliding movement of the slide member 25 in the direction of the arrow X1 is locked by a third lock receptacle portion 25w formed approximately in the middle of the slide member 25 abutting against the locking portion 64a of the zoom ring locking member 64. The zoom ring 24 and the slide member 25 are thereby restricted from moving further than the position corresponding to the macro mode in the direction of the arrow X1.

Note that, when the macro mode state is reached in this manner, the comb-like portion 24b of the zoom ring 24 is meshed with a comb-like engagement portion 22g (see FIG. 3) formed at a part near the distal end of the main barrel 22 on the outer circumference surface. The zoom ring 24 is configured to be restricted, by this meshing, from turning around the optical axis O. This is because the lens barrel 1 adopts a configuration specification of restricting the zoom operation when the macro mode is set, and fixedly setting the focal length.

Then, when the zoom ring 24 is slidingly moved from the state illustrated in FIG. 32 (the macro mode state) in the direction of the arrow X2 of the drawing, the slide member 25 is enabled to move until the first lock receptacle portion 25x abuts against the locking portion 64a of the zoom ring locking member 64, that is, up to a position corresponding to the manual zoom mode illustrated in FIG. 33 past a position corresponding to the electric zoom mode, which is at the zoom middle position. The second lock receptacle portion 25y of the slide member 25 is arranged at a position separated from the locking portion 64b of the zoom ring locking member 64 by the sliding movement of the slide member 25, and thus, the zoom ring locking member 64 is returned to a protrusion position by the bias force of the biasing member 64c. When the macro mode shifts to the manual zoom mode in this manner, the zoom ring locking member 64 will be in a state of restricting the sliding movement of the slide member 25 in the direction of the arrow X1.

The outline of electrical component members of the lens barrel 1 of the present embodiment configured as described above is as illustrated in the block view in FIG. 34. Note that FIG. 34 illustrates only the component members related to the zoom action, among the electrical component members of the lens barrel 1, and other component members not relevant to the present invention are omitted in the drawing.

Figure 34:
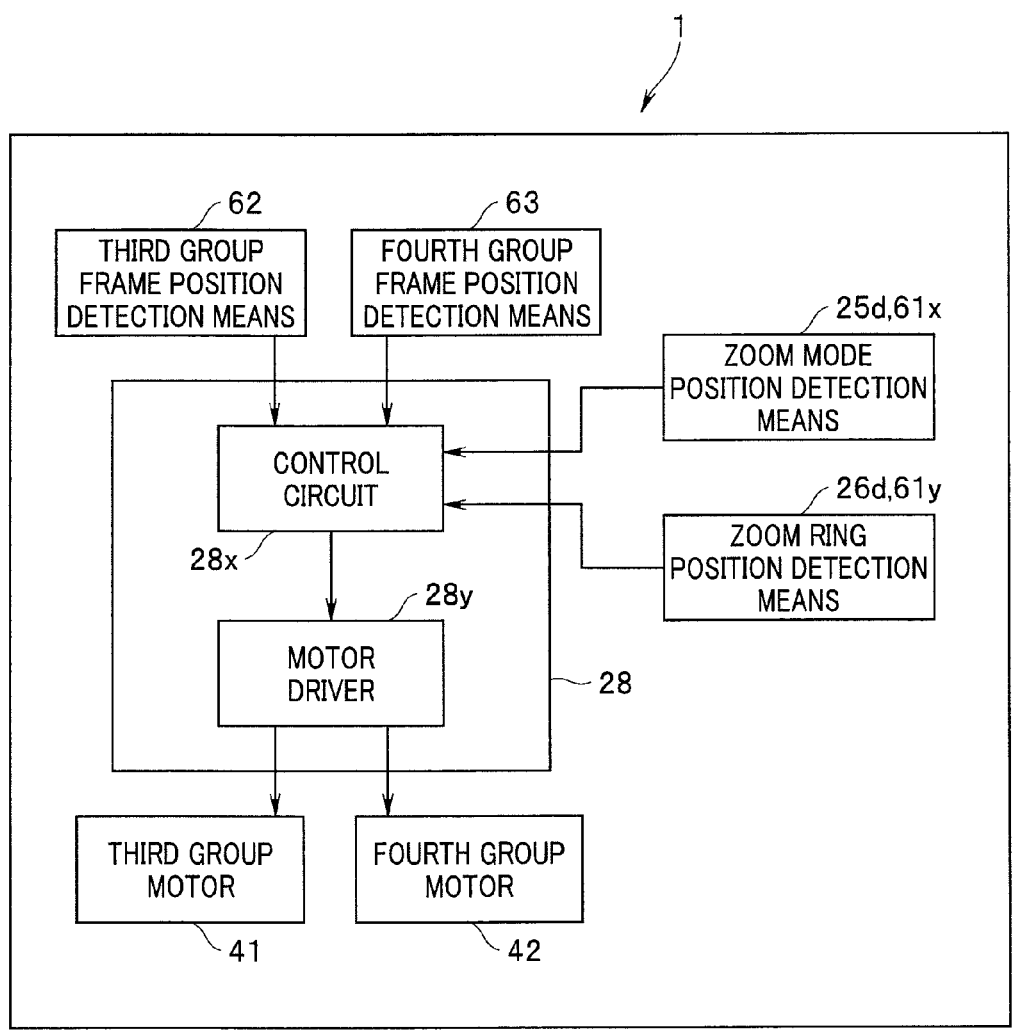
FIG. 34 is a block configuration view illustrating an outline of electric component members of the lens barrel of FIG. 1.

As illustrated in FIG. 34, overall electrical control of the lens barrel 1 is performed by the control circuit 28x mounted on the lens barrel motherboard 28. A motor driver circuit 28y is provided on the lens barrel motherboard 28. The motor driver circuit 28y is under the control of the control circuit 28x, and performs drive-control of the third group motor 41, the fourth group motor 42, and the like, which are drive sources that contribute to zooming.

Also, the control circuit 28x is electrically connected to the third group frame position detection means (the potentiometer 62) and the fourth group frame position detection means (the photo interrupter 63) that perform position detection for the third lens frame 33 and the fourth lens frame 34 each holding a lens group contributing to zooming (the third lens group 33a, the fourth lens group 34a).

Furthermore, the control circuit 28x is electrically connected also to the zoom mode position detection means (25d, 61x) and the zoom ring position detection means (26d, 61y) for detecting the positions of the zoom ring 24 in the optical axis direction and in the turning direction, respectively.

With this configuration, the control circuit 28x detects the zoom mode set state by the zoom ring 24, the turning direction, the amount of turning of the zoom ring 24, and so on, based on the detection results from the zoom mode position detection means and the zoom ring position detection means, for example.

To put it simply, the control circuit 28*x* is control means that, when the zoom ring 24 (the external rotation operation ring) is in the electric zoom mode (the second state; the first position), drive-controls the third group motor 41 (the stepper motor) and the fourth group motor 42 in conjunction with the turning operation of the zoom ring 24. Also, the control circuit 28*x* is control means that, when the zoom ring 24 (the external rotation operation ring) is in the manual zoom mode (the first state; the second position), drive-controls only the fourth group motor 42 according to the position detection result for the third lens frame 33 moving in the optical axis direction in conjunction with the turning operation of the zoom ring 24.

For example, in the case it is detected by the zoom mode position detection means that the electric zoom mode is set, when the zoom ring 24 is turned, the third group motor 41 is drive-controlled via the motor driver circuit 28*y* based on the detection result from the zoom ring position detection means, and the fourth group motor 42 is drive-controlled via the motor driver circuit 28*y* based on the detection result of the third group frame position detection means (62). Then, electric zoom control of performing driving stop control for the fourth group motor 42 is performed based on the detection result of the fourth group frame position detection means (63).

Figure 36:
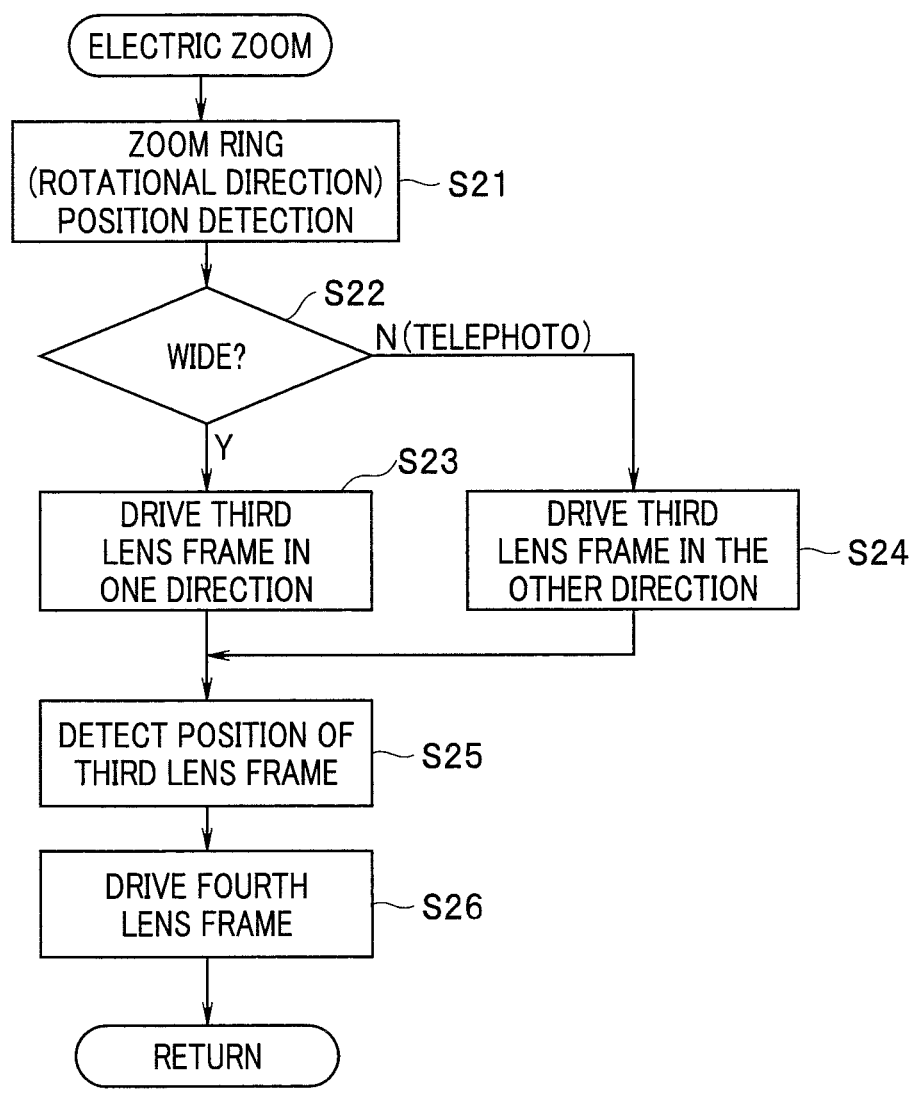
FIG. 36 is a flow chart illustrating an outline of a subroutine of an electric zoom process in the zoom operation process of FIG. 35.
Figure 37:
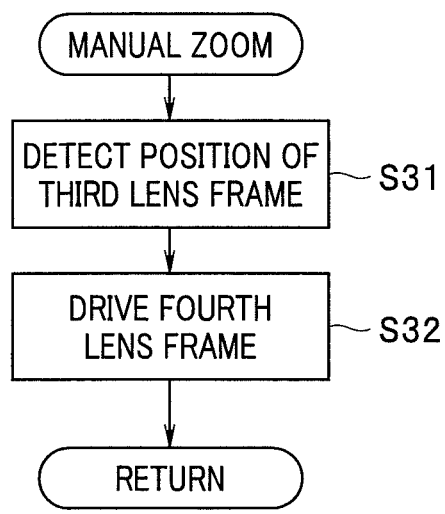
FIG. 37 is a flow chart illustrating an outline of a subroutine of a manual zoom process in the zoom operation process of FIG. 35.

Next, the work of the lens barrel 1 of the present embodiment at the time of zooming will be briefly described below using FIGS. 35 to 37.

Figure 35:
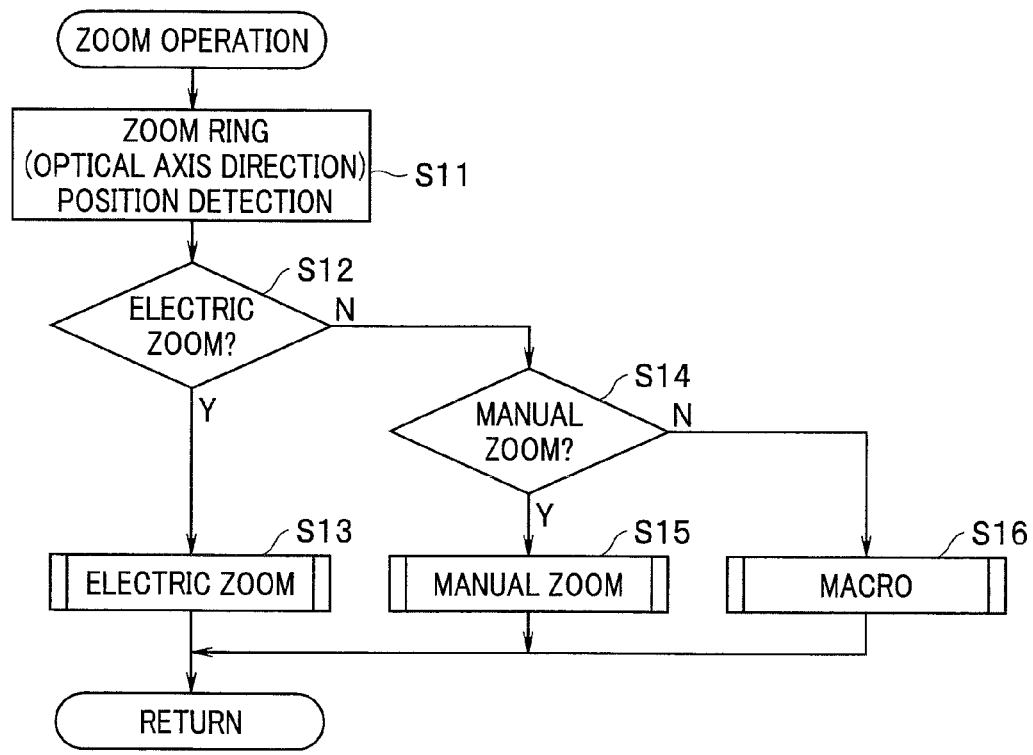
FIG. 35 is a flow chart illustrating an outline of a subroutine of a zoom operation process of the lens barrel of FIG. 1.

FIG. 35 is a flow chart illustrating an outline of a subroutine of a zoom operation process of the lens barrel 1. FIG. 36 is a flow chart illustrating an outline of a subroutine of an electric zoom process of the zoom operation process of FIG. 35. FIG. 37 is a flow chart illustrating an outline of a subroutine of a manual zoom process of the zoom operation process of FIG. 35.

First, an outline of the zoom operation process of the lens barrel 1 will be described.

It is assumed that the lens barrel 1 is attached to a corresponding camera (not illustrated), the action state of the camera is in a power-on state, and it is in a shooting wait state. When a turning operation of the zoom ring 24 is performed by a user in this state, the lens barrel 1 detects the turning operation in a main routine (a main sequence) of shooting not illustrated, and starts executing the subroutine of the zoom operation process of FIG. 35.

In step S11 of FIG. 35, the control circuit 28*x* performs position detection of the zoom ring 24 in the direction along the optical axis O upon reception of a signal from the zoom mode position detection means (the contact member 25*d* of the slide member 25 and the electrical contact portion in the region 61*x* of the flexible printed board 61).

Then, in step S12, the control circuit 28*x* checks whether or not the zoom ring 24 is set to the electric zoom mode, based on the detection result of step S11. In the case it is detected here that the zoom ring 24 is set to the electric zoom mode, the process of the next step S13 will be performed. Also, in the case it is detected that the zoom ring 24 is set to other than the electric zoom mode, the process of the next step S14 will be performed.

In step S13, the control circuit 28*x* executes an electric zoom process corresponding to the electric zoom mode. Then, the process returns to the start of the main sequence (return). Note that the details of the electric zoom process will be given later based on FIG. 36.

In step S14, the control circuit 28*x* checks whether or not the zoom ring 24 is set to the manual zoom mode by referring to the detection result of step S11. In the case it is detected here that the zoom ring 24 is set to the manual zoom mode, the process of the next step S15 will be performed. Also, in the case it is detected that the zoom ring 24 is not set to the manual zoom mode, the process of step S16 will be performed.

In step S15, the control circuit 28*x* executes a manual zoom process corresponding to the manual zoom mode. Then, the process returns to the start of the main sequence (return). Note that the details of the manual zoom process will be given later based on FIG. 37.

Further, in step S16, the control circuit 28*x* executes a macro process corresponding to the macro mode. Then, the process returns to the start of the main sequence (return). Note that the macro process is not directly related to the present invention, and thus, the detailed explanation thereof will be omitted.

Next, the details of the process of step S13 of FIG. 35 described above, that is, the electric zoom process will be given based on FIG. 36.

First, in step S21, the control circuit 28*x* performs position detection of the zoom ring 24 in the turning direction around the optical axis O upon reception of a signal from the zoom ring position detection means (the contact member 26*d* of the electric zoom conjunction member 26, and the electrical contact portion in the region 61*y* of the flexible printed board 61).

Then, in step S22, the control circuit 28*x* checks whether or not the zoom ring 24 is set to a short focal point position (the wide position; see the signs WL, WM, and WH in FIG. 16) based on the detection result of step S21 described above. In the case it is detected here that the zoom ring 24 is set to the short focal point position (the wide position), the process of the next step S23 will be performed. Also, in the case it is detected that the zoom ring 24 is arranged at other than the short focal point position (see the signs TL, TM, and TH in FIG. 16), the process of the next step S24 will be performed.

In step S23, the control circuit 28*x* drive-controls the third group motor 41 via the motor driver circuit 28*y*, and executes a process of driving the third lens frame 33 in one direction (direction set to the short focal point). The amount of driving, the driving speed, and so on, at this time are controlled according to the position detection result of the zoom ring 24. Then, the process of step S25 is performed.

Furthermore, in step S24, the control circuit 28*x* drive-controls the third group motor 41 via the motor driver circuit 28*y*, and executes a process of driving the third lens frame 33 in the other direction (the direction set to the long focal point). The amount of driving, the driving speed, and so on, at this time are controlled according to the position detection result of the zoom ring 24. Then, the process of step S25 is performed.

In step S25, the control circuit 28*x* receives an output signal from the potentiometer 62 (the third group frame position detection means), and detects the position of the third lens frame 33 in the optical axis direction. Then, the process of step S26 is performed.

In step S26, the control circuit 28*x* applies, via the motor driver circuit 28*y*, a necessary pulse to the fourth group motor 42 at a speed that is in accordance with the contact positions between the contact members 26*d* and the electrical contact portions 61*e*, 61*f*, 61*g*, and 61*h*, drive-controls the fourth group motor 42, and drives the fourth lens frame 34 to a position corresponding to the position information of the third lens frame 33 acquired by the process of step S25 described above. Then, the process returns to the start of the main sequence (return). At this time, if the zoom ring 24 is still being rotationally displaced, the process returns to this subroutine.

Now, the details of the process of step S15 of FIG. 35 described above, that is, the manual zoom process, will be given based on FIG. 37.

In the case of the manual zoom, since the zoom ring 24 can be rotated by any amount by hand, the screw 41b is rotated by the inner gear 24a of the zoom ring 24 via the gear box 23, and the third lens frame 33 moves in the optical axis direction. In this state, first, in step S31, the control circuit 28x detects the position of the third lens frame 33, which has been moved by manual operation, in the optical axis direction upon reception of an output signal from the potentiometer 62 (the third group frame position detection means). Then, the process of step S32 is performed.

In step S32, the control circuit 28x drive-controls the fourth group motor 42 via the motor driver circuit 28y, and drives the fourth lens frame 34 to a position corresponding to the position information of the third lens frame 33 acquired by the process of step S31 described above. Then, the process returns to the start of the main sequence (return).

As described above, according to an embodiment described above, a manual action by manual operation can be reliably realized at the time of a zoom operation, and also, a lens barrel that realizes switching between manual operation and electric driving by a simple mechanism can be provided.

That is, the lens barrel 1 of the present embodiment is configured to be able to switch between a mode allowing a manual zoom operation (the first state) and a mode allowing a zoom operation based on electric driving (the second state) by moving the zoom ring 24 (the external rotation operation ring) in the optical axis direction.

In this case, when the zoom ring 24 is at a position corresponding to the manual zoom mode (the second position), a driving force from outside based on the manual turning operation on the zoom ring 24 is transmitted to the third group frame moving mechanism via the gear box 23. At this time, the driving force based on the manual turning operation on the zoom ring 24 can cause the screw 41b to turn in the same direction by turning the motor gear 41d by rotational torque that is greater than detent torque of the third group motor 41. Then, the turning of the screw 41b can cause the third group nut 45 to move in the optical axis direction, and the third group nut 45 can cause the third lens frame 33 to move in the optical axis direction. That is, when the external rotation operation ring is at the second position, the rotation of the external rotation operation ring is transmitted to the screw member 41b by a gear train and the third group nut 45 is moved in the optical axis direction, and the third group nut 45 causes the third lens frame 33 to move in the optical axis direction. Then, the control circuit 28x (control means) causes the fourth lens frame 34 to move in the optical axis direction by drive-controlling the fourth group motor 42 according to the amount of movement and the movement direction of the third lens frame 33. Zooming by manual operation can thereby be performed.

On the other hand, when the zoom ring 24 is at a position corresponding to the electric zoom mode (the first position), the meshing between the gear box 23 and the motor gear 41d is released, and thus, the driving force transmission path between the zoom ring 24 and the third group frame moving mechanism is thereby interrupted. That is, when the external rotation operation ring is at the first position, the gear train does not transmit the rotation of the external rotation operation ring to the screw member. Accordingly, the driving force from the outside based on the manual turning operation of the zoom ring 24 is not transmitted to the third group frame moving mechanism. In this state, the control circuit 28x (control means) causes the third lens frame 33 and the fourth lens frame 34 to move in the optical axis direction by drive-controlling the third group motor 41 and the fourth group motor 42. Electric zooming is thereby enabled. That is, when the external rotation operation ring is at the first position, the third group motor 41, which is a first rotary drive source, and the fourth group motor 42, which is a second rotary drive source, are drive-controlled in conjunction with the rotation of the external rotation operation ring. In addition, at the time of the electric zoom mode, control of the zoom speed and the zoom direction can be performed by turning the zoom ring 24 within a predetermined rotation angle.

In the embodiment described above, the zoom ring 24, which is an operation member for performing zooming, is described in detail as an example structure of the external rotation operation ring, but the configuration of the present invention is not limited to such.

For example, application to the focus ring, which is an operation member for performing focusing, as another example structure of the external rotation operation ring is easily possible. In this case, a function of switching between manual focusing and electric focusing can be easily realized.

Also, in the case of applying the present invention to focusing, the focusing is performed by one lens group described in the present embodiment, and it can be said that the first frame 34 holds a lens optical system and can perform focusing according to the rotation of the external rotation operation ring.

Also, at the time of a plurality of lenses performing focusing with different amounts of movement, the present invention may be applied. For example, in the case of causing two lenses to focus with different amounts of movement, one lens may be held by the first frame 34 and a remaining lens for focusing may be held by a second frame, and, at the time of manual focusing, the first frame 34 is forcibly moved by hand in accordance with the rotation of the external rotation operation ring, the motor 42, which is a second rotary drive source, is correspondingly drive-controlled, and the second frame is moved along the optical axis. Also, at the time of electric focusing, the first frame 34 may be driven by the motor 41 in accordance with the rotation of the external rotation operation ring, and the second frame may be driven by the motor 42.

Note that the clutch means described in the present embodiment is illustrated as the shaft-type gear portion 231 as an input gear or the spur gear portion 236 as an output gear, and when functioning as the clutch means, the clutch means performs meshing or separation of the motor gear (the screw gear) 41d and the output gear (the spur gear portion) 236.

However, the clutch means used here is not limited only to the meshing or separation of the motor gear 41d and the output gear (the spur gear portion) 236. As concrete examples, modified examples of the clutch means will be indicated below with FIGS. 38A, 38B, 39A, and 39B. Note that an explanation will be omitted for the configuration same as that of the embodiment before modification described above.

Figure 38A:
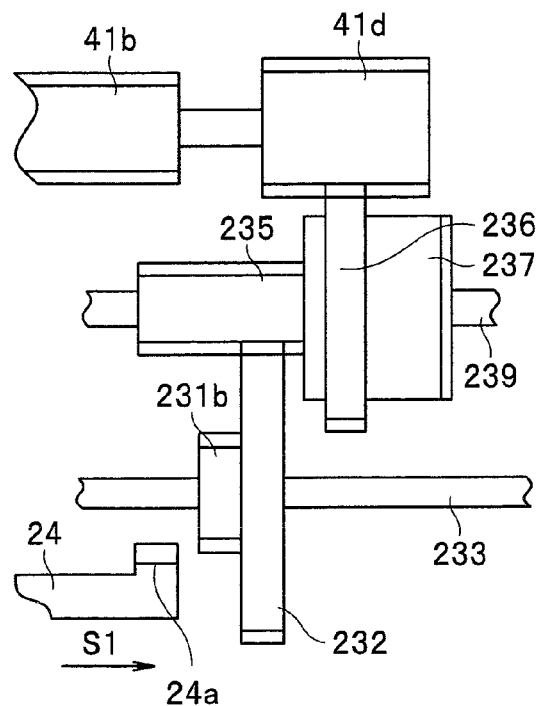
FIG. 38A is a configuration view of a first modified example of clutch means of the lens barrel of the present invention, and is a view illustrating a state where an external rotation operation ring is at a first position (second state, the electric zoom mode)
Figure 38B:
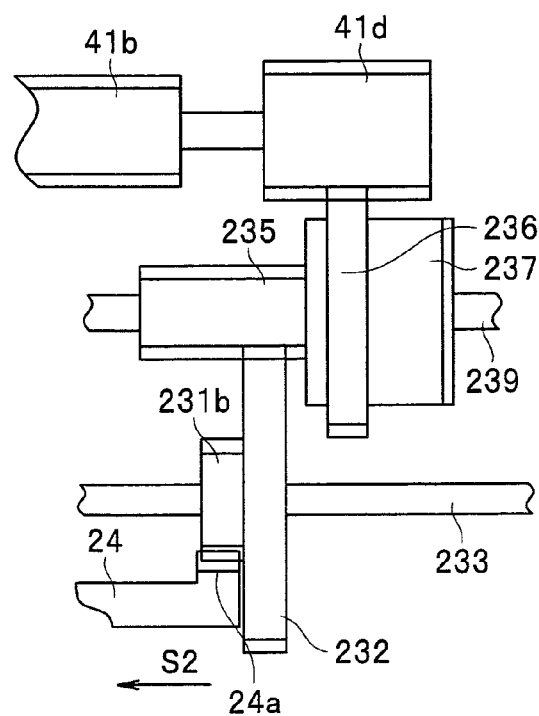
FIG. 38B is a configuration view of the first modified example of the clutch means of the lens barrel of the present invention, and is a view illustrating a state where the external rotation operation ring is shifted to a second position (first state, the manual zoom mode)

In FIGS. 38A and 38B illustrating a first modified example of the clutch means, the screw (the screw member) 41b and the motor gear 41d are the same as those described above. Also, the structure of the second gear sub-assembly is the same as that of the embodiment before modification described above. The friction means embedded in the second gear sub-assembly is also the same. What is different from the embodiment before modification described above is that the spur gear portion 236 as the output gear is constantly meshed with the motor gear 41d. That is, the spur gear portion 236 does not move in the axial direction of the second gear shaft 239, and the second gear sub-assembly only turns. Further, the first gear sub-assembly is also different from the embodiment before modification, and there is no movement in the axial direction of the first gear shaft 233, and only turning is performed. Also, a shaft-type gear portion 231b that replaces the shaft-type gear portion 231 provided on the first gear shaft 233 is somewhat shorter than in the embodiment before modification described above. Furthermore, since the first gear sub-assembly and the second gear sub-assembly do not have to move in the axial direction, the support member 234 is omitted.

FIG. 38A illustrates the external rotation operation ring 24 at the first position (the second state, the electric zoom mode) in the configuration as described above. In the first state, the internal gear 24a of the external rotation operation ring 24 is not meshed with the shaft-type gear portion 231b. That is, it is not meshed with the shaft-type gear portion 231b which is the input gear of the clutch means. Then, when the external rotation operation ring 24 is moved in the direction of an arrow S1 in the drawing, the state shifts to that illustrated in FIG. 38B. That is, a state where the external rotation operation ring 24 has been shifted to the second position (the first state, the manual zoom mode) is reached. Also, to move the external rotation operation ring from the second position to the first position by manual operation, the external rotation operation ring can be moved in the direction of an arrow S2 in FIG. 38B. The meshing between the shaft-type gear portion 231b and the internal gear 24a is released by this movement. The following expression is possible: the screw gear that receives rotation is provided at an end portion of the screw member, and the screw gear is meshed with the output gear of the gear train of the clutch means, and when and the external rotation operation ring (the external rotation operation member) is at the first position, the meshing between the input gear of the gear train of the clutch means and the internal gear is released, and when the external rotation operation ring (the external rotation operation member) is at the second position, the input gear of the gear train of the clutch means and the internal gear are meshed.

An explanation will be given for a second modified example of the clutch means based on FIGS. 39A and 39B. Also in the second modified example, the screw 41b and the motor gear 41d are the same as those described above. Further, the structure of the second gear sub-assembly including the spur gear portion 236, which is the output gear, is also the same as that in the embodiment before modification described above except for a shaft-type gear portion 235b. The shaft-type gear portion 235b is the shaft-type gear portion 235 of the embodiment before modification described above, but with the length in the gear axial direction being shorter. The friction means embedded in the second gear sub-assembly is also same as that in the embodiment before modification described above. What is different from the embodiment before modification described above is that the shaft-type gear portion 235b and the spur gear portion 236, which is the output gear of the second gear sub-assembly, are constantly meshed with the motor gear 41d and the second gear sub-assembly does not move in the axial direction, that the support member 234 is omitted, and the structure of the first gear sub-assembly.

The first gear sub-assembly is configured from the a spur gear portion 232, a shaft-type gear portion 231b, which is an input gear integrated with the spur gear portion 232, a flange portion 232b, which is integrated with the shaft-type gear portion 231b, a support member 234b, which is formed by bending a plate member, and a first gear shaft 233. The shaft-type gear portion 231b is fixedly attached to a first end surface on a side of the spur gear portion 232. Also, the flange portion 232b is provided on a second end surface which is a side surface of the spur gear portion 232 in a sword-guard manner, separate from the spur gear portion 232 in the axial direction of the first gear shaft 233, and a circular groove 232c is formed between the spur gear portion 232 and the flange portion 232b. A part of the support member 234b is impacted into the circular groove 232c, and the support member 234b and the spur gear portion 232 are enabled to rotate relative to each other. Furthermore, a hole is formed at a part of the support member 234b through which the first gear shaft 233 is impacted in a rotatable manner, and the support member 234b and the first gear shaft 233 are enabled to rotate relative to each other. The first gear sub-assembly with such a structure is movable in the axial direction of the first gear shaft 233. The shaft-type gear portion 231b is constantly meshed with the internal gear 24a of the external rotation operation ring 24, and moves in the optical axis direction together with the movement of the external rotation operation ring 24 in the optical axis direction. Furthermore, in the gear train formed from the first gear sub-assembly and the second gear sub-assembly, since the first gear sub-assembly is movable in the axial direction of the first gear shaft 233, the spur gear portion 232 and the shaft-type gear portion 235b along the gear train can be separated, that is, meshing thereof can be released. An explanation for the movement of the support member 234b will be omitted since the movement technique of the support member 234 of the clutch means in the embodiment before modification described above can be used as it is.

Figure 39A:
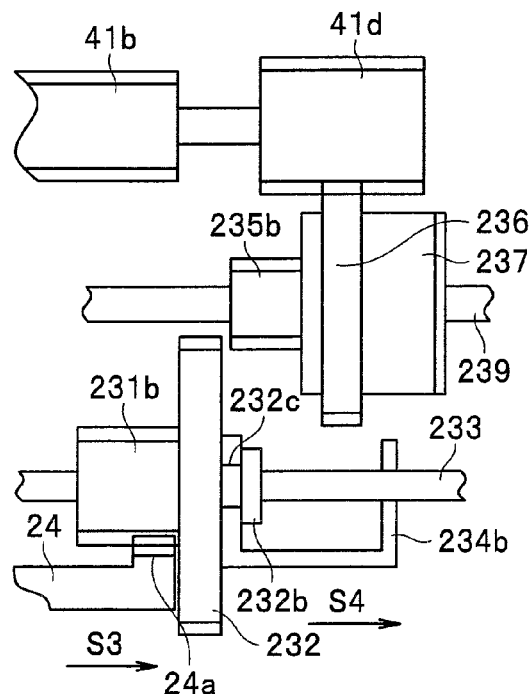
FIG. 39A is a configuration view of a second modified example of the clutch means of the lens barrel of the present invention, and is a view illustrating a state where the external rotation operation ring 24 is at the first position (second state, the electric zoom mode)
Figure 39B:
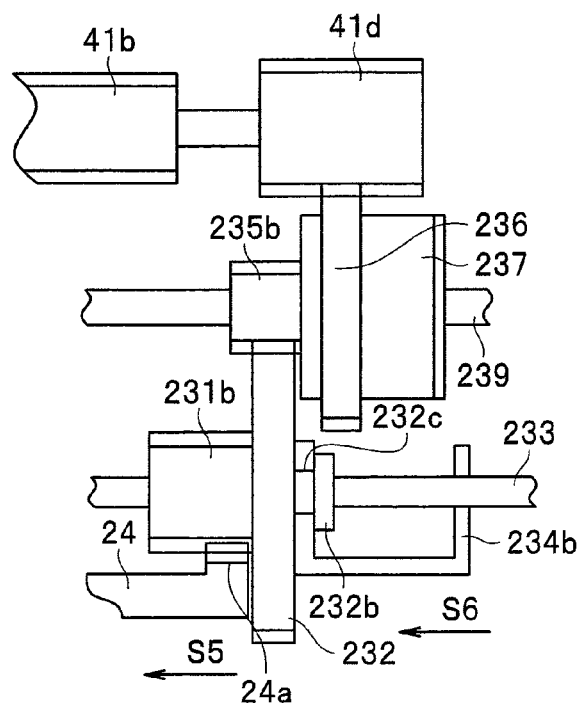
FIG. 39B is a configuration view of the second modified example of the clutch means of the lens barrel of the present invention, and is a view illustrating a state where the external rotation operation ring is shifted to the second position (first state, the manual zoom mode).

In the configuration described above of the second modified example of the clutch means, when the external rotation operation ring 24 is at the first position (the second state, the electric zoom mode), the meshing between the spur gear portion 232 and the shaft-type gear portion 235b is in a released state, as illustrated in FIG. 39A. When the external rotation operation ring 24 is moved from this state to the second position, as indicated by an arrow S3 in the drawing, by external operation, the support member 234b also moves in the direction of an arrow S4 and the first gear sub-assembly is moved, and thus, the spur gear portion 232 and the shaft-type gear portion 235b will mesh with each other. Also, if the external rotation operation ring 24 is moved from the second position illustrated in FIG. 39B in the direction indicated by an arrow S5 in the drawing, the support member 234b also moves in the direction of an arrow S6, and the meshing between the spur gear portion 232 and the shaft-type gear portion 235b is released. It can accordingly be said that, with the clutch means of this modified example, when the external rotation operation ring is at the first position, the meshing between gears is released along the gear train of the clutch means, and when the external rotation operation ring is at the second position, the gears of the gear train of the clutch means are meshed.

Note that the present invention is not limited to the embodiment described above, and various modifications and alterations may, of course, be made without departing from the spirit of the invention. Furthermore, the embodiment described above contains inventions in various phases, and various inventions may be extracted by appropriately combining a plurality of structures disclosed. For example, if an object to be solved by the invention can be solved and the effect of the invention can be achieved even if some structural elements are removed from all the structural elements disclosed in the embodiment, a configuration from which these structural elements have been removed may be extracted as an invention. The invention is not restricted by specific embodiments other than the appended claims.

What is claimed is:

1. A lens barrel comprising:
a first frame that moves in an optical axis direction;
a first rotary drive source that drives the first frame in the optical axis direction;
a screw member that rotates in accordance with rotation of the first rotary drive source;
a pressure member that is maintained in a non-rotational state, and that screws with the screw member, moves in the optical axis direction in accordance with rotation of the screw member, and moves, by pressing, the first frame in the optical axis direction;
an external rotation operation ring that is movable, by moving in the optical axis direction, to a first position and a second position on the optical axis;
a clutch that includes a plurality of gears forming a gear train, and that transmits rotation of the external rotation operation ring to the screw member by the gear train when the external rotation operation ring is at the second position, and does not transmit rotation of the external rotation operation ring to the screw member by the gear train when the external rotation operation ring is at the first position;
control means that drive-controls the first rotary drive source in conjunction with the rotation of the external rotation operation ring when the external rotation operation is at the first position;
an internal gear provided on an inner circumference surface of the external rotation operation ring; and
a screw gear provided at an end portion of the screw member,
wherein an input gear of the gear train of the clutch is meshed with the internal gear, and when the external rotation operation ring is at the second position, an output gear of the gear train and the screw gear are meshed, and when the external rotation operation ring is at the first position, meshing between the output gear of the gear train and the screw gear is released.

2. The lens barrel according to claim 1, wherein the first frame holds a lens optical system, and performs focusing in accordance with rotation of the external rotation operation ring.

3. The lens barrel according to claim 1, wherein the first frame holds a lens optical system, and performs zooming in accordance with rotation of the external rotation operation ring.

4. A lens barrel comprising:
a first frame that moves in an optical axis direction;
a first rotary drive source that drives the first frame in the optical axis direction;
a screw member that rotates in accordance with rotation of the first rotary drive source;
a pressure member that is maintained in a non-rotational state, and that screws with the screw member, moves in the optical axis direction in accordance with rotation of the screw member, and moves, by pressing, the first frame in the optical axis direction;
an external rotation operation ring that is movable, by moving in the optical axis direction, to a first position and a second position on the optical axis;
a clutch that includes a plurality of gears forming a gear train, and that transmits rotation of the external rotation operation ring to the screw member by the gear train when the external rotation operation ring is at the second position, and does not transmit rotation of the external rotation operation ring to the screw member by the gear train when the external rotation operation ring is at the first position;
control means that drive-controls the first rotary drive source in conjunction with the rotation of the external rotation operation ring when the external rotation operation is at the first position;
an internal gear provided on an inner circumference surface of the external rotation operation ring; and a screw gear provided on an end portion of the screw member, wherein the screw gear and an output gear of the gear train are meshed, and when the external rotation operation ring is at the first position, meshing of an input gear of the gear train of the clutch and the internal gear is released, and when the external rotation operation ring is at the second position, the input gear of the gear train of the clutch and the internal gear are meshed.

5. A lens barrel comprising:
a first frame that moves in an optical axis direction;
a first rotary drive source that drives the first frame in the optical axis direction;
a screw member that rotates in accordance with rotation of the first rotary drive source;
a pressure member that is maintained in a non-rotational state, and that screws with the screw member, moves in the optical axis direction in accordance with rotation of the screw member, and moves, by pressing, the first frame in the optical axis direction;
an external rotation operation ring that is movable, by moving in the optical axis direction, to a first position and a second position on the optical axis;
a clutch that includes a plurality of gears forming a gear train, and that transmits rotation of the external rotation operation ring to the screw member by the gear train when the external rotation operation ring is at the second position, and does not transmit rotation of the external rotation operation ring to the screw member by the gear train when the external rotation operation ring is at the first position;
control means that drive-controls the first rotary drive source in conjunction with the rotation of the external rotation operation ring when the external rotation operation is at the first position;
an internal gear provided on an inner circumference surface of the external rotation operation ring; and a screw gear provided on an end portion of the screw member, wherein the screw gear and an output gear of the gear train are meshed, an input gear of the gear train of the clutch is meshed with the internal gear, and when the external rotation operation ring is at the first position, meshing between gears is released along the gear train of the clutch, and when the external rotation operation ring is at the second position, the gears of the gear train of the clutch are meshed.

6. A lens barrel comprising:
a first frame that moves in an optical axis direction;
a first rotary drive source that drives the first frame in the optical axis direction;
a screw member that rotates in accordance with rotation of the first rotary drive source;
a pressure member that is maintained in a non-rotational state, and that screws with the screw member, moves in the optical axis direction in accordance with rotation of the screw member, and moves, by pressing, the first frame in the optical axis direction;

an external rotation operation ring that is movable, by moving in the optical axis direction, to a first position and a second position on the optical axis;
a clutch that includes a plurality of gears forming a gear train, and that transmits rotation of the external rotation operation ring to the screw member by the gear train when the external rotation operation ring is at the second position, and does not transmit rotation of the external rotation operation ring to the screw member by the gear train when the external rotation operation ring is at the first position;
control means that drive-controls the first rotary drive source in conjunction with the rotation of the external rotation operation ring when the external rotation operation is at the first position;
a second frame that moves in the optical axis direction;
a second rotary drive source that drives the second frame in the optical axis direction; and
driving means that receives a driving force of the second rotary drive source, and drives the second frame in the optical axis direction,
wherein the control means drives the first rotary drive source and the second rotary drive source when the external rotation operation ring is at the first position, and drives only the second rotary drive source when the external rotation operation ring is at the second position and the external rotation operation ring is rotated,
wherein the drive means comprises:
a second screw member that rotates in accordance with rotation of the second rotary drive source; and
a second pressure member whose rotation is restricted, and that is screwed with the second screw member;
wherein the second pressure member moves in the optical axis direction in accordance with rotation of the second screw member, and moves, by pressing, the second frame in the optical axis direction.

7. A lens barrel comprising:
a first frame;
a second frame;
a first drive mechanism that drives the first frame in an optical axis direction;
a second drive mechanism that drives the second frame in the optical axis direction;
a first rotary drive source that renders the first drive mechanism drivable;
a second rotary drive source that renders the second drive mechanism drivable;
an external rotation operation ring that rotates around an optical axis, and that is movable to a first position and a second position in the optical axis direction; and
a clutch that does not transmit rotation of the external rotation operation ring to the first drive mechanism when the external rotation operation ring is at the first position, and transmits rotation of the external rotation operation ring to the first drive mechanism when the external rotation operation ring is at the second position,
wherein the second drive mechanism comprises:
a screw gear that is capable of receiving rotation from the clutch to rotationally drive the screw member,
wherein, when the external rotation operation ring is at the second position, the screw member rotates by receiving rotation from the clutch, and drives the first frame in the optical axis direction.

8. The lens barrel according to claim 7, further comprising:
control means that drive-controls the first rotary drive source and the second rotary drive source in conjunction with the rotation of the external rotation operation ring when the external rotation operation ring is at the first position.

9. The lens barrel according to claim 8,
wherein the first drive mechanism comprises:
a screw member that is provided in parallel with the optical axis, and rotates in accordance with rotation of the first rotary drive source; and
a pressure member that is maintained in a non-rotational state, and that screws with the screw member, moves in the optical axis direction in accordance with rotation of the screw member, and moves, by pressing, the first frame in the optical axis direction.

10. The lens barrel according to claim 9,
wherein an internal gear is formed on an inner circumference surface of the external rotation operation ring, and when the external rotation operation ring is at the second position, the first drive mechanism is driven from the internal gear via the clutch.

11. The lens barrel according to claim 8,
wherein an internal gear is formed on an inner circumference surface of the external rotation operation ring, and when the external rotation operation ring is at the second position, the first drive mechanism is driven from the internal gear via the clutch.

12. The lens barrel according to claim 7,
wherein the first drive mechanism comprises:
a screw member that is provided in parallel with the optical axis, and rotates in accordance with rotation of the first rotary drive source; and
a pressure member that is maintained in a non-rotational state, and that screws with the screw member, moves in the optical axis direction in accordance with rotation of the screw member, and moves, by pressing, the first frame in the optical axis direction.

13. The lens barrel according to claim 12,
wherein an internal gear is formed on an inner circumference surface of the external rotation operation ring, and when the external rotation operation ring is at the second position, the first drive mechanism is driven from the internal gear via the clutch.

14. The lens barrel according to claim 7,
wherein the first frame and the second frame perform focusing in accordance with rotation of the external rotation operation ring.

15. The lens barrel according to claim 14,
wherein an internal gear is formed on an inner circumference surface of the external rotation operation ring, and when the external rotation operation ring is at the second position, the first drive mechanism is driven from the internal gear via the clutch.

16. The lens barrel according to claim 7,
wherein the first frame and the second frame hold zoom lens optical systems, and perform zooming in accordance with rotation of the external rotation operation ring.

17. The lens barrel according to claim 16,
wherein an internal gear is formed on an inner circumference surface of the external rotation operation ring, and when the external rotation operation ring is at the second position, the first drive mechanism is driven from the internal gear via the clutch.

18. The lens barrel according to claim 7,
wherein an internal gear is formed on an inner circumference surface of the external rotation operation ring, and when the external rotation operation ring is at the second position, the first drive mechanism is driven from the internal gear via the clutch.

* * * * *